United States Patent
Isaacson et al.

(10) Patent No.: US 11,244,377 B2
(45) Date of Patent: Feb. 8, 2022

(54) SYSTEM AND METHOD FOR PROVIDING A BROWSER API FOR MANAGING PRODUCT PURCHASES

(71) Applicant: Monticello Enterprises LLC, Huntingtown, MD (US)

(72) Inventors: Thomas M. Isaacson, Huntingtown, MD (US); Ryan Connell Durham, Santa Clara, UT (US)

(73) Assignee: MONTICELLO ENTERPRISES LLC, Huntingtown, MD (US)

( * ) Notice: Subject to any disclaimer, the term of this patent is extended or adjusted under 35 U.S.C. 154(b) by 91 days.

(21) Appl. No.: 16/573,411

(22) Filed: Sep. 17, 2019

(65) Prior Publication Data
US 2020/0014671 A1    Jan. 9, 2020

Related U.S. Application Data

(63) Continuation of application No. 16/445,297, filed on Jun. 19, 2019, now Pat. No. 10,511,580, which is a
(Continued)

(51) Int. Cl.
*G06Q 30/00* (2012.01)
*G06Q 30/06* (2012.01)

(52) U.S. Cl.
CPC ..... *G06Q 30/0633* (2013.01); *G06Q 30/0625* (2013.01); *G06Q 30/0635* (2013.01); *G06Q 30/0641* (2013.01)

(58) Field of Classification Search
CPC ........... G06Q 30/0601; G06Q 30/0633; G06Q 30/0641
See application file for complete search history.

(56) References Cited

U.S. PATENT DOCUMENTS

| 5,960,411 A | 9/1999 | Hartman |
| 6,731,788 B1 * | 5/2004 | Agnihotri ............ G06K 9/3266 382/157 |

(Continued)

FOREIGN PATENT DOCUMENTS

| CN | 102160070 | 8/2011 |
| CN | 102254259 | 11/2011 |

(Continued)

OTHER PUBLICATIONS

Lopes, Christian T., et al. "Cytoscape Web: an interactive web-based network browser." Bioinformatics 26.18 (2010): 2347-2348. (Year: 2010).*

(Continued)

*Primary Examiner* — Christopher B Seibert

(57) ABSTRACT

Disclosed is an updated browser having an API for communicating payment data between the browser and a site or an application and a software module for processing payments of purchases and to reduce the number of user interactions needed for a purchasing process. The method includes receiving, via the user interface, an interaction by a user with an object associated with a site, the interaction indicating a user intent to make a purchase, receiving, based on the interaction and via an application programming interface, a request from the site or application for payment data in connection with the purchase and transmitting, to the site or the application and via the application programming interface, the payment data, wherein the payment data confirms the purchase or can be used to process or deliver a product associated with the purchase.

20 Claims, 37 Drawing Sheets

Related U.S. Application Data continuation of application No. 16/279,685, filed on Feb. 19, 2019, now Pat. No. 10,643,266, which is a continuation-in-part of application No. 16/126,541, filed on Sep. 10, 2018, now Pat. No. 10,832,310, which is a continuation-in-part of application No. 15/947,395, filed on Apr. 6, 2018, now Pat. No. 10,152,756, which is a continuation-in-part of application No. 15/720,878, filed on Sep. 29, 2017, now Pat. No. 10,497,037, which is a continuation-in-part of application No. 15/263,057, filed on Sep. 12, 2016, now Pat. No. 9,824,408, which is a continuation of application No. 15/018,954, filed on Feb. 9, 2016, now Pat. No. 9,734,526, which is a continuation of application No. 14/853,579, filed on Sep. 14, 2015, now Pat. No. 9,396,491, which is a continuation of application No. 14/822,368, filed on Aug. 10, 2015, now Pat. No. 9,292,871, which is a continuation of application No. 14/672,876, filed on Mar. 30, 2015, now Pat. No. 9,361,638, which is a continuation-in-part of application No. 14/230,864, filed on Mar. 31, 2014, now Pat. No. 9,430,794.

(60) Provisional application No. 61/973,287, filed on Apr. 1, 2014, provisional application No. 61/972,861, filed on Mar. 31, 2014, provisional application No. 61/972,843, filed on Mar. 31, 2014, provisional application No. 61/972,848, filed on Mar. 31, 2014, provisional application No. 61/972,834, filed on Mar. 31, 2014, provisional application No. 61/972,890, filed on Mar. 21, 2014, provisional application No. 61/972,865, filed on Mar. 31, 2014, provisional application No. 61/972,892, filed on Mar. 31, 2014, provisional application No. 61/972,878, filed on Mar. 31, 2014, provisional application No. 61/972,879, filed on Mar. 31, 2014.

(56) References Cited

U.S. PATENT DOCUMENTS

| | | | |
|---|---|---|---|
| 6,922,675 B1 | 7/2005 | Chatterjee | |
| 7,062,258 B1 | 6/2006 | Sini | |
| 7,225,156 B2 | 5/2007 | Fisher | |
| 7,433,845 B1 | 10/2008 | Flitcroft et al. | |
| 7,660,779 B2 | 2/2010 | Goodman et al. | |
| 7,877,295 B2 | 1/2011 | Mengerink et al. | |
| 8,375,325 B2 | 2/2013 | Wuttke | |
| 8,458,053 B1 * | 6/2013 | Buron | G06Q 30/0619 705/27.1 |
| 8,548,872 B1 | 10/2013 | Gupta | |
| 8,577,813 B2 | 11/2013 | Weiss | |
| 8,600,892 B2 | 12/2013 | Foster et al. | |
| 8,660,912 B1 * | 2/2014 | Dandekar | G06Q 30/02 705/27.1 |
| 8,762,475 B2 | 6/2014 | Cheung et al. | |
| 8,768,838 B1 | 7/2014 | Hoffman | |
| 8,843,125 B2 | 9/2014 | Kwon et al. | |
| 8,856,539 B2 | 10/2014 | Weiss | |
| 8,977,554 B1 * | 3/2015 | Hertschuh | G10L 15/26 704/270 |
| 9,022,286 B2 | 5/2015 | Wyatt | |
| 9,100,826 B2 | 8/2015 | Weiss | |
| 9,137,576 B2 | 9/2015 | McRae | |
| 9,170,812 B2 | 10/2015 | Vorbach et al. | |
| 9,182,243 B2 | 11/2015 | Van Os | |
| 9,224,083 B2 | 12/2015 | Wyatt | |
| 9,224,167 B2 * | 12/2015 | Lampert | G06Q 30/0633 |
| 9,355,391 B2 | 5/2016 | von Behren | |
| 9,418,672 B2 | 8/2016 | Pylappan | |
| 9,430,765 B2 | 8/2016 | Wyatt | |
| 9,443,017 B2 | 9/2016 | Borisovich | |
| 9,536,238 B2 | 1/2017 | Garrett et al. | |
| 9,613,160 B2 * | 4/2017 | Houle | G06F 16/9577 |
| 9,760,872 B2 | 9/2017 | Zamer | |
| 9,760,884 B2 | 9/2017 | Wyatt | |
| 10,013,693 B2 | 7/2018 | Wyatt | |
| 10,289,996 B2 | 5/2019 | Khan et al. | |
| 10,339,520 B2 | 7/2019 | Wyatt | |
| 10,628,820 B2 | 4/2020 | Wyatt | |
| 2001/0032162 A1 | 10/2001 | Alsberg | |
| 2001/0032170 A1 | 10/2001 | Sheth | |
| 2004/0103197 A1 | 5/2004 | Benson | |
| 2004/0243505 A1 | 12/2004 | Sweeting | |
| 2004/0254891 A1 | 12/2004 | Blinn | |
| 2005/0177474 A1 | 8/2005 | Ma | |
| 2006/0041485 A1 | 2/2006 | Tarvydas | |
| 2006/0074780 A1 | 4/2006 | Taylor | |
| 2006/0143094 A1 | 6/2006 | Kohout | |
| 2006/0224973 A1 * | 10/2006 | Albrecht | G06F 9/451 715/760 |
| 2007/0050406 A1 * | 3/2007 | Byers | G06F 16/48 |
| 2007/0106570 A1 * | 5/2007 | Hartman | G06Q 20/12 705/26.2 |
| 2007/0112647 A1 * | 5/2007 | Borders | G06Q 30/0633 705/7.35 |
| 2007/0294240 A1 * | 12/2007 | Steele | G06F 16/338 |
| 2008/0167946 A1 | 7/2008 | Bezos | |
| 2008/0201304 A1 | 8/2008 | Sue | |
| 2008/0244721 A1 * | 10/2008 | Barrus | G06F 21/6254 726/9 |
| 2009/0037291 A1 * | 2/2009 | Dawson | G06Q 30/0603 705/27.2 |
| 2009/0089260 A1 | 4/2009 | Chong | |
| 2009/0132347 A1 * | 5/2009 | Anderson | G06Q 30/02 705/14.52 |
| 2009/0132405 A1 | 5/2009 | Scipioni | |
| 2009/0157479 A1 * | 6/2009 | Caldwell | G06Q 30/0601 705/14.54 |
| 2009/0235196 A1 | 9/2009 | MacBeth | |
| 2009/0271735 A1 | 10/2009 | Anderson | |
| 2009/0300476 A1 | 12/2009 | Vogel et al. | |
| 2010/0106611 A1 | 4/2010 | Paulsen et al. | |
| 2010/0114654 A1 * | 5/2010 | Lukose | G06Q 30/00 705/14.54 |
| 2010/0114731 A1 | 5/2010 | Kingston et al. | |
| 2010/0205551 A1 | 8/2010 | Underwood | |
| 2010/0280909 A1 * | 11/2010 | Zhang | G06Q 20/12 705/17 |
| 2010/0281364 A1 | 11/2010 | Sidman | |
| 2010/0309512 A1 | 12/2010 | Onoda | |
| 2011/0047014 A1 | 2/2011 | DeAngelo | |
| 2011/0282785 A1 | 11/2011 | Chin | |
| 2012/0005074 A1 | 1/2012 | Kothandaraman et al. | |
| 2012/0084199 A1 | 4/2012 | Stone | |
| 2012/0109713 A1 | 5/2012 | Wilhite | |
| 2012/0136756 A1 * | 5/2012 | Jitkoff | G06F 3/04817 705/27.1 |
| 2012/0166311 A1 | 6/2012 | Dwight | |
| 2012/0191569 A1 * | 7/2012 | Shah | G06Q 20/405 705/26.41 |
| 2012/0203776 A1 | 8/2012 | Nissan | |
| 2012/0221437 A1 * | 8/2012 | Yoo | G06Q 20/384 705/26.41 |
| 2012/0226620 A1 | 9/2012 | Junger | |
| 2012/0233020 A1 * | 9/2012 | Eberstadt | G06Q 10/101 705/26.41 |
| 2012/0233170 A1 | 9/2012 | Musgrove et al. | |
| 2012/0031738 A1 | 12/2012 | Mesaros | |
| 2012/0310738 A1 * | 12/2012 | Mesaros | G06Q 30/0222 705/14.57 |
| 2013/0013427 A1 * | 1/2013 | Gonsalves | G06Q 30/02 705/14.73 |
| 2013/0066987 A1 * | 3/2013 | Levinson | H04L 51/04 709/206 |
| 2013/0066988 A1 * | 3/2013 | Levinson | G06Q 10/107 709/206 |
| 2013/0076788 A1 * | 3/2013 | Ben Zvi | G06F 16/951 345/633 |

(56) References Cited

U.S. PATENT DOCUMENTS

| | | | |
|---|---|---|---|
| 2013/0104022 A1 | 4/2013 | Coon | |
| 2013/0290149 A1* | 10/2013 | Rashwan | G06Q 30/0641 |
| | | | 705/27.1 |
| 2013/0307765 A1 | 11/2013 | Li | |
| 2013/0316647 A1 | 11/2013 | Leica et al. | |
| 2013/0325980 A1* | 12/2013 | Ohayon | H04L 51/066 |
| | | | 709/206 |
| 2013/0339229 A1* | 12/2013 | Li | H04L 12/1403 |
| | | | 705/40 |
| 2013/0345959 A1 | 12/2013 | Van Os | |
| 2014/0019367 A1* | 1/2014 | Khan | G06Q 20/425 |
| | | | 705/75 |
| 2014/0025521 A1 | 1/2014 | Alsina | |
| 2014/0052565 A1 | 2/2014 | Foster et al. | |
| 2014/0095583 A1* | 4/2014 | Houle | G06F 16/9577 |
| | | | 709/203 |
| 2014/0136334 A1* | 5/2014 | Lagassey | G06Q 30/02 |
| | | | 705/14.66 |
| 2014/0136990 A1* | 5/2014 | Gonnen | H04L 51/18 |
| | | | 715/752 |
| 2014/0164199 A1 | 6/2014 | Wilkes | |
| 2014/0207462 A1 | 7/2014 | Bangalore | |
| 2014/0229339 A1 | 8/2014 | Massiere | |
| 2014/0249968 A1 | 9/2014 | MacKinnon Keith | |
| 2014/0279266 A1* | 9/2014 | Lampert | G06Q 30/0629 |
| | | | 705/26.64 |
| 2014/0297362 A1* | 10/2014 | Kumar | G06Q 30/0613 |
| | | | 705/7.29 |
| 2014/0297537 A1* | 10/2014 | Kassemi | G06Q 30/0279 |
| | | | 705/67 |
| 2015/0019423 A1 | 1/2015 | Dowling | |
| 2015/0052036 A1 | 2/2015 | Vernal et al. | |
| 2015/0052061 A1* | 2/2015 | Anderson | G06Q 20/027 |
| | | | 705/71 |
| 2015/0058191 A1 | 2/2015 | Khan et al. | |
| 2015/0059191 A1 | 2/2015 | Khan et al. | |
| 2015/0088655 A1* | 3/2015 | Taylor | G06Q 30/0264 |
| | | | 705/14.61 |
| 2015/0088686 A1* | 3/2015 | Glassberg | G06Q 50/01 |
| | | | 705/26.8 |
| 2015/0095238 A1 | 4/2015 | Khan et al. | |
| 2015/0142640 A1* | 5/2015 | Kneen | G06Q 20/12 |
| | | | 705/39 |
| 2015/0149168 A1* | 5/2015 | Stent | G10L 15/26 |
| | | | 704/235 |
| 2015/0317698 A1* | 11/2015 | Kalyvas | G06Q 30/0242 |
| | | | 705/14.16 |
| 2015/0324789 A1 | 11/2015 | Dvorak | |
| 2015/0348017 A1 | 12/2015 | Allmen | |
| 2015/0379811 A1 | 12/2015 | Earley | |
| 2016/0247144 A1 | 8/2016 | Oh | |
| 2016/0275474 A1 | 9/2016 | Kim | |
| 2017/0330187 A1 | 11/2017 | Kohli | |
| 2017/0337542 A1 | 11/2017 | Kim | |
| 2021/0241256 A1 | 8/2021 | Caldwell | |

FOREIGN PATENT DOCUMENTS

| | | |
|---|---|---|
| CN | 102498705 | 6/2012 |
| CN | 103310337 | 9/2013 |
| CN | 103745350 | 4/2014 |
| WO | WO 2012/075304 | 6/2012 |

OTHER PUBLICATIONS

Google Wallet: Shopping Safe and Sound, Aug. 21, 2012 https://www.youtube.com/watch?v=yLHW7suDVDI.

What is ISIS? Jan. 23, 2014 https://www.nerdwallet.com/blog/credit-cards/isis/.

Meng, Jian, and Liang Ye, "Secure mobile payment model based on WAP." 2008 4th International Conference on Wireless Communications, Networking and Mobile Computing, IEEE, 2008.

Hong, Feng, et al., "Waving authentication: your smartphone authenticate you on motion gesture," Proceedings of the 33rd Annual ACM Conference Extended Abstracts on Human Factors in Computing Systems, 2015.

Williams, Owen, "Mozilla shows off Firefox's new search interface," thenextweb.com, Nov. 25, 2014.

Kraft, Ben, Eric Mannes, and Jordan Moldow, "Security research of a social payment app," (Year: 2014).

Gomzin, Slava and Dan Itkis, "Decentralized, Real-Time Credit, Debit and Crypto Payment Processing Blockchain," (Year: 2017).

"Firefox OS", Wikipedia, https://en.wikipedia.org/wiki/Firefox_OS, Initial release Feb. 21, 2013, 12 pages.

"Intro to Open Web Apps", Archive of obsolete content, MDN, https://developer.mozilla.org/en-US/docs/Archive/B2G_OS/Quickstart/Intro_to_open_web_apps, 4 pages.

Trusov, Michael, Randolph E. Bucklin, and Koen Pauwels, "Effects of word-of mouth versus traditional marketing: findings from an internet social networking site." Journal of marketing 73/5 (2009): 90-102 (Year: 2009).

Huang, Ziaodi, Ziaoling Dai, and Weiqiang Liang, "BulaPay: a novel web service based third-party payment system for e-commerce" &nspb; Electronic Commerce Research , 14.4 (2014): 611-633. (Year: 2014).

By kumar303, "Introducing navigator.mozPay() for Web Payments", Apr. 4, 2013, https://hacks.mozilla.org/2013/04/introducing-navigaior-mozpay-for-web-payments/, 18 pages.

"In-app payments with mozPay", Archive of obsolete content, MDN, https://developer.mozilla.org/en-US/docs/Archive/Marketplace/Monetization/In-app_payments_section/mozPay_iap, 16 pages.

By kumar303, "WebAPI/WebPayment", Revision Aug. 7, 2013, https://mozilla.org/index.php?title=WebAPI/WebPayment&oldid=691442, 11 pages.

"WebAPI/WebPaymentProvider", MozillaWiki, https://wiki.mozilla.org/WebAPi/WebPaymentProvider, 6 pages.

By Manu Sporny and Robert Nyman, "Web Payments with PaySwarm: Identity (part 1 of 3)", posted Apr. 16, 2013 in Payments and Standards, https://hacks.mozilla.org/2013/04/web-payments-with-payswarm-identity-part-1-of-3/, 8 pages.

By Manu Sporny and Robert Nyman, "Web Payments with PaySwarm: Assets and Listings (part 2 of 3)", posted Apr. 23, 2013 in Node.js, Payments and Standards, https://hacks.mozilla.org/2013/04/web-payments-with-payswarm-part-2/, 8 pages.

By Manu Sporny and Robert Nyman, "Web Payments with PaySwarm: Purchases (part 3 of 3)", posted Apr. 30, 2013 in Payments, https://hacks.mozilla.org/2013/04/web-payments-with-payswarm-purchasing-part-1-of-3/, 6 pages.

By Manu Sporny, "Browser Payments 1.0", May 7, 2013 in PaySwarm, Standards with 1 Comment—Permalink, https://manu.sporny.org/2013/browser-payments/, 2 pages.

M. Sporny committed on May 5, 2013, "martin-naumann/browser-payments", Added first version of browser payments spec to github pages, https://github.com/martin-naumann/browser-payments/commit/d7885a0c49fde3751ee58l1993245ba7518ec5a4, 14 pages.

Andreas Gall, Fernando Jimenez, Mike Hanson and Kumar McMillan, Editors: Manu Sporny and Kumar McMillan, "Web Commerce API 1.0", An API for initiating commerce transactions, Draft Community Group Specification Aug. 25, 2013, https://web-payments.github.io/web-commercs-api/, 10 pages.

Winnie N.Y. Yan, Dickson K.W. Chiu, "Enhancing E-Commerce Processes with Alerts and Web Services: A Case Study on Online Credit Card Payment Notification", Proceedings of the Sixth International Conference on Machine Learning and Cybernetics, Hong Kong, Aug. 19-22, 2007, pp. 3831-3837, https://ieeexplore.ieee.org/abstract/document/4370814/.

Ayu Tiwari, Sudip Sanyal, Ajith Abraham, Svein Johan Knapskog, Sugata Sanyal, A Multi-Factor Security Protocol for Wireless Payment—Secure Web Authentication using Mobile Devices, https://arxiv.org/abs/1111.3010, 8 pages, 163-166.

S. Karnouskos, Fraunhofer Fokus, "Mobile payment: A journey through existing procedures and standardization initiatives", Fourth Quarter 2004, vol. 6, No. 4, https://ieeexplore.ieee.org/abstract/document/5342298/, 2004, pp. 44-66.

(56) References Cited

OTHER PUBLICATIONS

Amir Herzberg, "Payments and banking with mobile personal devices", Communications of the ACM, vol. 46, No. 5, https://dl.acm.org/citation.cfm?id=769801, May 31, 2003, pp. 53-58.
Artur Romao, Miguel Mira Da Silva, Alberto Rodrigues Da Silva, "Secure Electronic Payments Based on Mobile Agents", Oct. 2000, https://link.springer.com/article.10.1023/A:1008733722279, pp. 1-28.
Amir Herzberg, "Secure Communication and Commerce Using Cryptography", https://dl.acm.org/citation.cfm?id=886341, Mar. 19, 2002, Chapter 12, pp. 3-10.
K. Luttge, "E-charging API: outsource charging to a payment service provider", https://ieeexplore.ieee.org/document/915316/, May 9, 2001, pp. 216-222.
Charles Chong, Hui-Na Chua, Cheng-Suan Lee, "Towards flexible mobile payment via mediator-based service model", https://dl.acm.org/citation.cfm?id=1151504, Aug. 16, 2006, 7 pages.
M. Sirbu, J.D. Tygar, "NetBill: an Internet commerce system optimized for Network-delivered services", https://ieeexplore.org/abstract/document/403456/, Aug. 30, 1995, pp. 34-39.
M. Bellare, J.A. Garay, R. Hauser, A. Herzberg, H. Krawczyk, M. Steiner, G. Tsudik, E. Van Herreweghen, M. Waidner, Design, implementation, and deployment of the iKP secure electronic payment system, vol. 18, No. 4, Apr. 2000, https://ieeexplore.ieee.org/abstract/document/839936/. pp. 611-627.
Constantinides, Efthymios. "Foundations of social media marketing." Procedia-Social and behavioral sciences 148 (2014): 40-57, (Year: 2014).
Malaga, Ross A. "Search engine optimization—black and white hat approaches." Advances in Computers, vol. 78, Elsevier, 2010, 1-29. (Year: 2010).
Naylor, Rebecca Walker, Cait Poynor Lamberton, and Patricia M. West. "Beyond the "like" button: The impact of mere virtual presence on band evaluations and purchase intentions in social media settings." Journal of Marketing, 76.6, (2012): 105-120. (Year: 2012).
U.S. Appl. No. 61/884,926, filed Sep. 30, 2013, Khan et al. (Corres. to 2015/0095238).
U.S. Appl. No. 61/989,107, filed May 6, 2014, Khan et al. (Corres. to 2015/0095238).
U.S. Appl. No. 62/002,721, filed May 23, 2014, Khan et al. (Corres. to 2015/0095238).
U.S. Appl. No. 62/004,182, filed May 28, 2014, Khan et al. (Corres. to 2015/0095238).
www.travelocity.com, [online], Mar. 21, 2012 [retrieved from archive.org on Aug. 26, 2014].
www.tripadvisor.com, [online], Mar. 15, 2012 [retrieved from archive.org on Aug. 26, 2014].
Van den Poel, D. and W. Buckinx, "Predicting online-purchasing behavior," Jul. 28, 2004 [online]. European Journal of Operational Research 166 pp. 557-575. Retrieved from www.sciencedirect.com.
Hudaib, Adam Ali Zare. "E-payment Security Analysis in Depth." International Journal of Computer Science and Security (IJCSS) 8.1 (2014): 14. (Year: 2014).
Luttge, Karsten, "E-charging api: outsource charging to a payment service provider", Intelligent Network Workshop, 2001, IEEE. (Year: 2001).
Kraft, Ben; Mannes, Eric; and Moldow, Jorday, "Security research of a social payment app.", 2014 (Year 2014).
Constantinides, Efthymios, "Foundations of Social Media Marketing." Procedia-Social and Behavioral Sciences, 148, (2014), pp. 40-57.
Lopes, Christian T., et al., "Cytoscape Web: an interactive web-based network browser," Bioinformatics—Applications Note, vol. 26, No. 18, pp. 2347-2348, 2010.
Dogru, Tarik, et al., "Blockchain Technology & it Implications for the Hospitality Industry," Boston University, Winter 2018.
Miraz, Mahdi H., et al., "Analysis of Users' Behaviour and Adoption Trends of Social Media Payment Platforms," 2019 International Conference on Computing, Electronics & Communications Engineering (iCCECE), IEEE, 2019.

\* cited by examiner

YOUR ORDERS

| Orders | Open Orders | Digital Orders | canceled Orders ~ 3502 | | Search Orders |

40 orders placed [in past 6 months ▲▼] [By Media] [By List] [By Merchant] [Delivery Date] ~ 3504

ORDER PLACED    TOTAL    SHIP TO:                ORDER # 102-5578980-8043447
June 20, 2016   $23.26    Thomas M. Isaacson ▽ ~ 3506    Order Details   Invoice
By: Google   Merchant: Joes Sporty Goods Delivered Wednesday            3508 ~ [Track package]
Your package was left in the mailbox.            [Return or replace items]

 2 of Crosman AirSoft 5,000 ct Bottle White Heavy AirSoft BBs (20grams)   [Leave package feedback]
Sold by: Hello.com LLC                                                   [Write a product review]
$10.97    [Buy it Again] ~ 3510                                     [Archive order]

ORDER PLACED   TOTAL    SHIP TO:               ORDER # 102-7086474-0013842
June 4, 2016    $127.86   Thomas M. Isaacson ▽    Order Details   Invoice
By: Facebook    Merchant: Walmart Delivered June 6, 2016                                     [Track package]
Package was left on an outside porch                 [Return or replace items]

 Umarex Walther 2262020 15 Rounds P99 Air Soft Pistol, 6mm Black
Sold by: Amazon.com LLC                                  [Leave package feedback]
$63.65    [Buy it Again]                                       [Write a product review]

 Crossman 12gm CO2 Powerlet (60-Count)               [Archive order]
Sold by: Walmart.com LLC
$34.99    [Buy it Again]

SYSTEM AND METHOD FOR PROVIDING A BROWSER API FOR MANAGING PRODUCT PURCHASES

PRIORITY CLAIM

This application is a continuation of U.S. patent application Ser. No. 16/445,297, filed Jun. 19, 2019, which is a continuation of U.S. patent application Ser. No. 16/279,685, filed Feb. 19, 2019, which is a continuation-in-part of U.S. patent application Ser. No. 16/126,541, filed Sep. 10, 2018, which is a continuation-in-part of U.S. patent application Ser. No. 15/947,395, filed Apr. 6, 2018, which is a continuation-in-part of U.S. Nonprovisional patent application Ser. No. 15/720,878, filed Sep. 29, 2017, which is a continuation-in-part of U.S. Nonprovisional patent application Ser. No. 15/263,057, filed Sep. 12, 2016, now U.S. Pat. No. 9,824,408, issued Nov. 21, 2017, which is a continuation of U.S. Nonprovisional patent application Ser. No. 15/018,954, filed Feb. 9, 2016, now U.S. Pat. No. 9,734,526, issued Aug. 15, 2017, which is a continuation of U.S. Nonprovisional patent application Ser. No. 14/853,579, filed Sep. 14, 2015, now U.S. Pat. No. 9,396,491, Issued on Jul. 19, 2016, which is a continuation of U.S. Nonprovisional patent application Ser. No. 14/822,368, filed Aug. 10, 2015, now U.S. Pat. No. 9,292,871, Issued on Mar. 22, 2016, which is a continuation of U.S. Nonprovisional patent application Ser. No. 14/672,876, filed Mar. 30, 2015, now U.S. Pat. No. 9,361,638, Issued on Jun. 7, 2016, which claims priority to U.S. Provisional Patent Application No. 61/973,287, filed Apr. 1, 2014 and also is a continuation-in-part of U.S. Nonprovisional patent application Ser. No. 14/230,864, filed 31 Mar. 2014, now U.S. Pat. No. 9,430,794, Issued on Aug. 30, 2016, and also claims priority to U.S. Provisional Patent Application No. 61/972,843, filed Mar. 31, 2014, U.S. Provisional Patent Application No. 61/972,834, filed Mar. 31, 2014, U.S. Provisional Patent Application No. 61/972,848, filed Mar. 31, 2014, U.S. Provisional Patent Application No. 61/972,865, filed Mar. 31, 2014, U.S. Provisional Patent Application No. 61/972,879, filed Mar. 31, 2014, U.S. Provisional Patent Application No. 61/972,861, filed Mar. 31, 2014, U.S. Provisional Patent Application No. 61/972,878, filed Mar. 31, 2014, U.S. Provisional Patent Application No. 61/972,892, filed Mar. 31, 2014, U.S. Provisional Patent Application No. 61/972,890, filed Mar. 31, 2014, the contents of each of which are herein incorporated by reference in their entireties.

BACKGROUND

1. Technical Field

The present disclosure provides a novel application programming interface which defines the protocols to communicate payment related data between a site and a browser for communicating and processing payment information to simplify the purchasing process for users.

2. Introduction

This application addresses a number of issues related to simplifying and managing on-line purchases of products. The first issue relates to the long-felt problem of requiring users to enter in payment data such as credit card information and a user address when making a purchase. Some sites like Amazon.com provide a "one-click" purchasing option but those simplifications are only available in the controlled Amazon.com environment. For all the other merchants, users much inter in their payment data which is cumbersome. Mobile users outside of Amazon.com still need to include and enter in much information which reduces the number of conversions when making purchases on line either on the desktop or mobile devices.

The present disclosure also addresses an issue in the art that arises through the use of buy buttons on disparate platforms. None of this introduction is meant to characterize "prior art" as the present application claims priority to applications discloses various implementations of buy buttons on search engines, social media, and so forth. Thus, none of the discussion in this application should be considered as the applicant admitting any subject matter herein is prior art.

Given the advent of buy buttons available on such sites as google.com, facebook.com, instagram.com, pinterest.com, bing.com, yahoo.com, youtube.com, amazon.com and twitter.com, there is a challenge that arises in terms of tracking purchases. A user may make a purchase of a first product on facebook.com and the next day purchase a second product on google.com. To enable such purchases, the sites like google.com will maintain purchase information like credit card or payment account information, or an interface with PayPal® or Apple Pay will be provided such that purchases can be easily processed. While these buy buttons are expanding, there is no existing mechanism of harmonizing or organizing those purchases such that users can easily manage purchases. The user may forget where they made the purchase and feel frustrated when they cannot manage the purchases or review their purchase history. For closed aggregated merchant sites like www.amazon.com, wherein the purchases are controlled through a single site with multiple merchants making their products available to such a site, the ability to manage the user account and history of purchases is easier.

However, the goal of buy buttons on various sites is the enable purchases in those "micro-moments" when a person might be on facebook or instagram and see something they might want to buy. The benefit of the buy button incorporated into these various traditionally non-merchants sides is to take advantage of the ease of purchasing from sites where people spend time, such as google.com and social media sites. However, as noted above, by presenting the buy options at those locations to take advantage of such micro-moments, makes the follow up management of various purchases more difficult because the purchases are spread across disparate sites that are not coordinated.

SUMMARY

The present disclosure addresses the need to improve the purchasing experience of users on the Internet. Form filling shopping cart purchasing models require too much user input and interaction and reduce the number of conversions by users actually completing the process to make a purchase. Disclosed is an updated browser having an API for communicating payment data between the browser and a site for processing payments of purchases and to reduce the number of user interactions needed for a purchasing process. The method includes receiving, via the user interface, an interaction by a user with an object associated with a site, the interaction indicating a user intent to make a purchase, receiving, based on the interaction and via an application programming interface, a request from the site for payment data in connection with the purchase and transmitting, to the site and via the application programming interface, the payment data, wherein the payment data confirms the purchase or can be used to process or deliver a product associated with the purchase.

This application includes the disclosure of buy buttons and APIs for enabling a "one-click" type of purchasing experience that eliminates the purchasing process from requiring overly burdensome form-filling. In another aspect of this disclosure, an API for communicating data between a browser or agent and a merchant site for pre-filling in fields to make a purchase is disclosed. The process can further be refined to not just include filling in pre-set fields but further streamlined to reduce the need for interactive steps for the user. The API approach can provide the merchant site with data that can be more advanced than merely automatically filling in a form that is the same form a user would manually have to input. A method includes presenting an input field on a user interface of a generalized search entity, wherein the generalized search entity processes data using a generalized search engine that indexes and searches both merchant sites and non-merchant sites, receiving user input in the input field, wherein the user input comprises a text-based query, correlating the text-based query against a product database of products for sale from merchants to yield a correlation, and determining, based on the correlation, that the user input is associated with one of a search intent and a purchase intent to yield a determination. When the determination indicates the search intent: presenting a search result comprising a non-merchant site, receiving a search interaction associated with the non-merchant site, and transitioning to the non-merchant site. When the determination indicates the purchase intent: presenting a purchase-related search result comprising a buy option associated with the user input, wherein the purchase-related search result is configured such that when a user interacts with the purchase-related search result and confirms a purchase via interacting with the buy option, the generalized search engine (or some other payment service) participates in processing a purchase of an item, and receiving an interaction associated with the purchase-related search result.

The method can further include receiving an interaction with the buy option and managing the purchase of the item based on payment information stored at the generalized search entity (or some other payment service), wherein delivery of the item is handled via a merchant site separate from the generalized search entity. The generalized search engine (or browser) participates in processing the purchase of the item by receiving a request for payment data from a merchant site via an application programming interface and transmits the payment data to the merchant site such that the merchant site can process the purchase of the item.

In another aspect, a method includes presenting an input field on a user interface, wherein the input field is associated with processing data using a generalized search engine that indexes and searches both merchant sites and non-merchant sites, receiving user input in the input field, wherein the user input comprises a text-based query, correlating the text-based query against a product database of products for sale from merchants to yield a correlation and determining, via a processor and based on the correlation, the user input is associated with one of a search intent and a purchase intent to yield a determination. When the determination indicates the search intent: presenting a search result comprising a non-merchant site, receiving a search interaction associated with the non-merchant site and transitioning to the non-merchant site. When the determination indicates the purchase intent: presenting a purchase-related search result associated with the user input, based on an interaction from a user with the purchase-related search result which results in a presentation of a buy button, managing, at least in part, a purchase of an item associated with the buy button by receiving a request for payment data through an application programming interface and transmitting, based on the request, the payment data via the application programming interface to a merchant site for processing the purchase of the item. The method can include transitioning to the merchant site associated with the buy button based on the interaction from the user, wherein the merchant site processes the purchase of the item based on the payment data transmitted to the merchant site.

Yet another aspect relates to processing from the browser or search engine side when communicating payment data via an API to a merchant site. The method includes presenting, on a graphical user interface, a presentation, the presentation being received from a site over a network, receiving, via the user interface and from a user, an interaction with the presentation, receiving, via an application programming interface, a request from the site for payment account data for the user and transmitting, to the site and via the application programming interface, the payment account data, wherein the payment account data can be used to populate payment fields for payment processing on the site, or perform more advanced processing using the payment data to simplify the user interaction. The presentation can include one of a product for purchase and a service. The method can include the site processes a payment for an item or a service using the payment account data for the user to make the payment. The graphical user interface can be associated with a browser or an application. In one aspect the API that communicates data between the site (merchant site) and a browser that can store the payment account data for the user.

The method can further include updating the presentation to include a buy option which is configured, based on a confirmation from the user, to enable the site to utilize the payment account data received through the API to process a purchase of an item or service without a need of the user to fill in the payment fields on the site. The browser or other agent communicating via the API can also provide the graphic for a "pay now" type of button to integrate with site graphics. The payment account data can further include one or more of address data for the user, a payment account number, an expiration date, a security code, a cardholder name and shipping instructions for the user.

The request through the API can further include one or more of a supported payment method for the site, a total amount value for a purchase, items that may be displayed for purchase, shipping options, payment modifiers, a request for a user email address, a request for a user's phone number, and a request to update information. A user agent similar to or separate from the browser can communicate the payment account data between the application programming interface and the site.

In another aspect, the method includes the concept from the standpoint of the site. The method in this context includes transmitting, for viewing on a graphical user interface, a presentation, the presentation being transmitted from a site over a network to a device having the graphical user interface, receiving, via the network and from a user, an interaction with the presentation, transmitting, to an application programming interface, a request for payment account data of the user, receiving, at the site and via the application programming interface, the payment account data and populating payment data fields associated with a payment process with the payment account data for the user to yield populated payment data fields. The site can process a payment for an item or a service using the payment account data for the user. The API can coordinate data between the browser and the site wherein the browser stores the payment account data for the user. Upon receiving a confirmation from the user to make a purchase of an item or service associated with the presentation, the method can include processing a payment for the product using the populated payment data fields.

The method can further include, upon receiving the payment account data, updating the presentation to include a buy option which is configured, based on a confirmation from the user, to enable the site to utilize the payment account data to process a purchase of a product or service without a need of the user to manually fill in the payment data fields on the site. The payment account data can further include one or more of address data for the user, a payment account number, an expiration date, a security code, a cardholder name and shipping instructions for the user. The request can further include one or more of a supported payment method for the site, a total amount value for a purchase, items that may be displayed for purchase, shipping options, payment modifiers, a request for a user email address, a request for a user's phone number, and a request to update information. A user agent can also communicate the payment account data between the application programming interface and the site. In another aspect, a method includes presenting, on a graphical user interface, a presentation, the presentation being received from a site over a network, receiving, via the user interface and from a user, an interaction with the presentation, receiving, via an application programming interface, a request from the site for payment account data for the user, autopopulating a payment field associated with the presentation with the payment account data and transmitting, to the site and via the application programming interface, the payment account data, wherein the site can process a payment based on the payment account data for the user. The method can also include receiving a confirmation from the user of a purchase after the payment field is autopopulated.

The present disclosure also addresses the problem of providing a similar customer service to managing a user account of on-line purchases, such as is offered by amazon.com, but expanded to correlate purchases across multiple different venues such as google.com, facebook.com, amazon.com, and so forth. Disclosed is an API that is designed to communicate information to and from multiple different types of sites that now manage purchases. For example, the API can receive conversion data about purchases made through the Google Buy Button (Purchases on Google), the Facebook Buy Button, the Pinterest Buy Button, Amazon.com purchases, and so forth. A purchase management engine receives the various pieces of data and correlates the data into a single user account that spans multiple purchasing platforms. The present approach differs from the amazon.com user account because that account is maintained only for purchases made at amazon.com and not for purchase from different types of sites such as google.com or facebook.com. However, the correlated data could show up and be transmitted to an interface like amazon.com such that in addition to all of the advantages of managing purchases on amazon.com, the user account of amazon.com can also be populated with google.com, facebook.com, instagram.com, pinterest.com, youtube.com, and other site purchases. The complete correlated data can actually be presented at any of the traditional non-merchant sites, individual merchant sites (like walmart.com or widgets.com) as well as amazon.com. The way the correlated data is presented is user-definable as it is with amazon.com with addition of features that are not contemplated by amazon.com, such as which buy button site the purchase was made from. Thus, the user interface could present products purchased from google.com, followed by facebook.com, followed by amazon.com.

Thus, the concepts disclosed herein expand upon the "micro-moments" from involving just the moment when someone wants to make a purchase but expands the opportunity. The micro-moment a user may experience can perhaps be a desire to cancel a purchase made the previous day, or to buy another product like the one purchase yesterday. In this manner, through a drop down menu on a site, or positioned near a buy option, the system can present a "user account" access option which enables the user to jump into their account and make further change/modifications. Because of the correlation and the API, the modifications can easily be made across all platforms. Thus, on one user interface, the user could buy an extra widget in addition to the one purchased via Google's Buy Button the day before, as well as cancel the purchase made that morning via facebook.

Because the purchases described above are often coordinated between a site (google, facebook, apple pay, etc.) the merchant (which may or may not handle the payment but typically handles the delivery), a delivery service (Federal Express, UPS, etc.) the present API will interface with multiple different sites and service providers as necessary to coordinate whatever action needs to take place. Thus, one or more of the following actions can be divided up on either side of the API between the purchase management engine, a merchant, amazon.com (or the like), and the buy button site (google, facebook, instagram, etc.): (1) processing an additional purchase; (2) canceling a purchase; (4) implementing a buy it again choice; (5) providing a return of the product; (6); writing a product review; (7); tracking a package; (8) altering a delivery schedule; (9) changing a payment method; (10) lodging a complaint; and (11) transmitting a notification of any action taken to one or more of the buyer, a recipient, a merchant, a delivery provider, a buy button site, and more.

The product management engine can coordinate the various actions that need to take place across the different platforms. Thus, if a user, via a facebook site, goes to their user account and cancels a purchase, the product delivery engine can coordinate the various actions such as notifying the merchant, the site, the delivery service, and so forth, to implement the action.

In another aspect, the knowledge and data that is gained through management of products via the product management engine can be provided further to advertisers who can then more intelligently provide advertisements or buy button options through any of the sites.

The "account button" from which a user can access the user account can also be presented creatively to the user. For example, when a buy button is presented as disclosed herein, a "manage purchases" or the like can be presented as well. Such a button can also be offered one or more layers into the process. For example, often when a buy option is interacted with, the user is presented with more details about a product, information about the merchant selling the product, and an opportunity to buy through the buy option (using purchase account information stored elsewhere from the merchant site as disclosed herein). At this stage (after interacting the buy option but before actually converting into a complete purchase), the "manage purchases" option can be presented as the user is know to be in the mode of considering a purchase and they may want to check/manage their purchase history.

Information from their purchase account can also be used to perhaps tailor the advertisements or presentation of the response to their interaction with the buy option.

BRIEF DESCRIPTION OF THE DRAWINGS

FIG. 35 illustrates another example of an account interface for the purchase manager.

DETAILED DESCRIPTION

Figure 1:
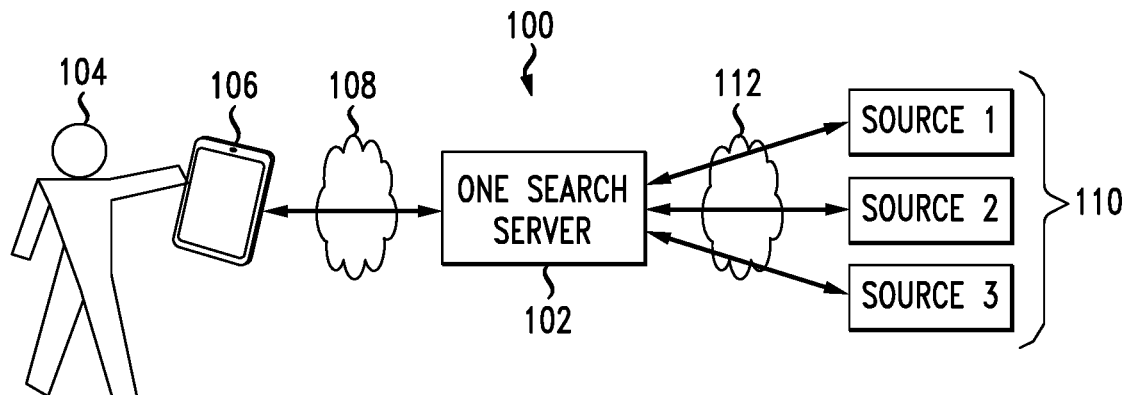
FIG. 1 illustrates a system architecture.

A system, method and computer-readable storage devices are disclose which unify access to multiple websites or other information sources such that the user only needs to visit one location, and utilize one input search field to achieve a number of different potential results such as doing a search or purchasing a product. That one location can be a website, a search bar in a web browser, an application on a desktop, laptop, smartphone, tablet, or other mobile device, etc. Rather than navigating to a website to perform a search in the context of that website, a user can instead navigate to or open a generalized search field. The search field can provide access to a search engine that crawls and indexes other websites at a large scale, such as the search engines provided by Google™, Yahoo™, or Bing™. In one example, "at a large scale" can mean crawling and indexing at least 25,000 different domains. The search field can be applied to larger or smaller crawling domains. Thus, the generalized search engine can provide a primary function of serving results in response to search queries, while simultaneously provided a secondary function of identifying searches that may indicate a user's intent to make a purchase and providing quick and easy access for the user to act on that intent.

Via the generalized search field, the system can implicitly or explicitly process and analyze the input from the user and the resulting context. The system can also analyze based on a corpus of existing context for the user, such as recently viewed or opened web pages, recent actions the user has performed on the computing device, calendar information for the user, location data, recent purchases or other transactions, social networking data including posts, messages sent to friends, birthdays of friends, and so forth. The system can incorporate, as a data source, any information that can provide direct or indirect context for understanding or processing the input. For example, previous search history or purchasing history can provide direct context, while social media posts of friends of the user can provide indirect context.

Thus, the user goes to the website second, after the search is entered. This approach reduces the number of interactions, starting when the user opens a browser or application, to get to a webpage to make a purchase or a webpage of search results. In another aspect, drop down or drop "up" menus provide a much more rich opportunity for processing options such as one-click purchases or searching particular websites such as eBay® using the text input as search data. These drop down or drop "up" menus can be based on the location of the search input box, a search button, or some other element in the user interface. In yet another aspect, the generalized search field can still provide 'traditional' search results from one or multiple search sources, but can present, in addition to the traditional search results, one-click actions that the user can use, for example, to make a purchase directly from the listing of search results.

Various examples of the disclosure are described in detail below. While specific implementations are described, it should be understood that this is done for illustration purposes only. Other components and configurations may be used without parting from the spirit and scope of the disclosure. When specific method examples are discussed, the various steps of the method examples can be implemented in different orders, combinations, or permutations, including additional steps, or excluding specific steps.

The present disclosure overcomes the above-indicated deficiencies in current search implementations by providing a unified search field that enables a user to provide user input and achieve, in very few steps, one of a set of goals, such as completing a purchase, executing a search, executing a program, or interacting with an online service. The user can provide the user input as text, or in any other suitable form including multimodal input, gesture input, voice input, etc. When the disclosure refers to "input text" or "text" from the user, it is understood that the input can be provided as text or via some other input modality. The system can process the user input using traditional options such as a web search, but additionally, the system can process the user input to identify, present, and/or execute purchasing options or more focused searching options on other websites. The system can present these options in a tag cloud or drop down or drop up or drop sideways menus as the flexibility of the processing of the user input expands.

The basic concept according to a first example is illustrated below. Assume that an example website www.one-search.com includes a user interface with an input field or search field. The input field can be a text input field, or can be a voice input field that utilizes speech recognition to populate the field with text from recognized speech, for example. The field is not just a search field but is a more generic input field from which multiple functions can be performed based on a determined intent of the input provided by the user. The search field is different from other search fields in how the www.one-search.com search field processes input. Usually, a person goes to the webpage, then searches, or chooses a search website, and then the search field is conditioned with a particular website context for searching. In this disclosure, the search context is open when the user enters data into the generalized input field. There is no presumption or setting that it will be a Google search, or an Amazon search. The resulting context will be dependent on an analysis of the input. The user interface can include a number of different search or processing buttons, each of which can expand the types of processing to perform on the input text. Different types of the buttons can include a Google search button, an Amazon search button, an Amazon one-click purchasing button, and an Apple.com purchasing button. The system can establish and provide the various button types in advance. Alternatively, a user can set up a collection of personalized buttons for tasks that the user desires or expects to perform with some regularity. The system can generate and present these buttons based on general search and activity trends of users, current promotions, advertisers paying for placement, and so forth. In place of or in addition to buttons, as the user types input into the field, the system can present "peeks" into various webpages which can be destinations for the users whether it is a search result, a purchase, an auction, or any other website destination. In this regard, rather than go to the website first, and then enter a search into a search field, this disclosure focuses on entering data in a general input field and then going to the website, or making the purchase, and different ways of processing that more improved input.

It is presumed, such as in the case of Amazon or an auction website, that when the user navigates to one-search.com, that user information, debit/credit card information, address information, etc., is stored in a user profile and available, as in the case of a registered user at Amazon.com. For example, as part of a registration or enrollment process, the user can establish an account with one-search.com, and authenticate or provide credentials to link the one-search.com account with accounts at other websites. So, as part of creating an account with one-search.com, the user can provide credentials for Google.com, Amazon.com, ebay.com, newegg.com, thinkgeek.com, and cheaperthandirt.com. Alternatively, the user can 'link' the accounts without providing credentials. For example, the user can authorize Amazon to share all or part of the user's information associated with his or her Amazon profile without providing the Amazon credentials to one-search.com.

Then, when the user performs searches at one-search.com, the system can use the existing linked accounts to generate one-click actions, or one-function (speech, gesture, multimodal input, etc.) actions. For example, one-search.com can perform a purchasing action when the user interacts with a presented buy option. The user can then manage linked accounts via a user portal or user management interface, to link additional accounts, update credentials, remove linked accounts, or manage which portions of the linked accounts are shared with one-search.com. Some websites may not require a linked account, but can still be incorporated into the one-search.com search field. This can be accomplished by processing a payment for an item associated with that merchant via the one-search.com registered account and enabling the merchant to handle the delivery. Some e-commerce sites allow purchases with a guest account, in which case a one-search.com action can include navigating to the e-commerce site, adding a desired item to the cart, providing sufficient information about the user, such as payment information, a delivery address, etc., to complete the purchase. In another example, some websites, such as a search engine, can be enhanced when linked to an account, but do not require a linked account. In these situations, the user can decide whether to link an existing account with the search engine for processing purchases, or whether to use the search engine without a linked account.

The one-search.com website can inspect and use browser cookies from other sites to glean user data, glean search history, or any other information stored in or made available via cookies. The system can, for example, use a session cookie to determine that a user has or had an active session with a particular website, and can use information in the session cookie to construct a URL for a one-click page to execute a purchase in response to user provided input. Alternatively, the system can use the live session to negotiate the website, add a desired item to a shopping cart, populate payment and shipping information on behalf of the user, and present to the user the final stage in the checkout process so the user can simply click once on a "submit order" button, or hit "enter" in the one-search.com unified input field to complete the purchase. In this way, the number of steps from search to purchase (or from search to performing some other action), is drastically reduced. While many of the examples provided herein discuss making a purchase, the principles disclosed herein can be applied to other, non-purchase transactions as well. For instance, in much the same way that the system can navigate to a website, populate a shopping cart with an item, and fill in shipping and payment information on behalf of the user, the system can also navigate to some other website for a result that requires a set of information to be provided. If the user enters the text "Why did my credit score just drop?" in the input field, the system can identify one of the major credit reporting bureaus, a third-party credit report aggregation service, or a free credit report site. The system can automatically provide the necessary information, on behalf of the user, to get to the credit score information, and present that page as a potential result or as an option in response to the user input. Many similar tasks on the World Wide Web require navigation from one page to the next to the next, and input in response to various questions. The one-search.com system can shorten or automate the input required from the user to navigate through these series of web pages to obtain a desired piece of information, a desired action, or a desired outcome.

Figure 2A:
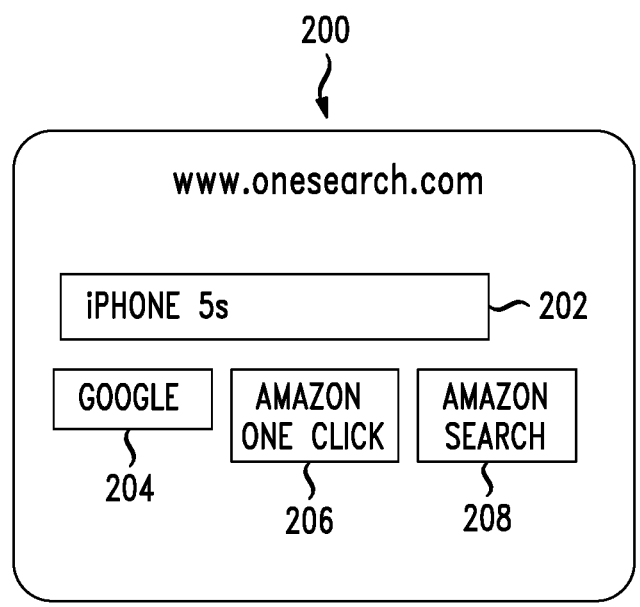
FIG. 2A illustrates an example search field.

FIG. 2A depicts an example search or input field. In this initial example, the user enters a term in the input field of one-search.com, such as "iPhone 5S 32 GB silver." At this point, the user can click on any number of options for processing the input, such as a Google search 204, an Amazon.com one-click purchase button 206, or an Amazon.com search 208 button. In this example, the user clicks on the Amazon.com one-click purchasing button 206. Thus, from this field, the system receives that input, processes the input, and can execute a purchase, just as though the user had navigated through Amazon.com to an iPhone 5S, having 32 GB of storage, and a silver color, and had just clicked on the one-click purchase button. However, in this first example, the user did not need to navigate to Amazon.com but rather was able to make a one-click purchase from a separate website, namely the one-search.com website. In one aspect, the user does not even need to click a particular button, and can instead simply hit "enter" as the user would to execute a normal search request. From that, the system can analyze the text input to determine if a probability of the user desiring to make a one-click purchase is above a certainty threshold, and the system can then process an "enter" input as a request to execute a purchase.

The system can process the input according to the button clicked, as though the user entered the text into an input directly at Amazon.com or Google.com and simply clicked search. If the user clicked a Google search 204, then the system would return search results from Google, but could similarly provide search results from Bing, Yahoo, or some other search engine. In one aspect, the system can transfer the user to Google.com, cause a search to be performed using the user's search input, and present the results as though the user had initially done the search at Google.com. In another aspect, the system can generate a URL at google.com as if the user had performed the search using the user's search input, and open that URL at google.com for the user. If the user selects a one-click purchase 206, then the system processes a purchase and delivery of the item through Amazon.com as though the user had navigated via Amazon.com to the item and made the purchase. In other words, the functionality of the "enter" button can be modified (dynamically, and several times) based on an analysis of the user input. Based on a variety of factors, the initial default might be a purchase context, but then the user starts to enter data and the context may change to a web search, and then finally when the user is done entering input, the "enter" button may cause processing associated with mapping, or back to a purchase context.

If the user selects an Amazon.com search 208, then the system returns a view of the search results on Amazon.com for that phrase. In other words, the user could be transferred to Amazon.com, logged into their account or joined into an existing session for the account, and presented with a screen which is the equivalent (or essentially or functionally equivalent) of the state as though the user had searched Amazon.com for "iPhone 5S 32 GB silver." From that state, the user could peruse the returned list of items and then perhaps choose an item, at which point the user could "one-click" purchase an iPhone. Transitioning a user deep into a separate site preprocessed to a certain state can be called a deep link. This is where you do not transfer them to the highest level of the site (such as to www.amazon.com or www.merchant.com) but rather you preprocess the transition so that the user is brought to a deeper portion of the site (such as www.merchant.com/products/hats/greenhat) where they can more quickly be situated to make a purchase immediately or in very few clicks.

Indeed, in one example, the system can redirect the user to Amazon.com (or navigate to Amazon.com on behalf of the user) in the same manner as if the user had started at Amazon.com and entered the search terms. In this case, the algorithm of one-search.com would receive the search input, receive the desired instruction from the user (by clicking on the Amazon.com search button) and transition the user to Amazon.com. User registration information or web browsing state information stored in a cookie or elsewhere or sent via XML can also be read or transferred such that the user is logged into their Amazon.com account in the transition. Data can be stored with one-search.com or with a browser or app. The result of this process is that when the user opens a browser to start browsing the Internet, the system enables the user to initiate any number of searches, purchases, or other actions via a single, unified input field that requires fewer clicks or user input to get to search results, or to make a purchase.

Another example simplifies the process even further. Typically, as described above, a website such as Google or Amazon has a single-purpose entry so that the user can click "enter" and the received meaning of that is to process the text in the input field as a Google web search or as an Amazon product search. In this second example, the search field has multiple possible ways of processing the text in the input field. An algorithm analyzes and processes the input to determine or predict the meaning or user intent of the text input. Via such an analysis, the system determines what type of search or action the user wants. Thus, if the user types "Olympics" into a search field at one-search.com, the system can determine via the algorithm that user is unlikely to want to search Amazon.com or eBay for "Olympics" because the Olympics is not something available for purchase. However, if the user enters additional information, such as "Olympics windbreaker Sochi 2014," the system can revise the determination of intent, because the additional information input by the user is now directed to a specific item or category. Thus, the system can continuously evaluate or determine intent of the user based on the text or data provided. The system can reevaluate intent as each character or word is input, for example. The system can anticipate intent and cache or pre-load results or actions for a number of anticipated intent scenarios based on context information for the user and the data provided so far. Thus, if the anticipated intent (i.e., Google search versus an Amazon purchase versus an Amazon search) turns out to be correct, the system already has the components in place or the pages fetched to service that intent.

The system may utilize any type of data such as user profile data, social media data, historical data, time of year (holidays are coming, summer time, a friend or family member has a birthday in one week, etc.), to make this determination. In this example, the system may determine when the user clicks on "enter" that the user intended a Google search for that input. For example, if the user types "Paul Revere American revolution," the system can detect that the semantic content and the structure of the text is more closely aligned with an informational search instead of a product search, and can route the search text through a search engine. In that case, the primary results as though the user had entered a Google search are presented. The one-search.com results screen could also provide alternates in case the user actually desired a Bing search or did want an Amazon.com search. If the user enters that information into a search field at one-search.com, the system can cause the browser to navigate to google.com, upon the user pressing enter, as if the user had searched at Google originally for the search string. Alternatively, the system can load the corresponding Google search page in an iframe or other embedded mechanism in a webpage, or as a new tab or window. The system can utilize any of a number of various transitions to present the Google search page to the user, even though the user initiated the search at the one-search.com page.

On the other hand, if the user enters "Revere tea kettle," the system can analyze the input text to determine that the user likely desires to make a purchase. Thus, when the user hits "enter," the system can route the search to Amazon or another suitable e-commerce site, or can immediately execute a one-click purchase from Amazon based on the search. Upon determining that the user intent is a purchase, the system can perform an analysis of or rely on a previously performed analysis of the user's purchasing habits or other purchase related information such as lowest price, lowest price plus shipping, availability, shipping time or method, user membership in a shopping club, whether the user has an account with an online merchant, and so forth. Based on this analysis, the system can determine which retailers are above an intent threshold, and provide the user with ways to easily access those retailers. The system can sort the retailers in an order of likelihood to be what the user desires, and can restrict the list of retailers presented to the user. For example, the list can be restricted based on a price spread, available screen space to present options to the user, or other factors.

In an example of these principles, the user enters the text "large supreme pizza" into the one-search.com input field. The system can analyze the user's browser history, previous queries at one-search.com, user accounts at various pizza delivery places, a location of the user and nearby pizza delivery places, credit card transaction data of pizza purchases, and so forth. Based on this information, one-search.com can, before the user presses enter and/or mid-query, determine that Dominos, Papa Johns, and Pizza Hut are nearby, are open, and that the user has made purchases with them in the past 6 months. Then, the system can present a preview of each of these merchants so that the user can simply click once to place an order for a large supreme pizza. The one-search.com system can display the logo of each pizza merchant, with a summary of the order that would be placed and the associated cost if the user clicks on the logo. For example, the system can display, below the Dominos logo, "16" large supreme pizza, $16.24, delivered to 123 Fake Street, Springfield, Ohio. Delivery by 6:15 pm." Then, the user can click on the Dominos logo to place the order, or the user can interact with the one-search.com page or Dominos webpage directly to modify various aspects of the order before placing the order. The one-search.com system can dynamically update the previews as the user types additional information in the search field. The one-search.com system can further provide an indication of a 'default' action that will be executed if the user presses "enter" on the keyboard. In this way, when the user is satisfied with the default result, or only one result remains after the user inputs the text, the user can simply press "enter" and the system can execute the action, such as placing an order for pizza.

In another example, the user enters the term "iPhone 5S 32 GB silver" into one-search.com. The system can analyze the text, to determine that this search is clearly directed to a product based on the specific amount of detail to identify one or a few items that could be purchased. Further, if the search is executed on December $8^{th}$, then the system can be especially tuned to be more sensitive to recognize purchase requests due to the gift giving atmosphere surrounding Christmas or other holidays. The algorithm can analyze previous searches for various iPhones to determine which, based on running the algorithm, would result in a threshold value being passed that there is a high likelihood that the user desires to purchase this product rather than just search for it. When the user hits "enter," the system processes that input as though the user was viewing the iPhone 5S 32 GB silver on Amazon.com with the option to make a "one-click" purchase. Here, by entering that data into the one-search.com field, and clicking "enter", the system can, on behalf of the user, implement the steps at Amazon.com as if the user had completed a purchase of the item. The system can perform these actions via HTTP requests, as if the user had navigated to the website and entered the information herself, or the system can communicate with the various web services via their established APIs. The system can notify the user that the order has been placed, and provide any shipping or order details to the user. Alternatively, the system can transition the user directly to an Amazon.com environment or present a user interface notifying them that the purchase is being processed by a website that processes via user profile data a purchase and delivery of the product as can be done at Amazon.com or by Apple.com, etc.

In one example, the user can confirm the order before the system places the order on behalf of the user. In another example, the system places the order automatically for the user, and the user can choose to accept the order by doing nothing or choose to reject or modify the order by providing some input, such as clicking a button or opening an order page in a new tab or new window. In one example, the system may have placed an order for a silver iPhone 5S, but the user changes his or her mind and wants to order a gold iPhone 5S. The user can modify the order directly at one-search.com, or one-search.com can redirect the user to Amazon.com to modify the order. Sellers can compete for the business of processing this input, and the system could report on who bid for the lowest price. The system can provide the user with an 'out' by cancelling the purchase within a certain amount of time. In a similar manner, the system can detect that a user has just placed an order for an iPhone 5S, and implement a 'cool-down' period, during which the system will not automatically order an additional iPhone on behalf of the user without some additional or explicit approval from the user.

The system can cap or confirm orders that appear to be erroneous or unintentional. For example, if a new user does not realize how the system works, he or she may search for an iPhone 5S 32 GB silver multiple times, and inadvertently order multiple telephones. The system can have a built-in mechanism to detect such potentially unintentional purchase patterns, and incorporate some heightened level of user approval or confirmation before proceeding to make purchases on behalf of the user when such patterns are detected. The user can establish security measures or purchase limits on the account, so that a child or unauthorized person is unable to make purchases above a specific spending limit, or so that purchases above a threshold require authentication via email or text message or some other mechanism. If the system detects an unauthorized purchase, the system can temporarily stop or prevent purchase transactions altogether for the entire one-search.com account, or for specific log-in locations.

Using the "enter" button and processing the input based on a predicted intent can result in ambiguities. When a user searches via Amazon.com for a product, the user navigates to the right model with the desired size, color, carrier, and so forth. Then when the user makes an Amazon.com one-click purchase, the user knows all of the data about the product before making the purchase. In the model disclosed herein, the system can also deal with product ambiguity. Assume the user enters "iPhone 5S 32 GB" at one-search.com, and that the available colors are black, silver, and gold. The algorithm determines, based on the input text, that the user likely desires to make a purchase and processes the input text accordingly. The system can select the most popular color and fill in that unknown parameter accordingly. The system can select not only the most popular model based on popular size and color, but the system can incorporate demographics data to determine the most popular model for people similar to the user. For example, if the user enters "iPhone 5," the system can select a yellow 16 GB iPhone 5C for a teenage girl, or a black 64 GB iPhone 5S for her father. The system can further analyze past purchases of similar or related devices to determine likely user preferences for this purchase. If the user is already registered, and via the browser, application or website, the system knows who is doing the search, then user preferences, history, classification model based on previous searches across multiple websites, etc. can be applied to analyze the one-search input field. If the user has made electronics purchases in the past that are all silver, the system can assume that the user is likely to want a silver iPhone 5S, and populate the cart accordingly. Similarly, if the user has consistently purchased the largest storage capacity model in previous purchases of mobile devices, the system can automatically populate the cart with the iPhone 5S with the largest storage.

Returning to the above example, the user clicks "enter" and the system presents a user interface screen that states "You have purchased the black iPhone 5S 32 GB—if you want silver instead, hit enter." In other words, the system can choose the most popular color, and present an option to change a parameter such as the color via hitting "enter" again. This second hitting of "enter" cancels the previous order of the black iPhone and replaces it with a silver one, or the system can simply update the purchase request. At that point of time in the process, it is as though the user had been viewing a silver iPhone, with the right features, and hit the one-click purchase button such that no other action needs to be taken to have it charged and delivered. The system can integrate with the merchant via an API to place a hold on a particular item, such as the black iPhone 5S 32 GB, while waiting for a period of time to allow the user to modify the order before committing or completing the purchase.

The process can be repeated as well. The system can present to the user "You have now purchased the silver iPhone 5S 32 GB—if you want the gold one, hit enter." Hitting enter this time will cancel the order of the silver iPhone, and replace it with the gold iPhone. If the user does nothing else at this stage, the system commits the order for the gold iPhone, and the merchant will execute the order so the user will receive the gold iPhone, and the merchant will charge the user for the order in the normal fashion. Of course, button clicks can be provided for the user to change the various parameters and change the order. The interface can say "you have purchased the iPhone 5S 32 GB black—to change any of these parameters click here." The system can present various options to change the storage size, model, carrier, color, shipping options, etc. However, if the user does nothing, the system arranges for and places the order with the merchant on behalf of the user using the predicted parameters. As can be appreciated, the process enables the user from the time a browser or an application is opened up, to successfully make a purchase of the desired product in less interactions or fewer steps than was previously required.

In another example, the system can include an autocorrect or autocomplete feature with one-click purchasing ability in the context of a single search or at Amazon.com, one-search.com, or any other website where a purchaser has registered data such as credit card, address, etc. A website search field can include an "autocomplete" where when the user types in a search term the autocomplete feature can either automatically complete the concept that user may desire, or present a list of suggested or recommended options based on the text input up to that point. The user can review the various autocomplete options and select one, thus alleviating the need to continue typing out the rest of the query. In this example, the system receives a partial user input (or full input) via an input field, and, when analyzing the input for producing autocomplete options, the system can include a "one-click" purchasing option in the listing of autocomplete options. In other words, if the user enters the text "iPhone" as the partial user input, at that stage the system can identify and present "iPhone 5S 16 GB<one-click purchase>" as one of the "autocomplete" options. In that case, this modified listing of the autocomplete features reduces the number of clicks and the amount of text from the user in order to purchase the item. In other words, drop down or drop up features are not limited to the concept of seeking a standard autocomplete feature but rather blends autocomplete with purchasing options or other options such as jumps to other websites. Normally, the user would choose one of the autocomplete options, which would take the user to either an item or a listing of items, then the user has to click again to narrow down to one particular item, and then at that point the user is in position to "one-click" purchase the item. However, if the user clicks on the "one-click purchase" variation in the autocomplete listing, the system can place the order immediately. An object could be presented in a drop down menu for transitioning to another site such as Wikipedia.org. Previous approaches required a user to type much more data into the input field to transition. For example, previous approaches on Safari requires the user to type "amazon camera lens", which indicated to the browser that the input was meant for amazon.com and to transition to amazon. However, requiring the extra letters to be typed in to provide the instruction to the browser likely required more input and steps then just manually transitioning to the second site. Thus, this disclosure provides for objects to be presented which can act on the exact text in the input field without the need of typing in key word instructions telling the browser where to transition.

The system can present various one-click options via the input field listing. For example, if, at the stage of typing "iPhone" the most popular iPhone is the 5S, with 32 GB and a silver color, the system can place that option, with a one-click purchase option, high or first on the list of autocomplete options for purchase. The next most popular model might be the 16 GB iPhone in black, which the system can display next in the autocomplete listing. Competitors can also provide offers in the autocomplete listing for a one-click purchase. A competitor can purchase the right to present an autocomplete one-click purchase option that is related, but does not include the searched-for text. For example, when a user is searching for "iPhone," the system can present an autocomplete entry to one-click purchase a "Samsung Galaxy S4." The system can further present promotional material in these autocomplete listings. However, because space is limited, the promotional material may be limited. One example of such a promotion is an autocomplete listing advertising "Samsung Galaxy S4—20% off <one-click purchase>" at Amazon.com. Companies can purchase advertising space under the autocomplete listing, or can pay a premium to elevate their products in autocomplete listings for a specific keyword, specific product, brand, and so forth. However, the system can also use business intelligence or feedback from various merchants to include, in the autocomplete options, results based on what people searching for item X eventually end up purchasing, even if the autocomplete option does not include the searched-for text.

Similarly, the system can track users' behavior, and can price certain users' attention at a premium for advertisers. For example, if the user has been researching smartphones daily for several weeks, advertisers of flagship smartphones may pay a higher price premium to target an interested, engaged buyer with advertising in the form of autocomplete options.

The system can provide a "one-click" purchasing option right in a drop down list of autocomplete options. Additionally, the autocomplete can include a listing that, if selected by the user, places the user in the context of one step prior to a one-click purchase at the merchant site. In other words, if a user enters "iPhone 5S" on a website like Amazon.com, Amazon.com presents to the user a number of listings of items. The user has to click on one of those items to narrow the results down to a single item, at which point the counting of clicks begins in the context of a "one-click" purchase. While viewing that single item, the user is then presented with a "one-click" purchasing option. Such a context, including the user's successful login with Amazon.com, would be characterized as a "pre-one-click" web page where the user has navigated to a point where the item is identified and the context is such that the user can make a one-click purchase. The problem is that getting to the pre-one-click page takes too many clicks and interactions.

Thus, the autocomplete listing can provide a simple way for the user to jump immediately to the "pre-one-click" stage in the merchant's web site. The autocomplete listing can not only include a "one-click" purchasing option at that stage, but could also include an option to take the user to a "pre-one-click" purchasing page, at which point, typically, there is more information about the item, a larger picture, reviews, a rating, product details, and so forth, such that the user can make a more informed purchasing decision. For well-known products, the user can make a one-click decision to purchase directly from an autocomplete listing, but for other products, the user may want to verify that the product is suitable for an intended purpose or compatible with some other user needs. The previous result of clicking on an autocomplete option is to process that option as though it was a search entered into the input field. However, that returns a listing of search results and not a "pre-one-click" page with one item ready to purchase. Accordingly, this alternate feature reduces the number of interactions necessary to get to a pre-one-click purchase page.

The purchasing autocomplete type options could be presented on a drop "up" listing and the searching or traditional autocomplete options could be presented on a traditional drop "down" menu. In other words, the directionality of the listing can be indicative of the functionality of the items listed. The directionality can be side to side, or in some other direction or angle. For example, the various one-click purchase and pre-one-click autocomplete listings can all be drop "down" menus, but at opposing 45 degree angles. The system can also present options in a tag field or tag cloud arrangement, where most likely options are presented closest to the input field (where they would be the quickest and easiest to access from a mouse perspective) and with the largest icon, text, graphic or other visual cues for selection.

Figure 2B:
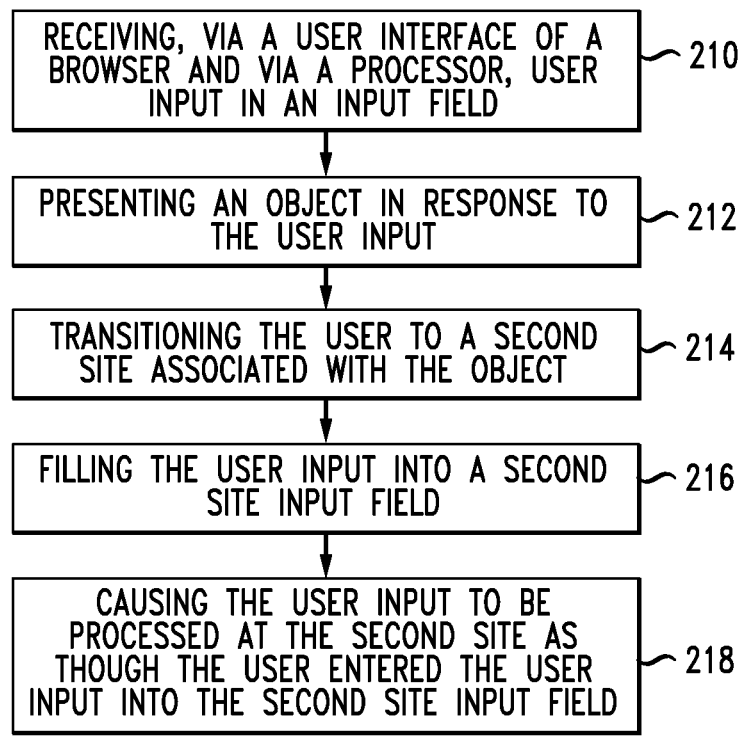
FIG. 2B illustrates an example method for processing user input.

As noted above, the browser or search engine could also be configured to transition the user to any second site and preprocess the user input in the input field as though the user had searched the second site and hit enter to process the input. The disclosure covers easily transitioning the user to a second site in a state as though the user had input user input into the input field of the second site. In this regard, an example method, shown in FIG. 2B, includes receiving, via a user interface of a browser and via a processor, user input in an input field (210) and presenting an object in response to the user input (212), The object is configured such that when a user interacts with the object, the method includes transitioning the user to a second site associated with the object (214), filling the user input into a second site input field (216) and causing the user input to be processed at the second site as though the user entered the user input into the second site input field (218). The object can be presented with an image indicating where the input will be processed and where the browser will transition the user to. The interface can present one or a plurality of objects, each object of the plurality of objects including a different one-click search engine to which the user will transition when the user interacts with each respect object. In this regard, the "one-click search engine" can include any second site to which the user will transition, such as yahoo.com, bing.com, amazon.com (i.e., any merchant site), ebay.com, Wikipedia.org, and so forth. Any second site having an input field can be transitioned to according to this concept. Users can select a listing of target sites that will show up as part of a drop down menu or items presented in response to user input in the first site input field. The steps of transitioning, filling and causing steps result in a transition of the user to the second site in a state as though the user had entered the user input into the second site input field and the second site processed the user input. To distinguish from prior approaches which required the user to type in key words like "wiki" or "amazon" to signal to the browser where the second site was, the present concept does not require such signaling and provides objects which the user can click on or interact with to process the exact user input in the second site and transition to the second site. Further, prior approaches, if a regular search was desired (such as specifically on "amazon camera lens"), the user was required to key into the input field a symbol like "!". Clearly the extra steps required for this approach were not deal. The present disclosure reduces the numbers of keystrokes and input needed to make the transition. Every reduced step or keystroke is valuable particularly with mobile device searching. Indeed, applying prior approaches would be problematic because a search on amazon.com using the exact terms "amazon camera lens" might return if applied exactly to the input field of amazon. com results that differ from what the user desired, which is just "camera lens".

The steps of this process can be performed by a search engine site, or any site that has an input field (such as starting at amazon.com and transitioning to google.com) or can be performed by a browser or other entity. For example, browsers often have input fields in the header portion which can be used for searching the Internet. Users can select whether a default search engine for that input field is google.com, yahoo.com or other search engine. However, the browser can also provide options which, when clicked on or interacted with by the user, cause the transition to a second site (which has its own second site input field) preconfigured such that the user input populates the second site input field and in a state where that user input has been processed by the second site. This clearly provides an efficient way for the user to navigate and arrive at the results they desire from a general search engine.

Another aspect includes receiving, via the user interface of a browser, user input in an input field and presenting an object in response to the user input, the object configured such that when a user interacts with the object. The object is configured such that with a single click, the user can be transitioned to another website preprocessed in a certain way. The user input is passed to the second site and essentially automatically filled into the second site input field. The background process involves the browser or system causing entry of the user input in the second input field such that the second site processes the input and returns a response such that the second site is in a processed state based on the user input. The system then transitions the user to the second site associated with the object in the processed state. This reduces the number of interactions the user would have to engage in to transition from the one site to the other. The object is presented such that after entering the user input, only one click is required to transition to the second site in the processed state. This differs from simply hitting enter with the user input in the input field and getting search results, from which the user could click on a search result and transition to another website.

Figure 3:
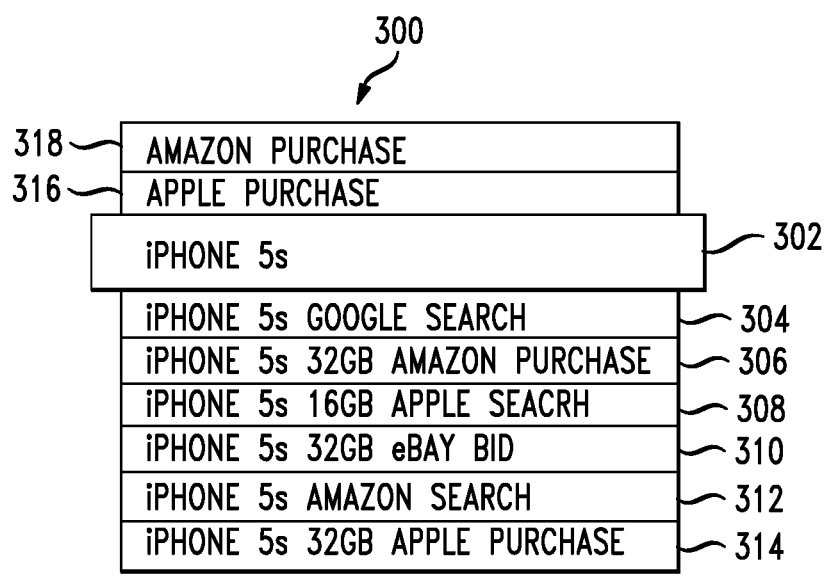
FIG. 3 illustrates a drop down and drop up menu according to an aspect of this disclosure.

FIG. 3 illustrates an example one search field and drop down menu feature 300. In this example, the single field 302 enables the user to provide input that the system analyzes to identify other options besides a search that are available. In this example, the user inputs "iPhone 5S" in the field 302. The algorithm analyzes that input to recognize that the search is directed to a product. The system can access a database of current products, purchasing patterns, product popularity, purchasing history of the user or of other users, and so forth. The system can access the database via an API call to one or more merchant databases. The algorithm can use this data to make a more accurate determination of whether the user desires a search or a specific product to purchase. In this case, the input "iPhone 5S" is clearly a product, thus this knowledge will help to drive and control the construction of the drop down menu options.

Figure 4A:
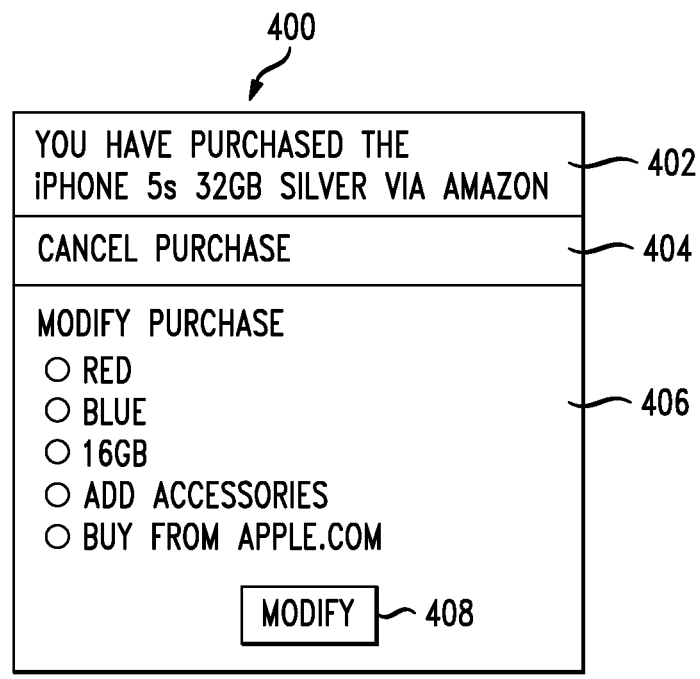
FIG. 4A illustrates a first example resulting interface according to an aspect of this disclosure.

Because the user input in field 302 is a product, the example drop down menu options can include a standard Google search 304. Although this is the first option, the system can arrange the drop down menus to place this option lower if the algorithm determines that the user is less likely to desire a Google search. The system can present more likely options closer to the input field 302, or closer to the mouse cursor, for example. If a user selects that option, then the result that is returned would be as though the user had entered "iPhone 5S" as a Google search. The drop down menu can include an Amazon.com one-click purchasing option 306. If the user selects this option, the system can process the input as though the user were on Amazon.com, having searched for an iPhone 5S, and at a screen in which the user can select to "one-click", execute the purchase of the product for the user. In another variation, the system can present a one-click option at the one-search page, directly from the drop-down or drop-up menu. So, the user could click a button, an image, or a link to place the order with Amazon.com as if the user had navigated to the one-click point at Amazon.com and clicked the "order now" button. In this case, FIG. 4A illustrates the resulting screen 400 presented to the user from choosing option 306. Screen 400 includes data 402 informing the user that the iPhone 5S had been purchased via Amazon.com. When a color was not provided, the system can chose the most likely color for the user or for similar users. In this case, the system selected silver. A storage size of 32 GB is also shown as part of the purchase data.

In the case of unwanted or unintended purchases as people perhaps hit a wrong key or chose the wrong drop down menu option, the system allows users to cancel the purchase 404 or modify the purchase 406. The user can modify any number of different options depending on the product. Options shown by way of example include changing the color from silver to gold or black. Similarly, the system can display an option to change the storage size to 16 GB. An option such as "add accessories" can bring the user to another interactive screen to choose accessories. The system can determine which modification options to present and the order in which to present them based on a confidence score for each option. For example, the system may have a confidence score of 95% that the user wants a silver iPhone 5S, and can either not display the option to modify the color, or can display the option in a less prominent place or manner, or can provide the option to change the color through a menu or other 'hidden' location. This approach can allow the system to present purchase or item options to the user so that the user is only concerned with and can easily modify options about which the system is less sure. The system can present options to modify not only details about the actual item itself, but also about details surrounding the order, such as delivery address, billing address, payment method, or delivery method. The system can even allow the user to switch the order from one merchant to another merchant, if the user inadvertently clicked the wrong menu item in the pull-down menu, for example.

In that the entity which is processing the purchase is Amazon.com, as is noted in field 402, the system could also present an option to process the purchase through Apple. com. If any of these options are chosen, then the user selects the modify button 408 and the order is modified and automatically continues to be processed. Of course the system has the user profile, purchasing (credit/debit/PayPal, etc. account), address and any other information and can move seamlessly between purchasing/processing entities with ease. When the user sets up a profile and account on the website, all of these permissions and accessibility capability is established and approved. In this manner, operations necessary between entities to complete a purchase can be divided as necessary. Thus, an example of seamlessly moving operations between purchasing and processing entities can include the system handling a purchase and delivery transaction of an item by enabling a payment account registered with one entity (such as Google), to be used to pay for an item while the system coordinates with another processing entity, such as a merchant or retail partner, to handle filling the order.

Returning to FIG. 3, feature 308 represents an Apple search. If the user selects this option, then the next field that is returned would be as though the user searched for iPhone 5S on Apple.com. The information presented by Apple on that product would be presented to the user. Optionally, the system can prompt the user to provide or confirm credentials for logging in to Apple.com. In that the transition from one-search.com to Apple.com occurred from one-search.com, the system can present an option in the new Apple.com web page to enable the user to return to one-search.com for further searches. For example, the system can provide a frame, in the browser, for returning to the one-search.com search while presenting the Apple.com web site. The frame can allow the user to modify the original input text, which can dynamically change aspects of the presented Apple.com web site presented in conjunction with the frame.

Figure 4B:
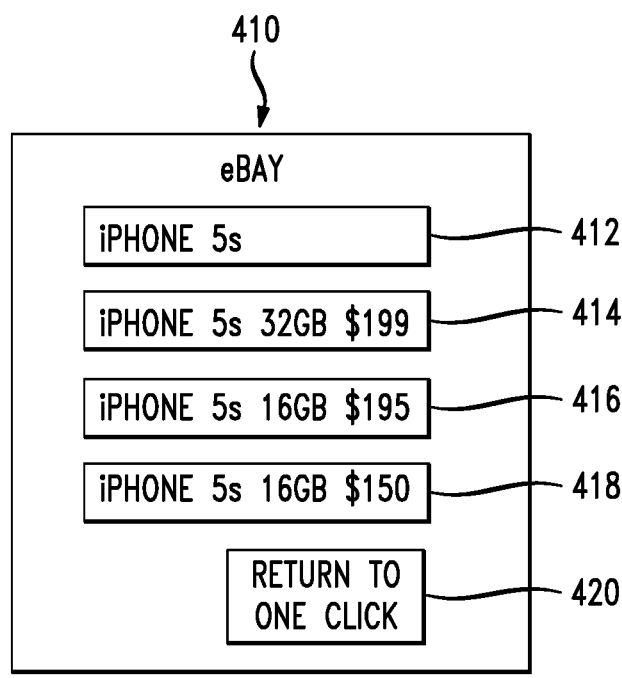
FIG. 4B illustrates a second example resulting interface according to an aspect of this disclosure.

Feature 310 in FIG. 3 represents an eBay bid option. In this case, if the user selects this option, the system sends the user to eBay and presents a screen 410, as shown in the example user interface of FIG. 4B, as though the user had gone to eBay.com and entered in "iPhone 5S" into the eBay search field 412. Feature 414 represent a selectable returned item for an iPhone 5S 32 GB with a current bid at $199. Feature 416 is an iPhone 5S 16 GB for $175 and feature 418 represents an iPhone 5 16 GB at $150. All of these are examples of the kind of processing that can occur. As noted above, a "return to one-search" button 420 can also be included in the screen for easy access back to the one-search field. The system can transition to the indicated destination page, such as the Apple.com, eBay.com, or Amazon.com purchase page for an iPhone 5S as an overlay, such that returning to the one-search field involves removing the overlay instead of a back navigation command to a previous page.

FIG. 3 also shows an Amazon search 312. When the user chooses this option, the system can present a screen as though the user had searched on Amazon.com for an iPhone 5S. From there, the user could continue shopping and searching as though the user had begun browsing on Amazon.com. The drop down menu can include an option to purchase the product directly via Apple.com 314. If the user selects that option, and assuming that there is not a "one-click" purchase option at Apple.com, the user is brought to the point where they can, in very few interactions, complete the purchase. For instance, the system can bring the user to a shopping cart showing the product ready to be purchased. In one option, the system brings the user to the point of seeing the product and being able to place the product (iPhone 5S) into a shopping cart. In another aspect, the system could navigate the shopping cart model on behalf of the user and complete the purchase, thereby making the transaction a one-click purchase.

FIG. 3 also shows another example of this disclosure. In this case, because the "drop down" menus include different types of data, the options can include a "drop down" menu as well as a "drop up" menu. The purchase options could be dropped "up" as shown in features 316 and 318, while all of the search options or more traditional options can be dropped "down." The system can present menus to the left, right, diagonal, or in any direction, orientation, or angle as desired. Separating the purchasing options from search-type options can also reduce the number of inadvertent purchases. In this example, the drop down menus of FIG. 3 could only include features 304, 308, 310 and 312 as these involve further searching. The system can position items 306 and 314 in "drop up" menus 318 and 316, respectively. The algorithm can predict the most likely search if the user desired a search and the most likely purchase if the user were to desire to purchase the item and position those as the first option down and the first option up in the menus. The user could use the arrow buttons on a keyboard or a touch screen to select the desired options. Alternatively, the drop down or drop up menus can indicate shortcut keys which the user can press to select the options without using the mouse. For example, the menu can indicate that the user can press alt-1, alt-2, or alt-3 to select the various drop up menu options, or ctrl-1, ctrl-2, or ctrl-3, or some other single key or key combination to select the various drop down menu options. The system can present auto-complete options which the user can activate using similar keyboard shortcuts. For example, if the user has typed "iPhone," the system can indicate that pressing "S64" after "iPhone" would autocomplete to "iPhone 5S 64 GB." The types and quantities of such autocomplete keyboard shortcuts can vary widely depending on the determined intent of the user, as well as attributes of the product as the system understands it up to that point. Voice activity or gesture input or any other type of input can enable the user to select a desired option.

In some cases, the system can determine that the data in the search field is not intended for a purchase. For example, if the user enters the text "South Dakota," the system can identify that the user does not desire to make a purchase. The "drop down" menu in that case could simply list the traditional search options, or could list options to one-click purchase items related to South Dakota, such as a South Dakota t-shirt or a souvenir of Mount Rushmore.

The user can also add hints or shorthand instructions in the search field to guide purchase options presented in a one-search.com field. For example, the user can provide the text "buy amaz iPhone 5S." These hints tell the algorithm that the user desires a purchase function, and that the desired merchant is Amazon. Based on these types of hints, the system can eliminate features 304, 308, 310, 312 and 314 from the drop down menus shown in FIG. 3. In that case, the user could just hit "return" and the most likely desired product will be automatically purchased and processed for shipment. Options to cancel or modify of course can be presented, such as the cancel purchase button 404 and modify purchase button 408 shown in FIG. 4.

In one example, the unified input field is part of an application downloadable or installable on a smartphone, tablet, or other mobile computing device. The functionality could also apply to a unified search field on a website. The application can be customizable as can any website disclosed herein. The application includes a single input field that is generic to multiple different types of processing. For example, the application can present an input field with a number of different options, such as a Skype or telephone call. The field therefore can be used to input a search for a contact. The user could type in the field "mom" and then select the Skype® video conference option, or the Face- Time® option. The system processes the input field according to the appropriate context by extending a video conferencing request or making a phone call. It is important to note that the unified field concept disclosed herein is not limited to the processing of the user input being related to web searches or purchases. Other functionality can be implemented from the unified field. Phone calls, video conferencing, triggering of any sensor on a smartphone, taking a picture, sending a text, etc. Several examples if these features follow. In the unified field, the user may input the text: "Mark S., are we getting together for lunch?" The user may then select the processing option of "texting," chatting in an online chat room, or posting the comment on a social media website, and so forth.

Figure 5:
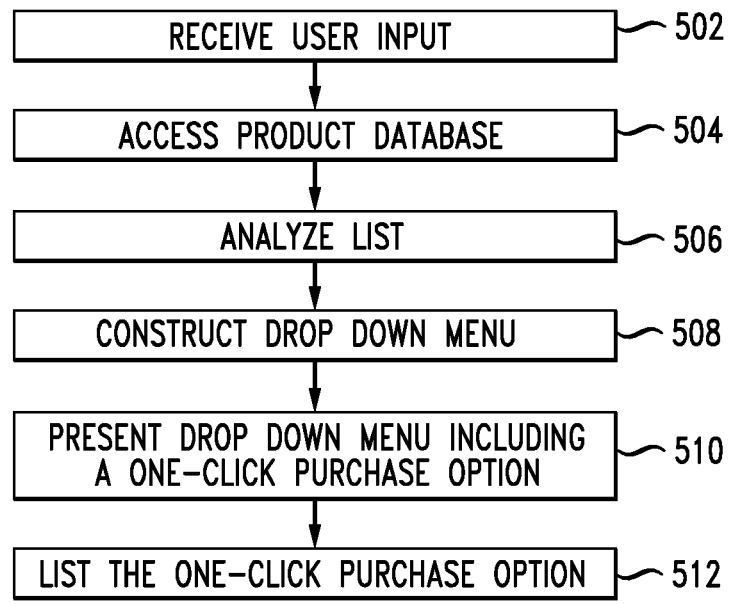
FIG. 5 illustrates a method example for presenting a one-click purchase option relating to a search input.
Figure 7:
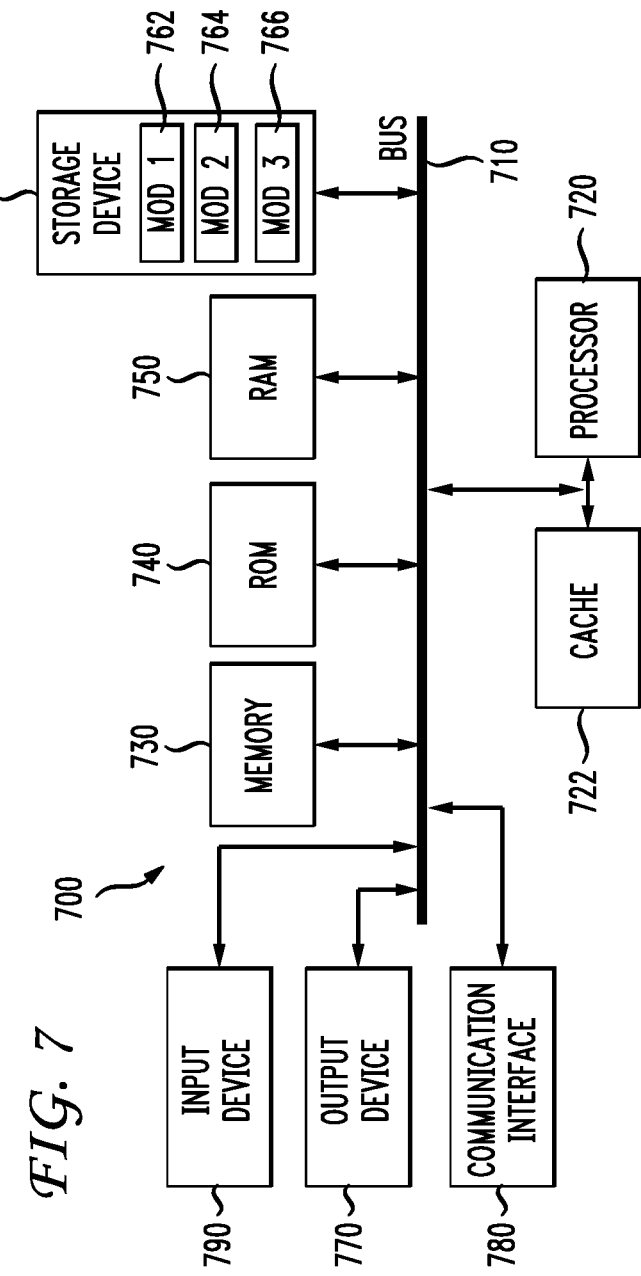
FIG. 7 illustrates an example system example.

Having disclosed some basic system components and concepts, the disclosure now turns to the exemplary method example shown in FIG. 5. For the sake of clarity, the method is described in terms of an exemplary system 700 as shown in FIG. 7 configured to practice the method. The steps outlined herein are exemplary and can be implemented in any combination thereof, including combinations that exclude, add, or modify certain steps.

FIG. 5 illustrates a general method example. The system receives user input (502). The system can access a product database in processing the user input (504). For example, if a new product just came out and is available for purchase on-line, the system can access that information so that when a user enters "iPhone 5S" that the system can match that input with a product. The system analyzes the input (506) for a determination of the user intent. For example, if the user enters "Rhode Island" the system can calculate a very low likelihood that the user desires to purchase Rhode Island. User profile, user search and purchasing history, and any other data can be used by the algorithm to determine how to structure an extendible menu to enable the user to quickly make a choice of what they desire. However, as the user enters additional text, the system can update autocomplete options accordingly. For example, if the user enters "Rhode Island cookbook," the system can, at some point, determine that the user is not likely interested in the state, but in a cookbook, which is a purchasable item. The system can then adapt the autocomplete options automatically as the user continues to enter additional text.

FIG. 5 next shows analyzing the input (506) using all this data and information and constructing a menu (508) or a presentation of various options. This construction can also include a marketing aspect as companies may pay for how the option is presented. Amazon.com, or a product manufacturer, can pay a small fee to present their product with graphics or multimedia content, if it appears that the user may desire to buy that product, in order to encourage the user to select that option to purchase the product. The system presents the menu or other structured presentation of options for the user to choose (510). The options include one or more purchasing options (512) when the user input indicates via the algorithm that a purchase may be desired.

In another aspect, a classifier can process the user input in the general unified search field. The classifier can be trained to determine the intent of the user and to select which websites or applications to provide in response to the input. Classification algorithms are often used in processing speech or phone calls. For example, some classification features can process and classify calls in various call types like local, international, voicemail, conference, etc. In some cases, as a user calls an interactive voice response system, a classifier can be trained using previous calls to process the user input to conclude that the user wants to talk to accounting or pay a bill. For example, the user might say in the call "I want to pay a bill" or "I need help with my account." By classifying that input, the system can route the call to the right person, destination, or entity.

Technologies that are used for classification include statistics, data mining, pattern recognition, machine learning, and in some cases neural computation and artificial intelligence. A general classification system approach involves receiving input, preprocessing the input, segmenting and labeling the input, extracting features from the input, postprocessing, and ultimately classifying the input to arrive at a decision. While these principles have been applied in many fields, these technologies can be applied to a new classification domain. The new classification domain is the context or intent of a unified input field such as on a browser in which the user provides input, and that input can be applied to many different websites, applications, or actions. Right now, when a person goes to google.com, the assumption is that the user wants to search the internet. When a user goes to Amazon.com, the user wants to buy something. The user must go to different websites for these different functions, requiring additional, unnecessary mouse clicks. This disclosure provides, in one respect, the introduction of a classifier that processes user input in a field on a website where there is no assumption that the user wants to search or buy a product. The classifier will determine via a classification decision what the intent of the user is.

In order to train the classifier, which is called herein an 'intent classifier', the system can monitor the web usage of a user for a period of time. The classifier can utilize data of one user or multiple users. For example, one could generate training data of input at a google input field compared to input in an amazon.com input field for people of a particular demographic, such as 20-30 year old men, or women or a particular minority or religious group. The training data preferably would be particular in some respects to the individual user. If a user is logged into a browser such that it can connect to that user's training data or relevant training data, then the system can more efficiently process the user input in the unified input field. The system can use supervised learning (or unsupervised or semi-supervised learning) to label the training set so that the training data can provide which class (i.e., search, purchase, Wikipedia, etc.) the input belongs to. The training data involves the input provided via a search field as opposed to a purchase field. Other fields can apply as well such as auctions, medical advice, twitter input text, Facebook input text, or any other social networking input text and so forth. The general concept is that there is no assumption when the user inputs data into the field regarding what the desired function is.

Other data that can be useful for the training model is personal user information. For example, if the user is registered for making one-click purchases at amazon.com, then when the user types in "Android 4.4 KitKat", the system will know that the shortest number of clicks and computer interactions possible for the person to complete a purchase of the most popular smartphone with Android 4.4 is through Amazon.com. Otherwise, the user might be sent to another website and have to go through the shopping cart model, enter their credit card, and take a lot of extra time and effort to complete the purchase. Thus, knowing that the user is registered at one or two purchasing websites (thus enabling a quick "one-click" purchase) can drive the result of the classification.

In another example, the classifier in this case can have classification types of search, browse, purchase now, play game, update software, send email, send tweet, check Facebook, make call via Skype, and so forth. Some of the classification data for a trained model can be drawn from the different types of input that are used in input fields between google.com, amazon.com, Wikipedia.com, and so forth. The system for training the classifier can look at the different types of input in connection with which website is being used and develops training data. In other cases, if a user types in "call mom", such input would not be provided in an input field because normally the user would go to the Skype App or other calling app and choose his mother to make the call. Thus, in other cases, training may occur in a different way to capture that "command" type of input. However, since there is no assumption of the desired intent of the input at the start, such training can be used to enable the user to perform a host of functions starting at one input field.

The user can in this case also provide hints as to the desired input. It might be quicker for the user to type "buy" before "iPhone 5S" so that the entire input is "buy iPhone 5S" than moving one's hand to the mouse and moving the mouse to click on an amazon.com tab in a browser or on an icon, or typing "www.amazon.com" in an input field for URL's. Clearly, the suggestion to buy tells the classifier that a purchase is the intent. Currently, typing in "buy iPhone 5S" is still considered via a searching algorithm in which search results are provided. The system can show sponsored advertisements which enable the user to go to an advertisement or promotional page for the iPhone 5S, but those still take additional clicks to get to the point of actually being able to make a purchase. Further, the system can still present the results on a webpage (google.com) that does not enable the user to complete a purchase/delivery within one click.

Therefore, the classification algorithm according to this disclosure can utilize training data which includes different kinds of input that the user or similar users have provided via input fields on various web pages to determine an intent describing which web page the user desires to open, or which action the user desires to perform on the web page. The system can user other data to make the determination, such as time of day, time of the year, social media data like birthdays of friends, holidays, weather information, which websites the user had made purchases on and with which website the has previously registered, etc.

For example, the classifier might determine that the user wants to make a purchase. The classifier can make a basic determination of an intent to search or an intent to make a purchase. Then the classifier can take a secondary step to determine based on history, user profile, registrations, best price, closest outlet to the user's address, etc., at which merchant the user likely wants to make the purchase. If the user has an account set up at amazon.com, then the system may choose amazon as the primary likely destination and take the appropriate step. For example, the system can create a new tab with the input term pre-entered at amazon.com, or where the user can open the tab and be at the state in the amazon.com website where the user can just click the "one-click purchase" button to complete the purchase. The system can present the new page in a new tab, within the same page as the unified input field, or in some other fashion.

Figure 6:
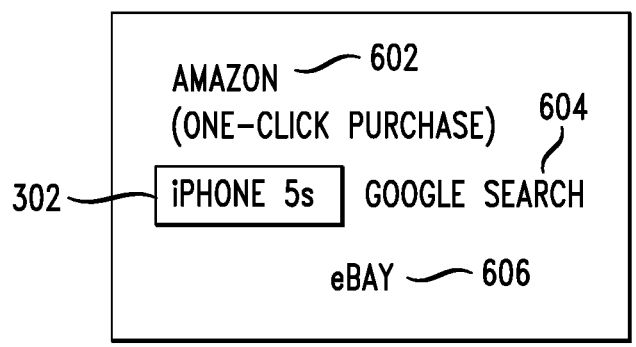
FIG. 6 illustrates another graphical resulting interface in response to received user input.

The system can, instead of a more traditional menu, present the options in a completely different form, such as a tag field. FIG. 6 illustrates options in which parameters associated with each selectable option are chosen based on relevance. For example, the system can select and modify positioning, size, shape, color, detail, of the items in the tag field for various options. Feature 602 is an Amazon one-click purchase. Feature 604 is a Google search and feature 606 is an eBay search. In a tag cloud or word cloud, the size, shape, color, and other details of the items can provide information about the items. In this example, the Amazon one-click purchase 602 is listed in a large font, in bold, and in close proximity to the search field 302. The large font can indicate that the system has determined that it is highly relevant to the text entered in the search field. The bold font can indicate that clicking the item will trigger a purchase. The eBay search 606 is similarly large, potentially indicating that it is also highly relevant, but not bold because there is no one-click purchase associated with that item 606. The Google search 604 is presented to the side, in a smaller font, indicating that is may be of lesser relevance or importance. The various details of these items can vary in a smooth, animated fashion as the user enters additional information in the search field 302. For example, as the user enters more information about the specific desired iPhone, the system can adjust the Amazon 602 option on the user interface to gradually increase in size, move closer to the search field, be drawn with thicker lines, and so forth. The system can provide these details as an animation for the user so that increasingly relevant items are presented in increasingly discoverable places or increasingly prominently.

FIG. 6 illustrates various options of how to structure and present the selectable options from a one-search input field. In one aspect, traditional drop down options can be presented in a normal fashion with purchasing options presented like feature 602 in FIG. 6 thus providing a further differentiation of which items are standard drop down menu, auto-complete type options and which ones are one-click purchasing type options. The system can, in the tag field or in other examples, present targeted advertising. For example, in FIG. 6, the user could have entered "buy Amazon iPhone 5S." This would result in a high likelihood or probability that the user wants to buy that product via Amazon, thus causing the system to present feature 602 showing that option in a large font and close to the input field 302. In other words, like tag clouds which make larger words of higher usage or interest in a story or from cloud input. Feature 604 could represent a paid-for advertisement from a competitor who may offer a cheaper price for the same product. Such information could be presented as part of an icon or advertisement represented as feature 604.

A description of a basic general-purpose system or computing device in FIG. 7 which can be employed to practice the concepts, methods, and techniques disclosed is illustrated. With reference to FIG. 7, an exemplary system and/or computing device 700 includes a processing unit (CPU or processor) 720 and a system bus 710 that couples various system components including the system memory 730 such as read only memory (ROM) 740 and random access memory (RAM) 750 to the processor 720. The system 700 can include a cache 722 of high-speed memory connected directly with, in close proximity to, or integrated as part of the processor 720. The system 700 copies data from the memory 730 and/or the storage device 760 to the cache 722 for quick access by the processor 720. In this way, the cache provides a performance boost that avoids processor 720 delays while waiting for data. These and other modules can control or be configured to control the processor 720 to perform various operations or actions. Other system memory 730 may be available for use as well. The memory 730 can include multiple different types of memory with different performance characteristics. It can be appreciated that the disclosure may operate on a computing device 700 with more than one processor 720 or on a group or cluster of computing devices networked together to provide greater processing capability. The processor 720 can include any general purpose processor and a hardware module or software module, such as module 1 762, module 2 764, and module 3 766 stored in storage device 760, configured to control the processor 720 as well as a special-purpose processor where software instructions are incorporated into the processor. The processor 720 may be a self-contained computing system, containing multiple cores or processors, a bus, memory controller, cache, etc. A multi-core processor may be symmetric or asymmetric. The processor 720 can include multiple processors, such as a system having multiple, physically separate processors in different sockets, or a system having multiple processor cores on a single physical chip. Similarly, the processor 720 can include multiple distributed processors located in multiple separate computing devices, but working together such as via a communications network. Multiple processors or processor cores can share resources such as memory 730 or the cache 722, or can operate using independent resources. The processor 720 can include one or more of a state machine, an application specific integrated circuit (ASIC), or a programmable gate array (PGA) including a field PGA.

The system bus 710 may be any of several types of bus structures including a memory bus or memory controller, a peripheral bus, and a local bus using any of a variety of bus architectures. A basic input/output (BIOS) stored in ROM 740 or the like, may provide the basic routine that helps to transfer information between elements within the computing device 700, such as during start-up. The computing device 700 further includes storage devices 760 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 760 can include software modules 762, 764, 766 for controlling the processor 720. The system 700 can include other hardware or software modules. The storage device 760 is connected to the system bus 710 by a drive interface. The drives and the associated computer-readable storage devices provide nonvolatile storage of computer-readable instructions, data structures, program modules and other data for the computing device 700. In one aspect, a hardware module that performs a particular function includes the software component stored in a tangible computer-readable storage device in connection with the necessary hardware components, such as the processor 720, bus 710, display 770, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 700 is a small, handheld computing device, a desktop computer, or a computer server. When the processor 720 executes instructions to perform "operations", the processor 720 can perform the operations directly and/or facilitate, direct, or cooperate with another device or component to perform the operations.

Although the exemplary example(s) described herein employs the hard disk 760, other types of computer-readable storage devices which can store data that are accessible by a computer, such as magnetic cassettes, flash memory cards, digital versatile disks (DVDs), cartridges, random access memories (RAMs) 750, read only memory (ROM) 740, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 700, an input device 790 represents any number of input mechanisms, such as a microphone for speech, a touch-sensitive screen for gesture or graphical input, keyboard, mouse, motion input, speech and so forth. An output device 770 can also be one or more of a number of output mechanisms known to those of skill in the art. In some instances, multimodal systems enable a user to provide multiple types of input to communicate with the computing device 700. The communications interface 780 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system example is presented as including individual functional blocks including functional blocks labeled as a "processor" or processor 720. The functions these blocks represent may be provided through the use of either shared or dedicated hardware, including, but not limited to, hardware capable of executing software and hardware, such as a processor 720, that is purpose-built to operate as an equivalent to software executing on a general purpose processor. For example the functions of one or more processors presented in FIG. 7 may be provided by a single shared processor or multiple processors. (Use of the term "processor" should not be construed to refer exclusively to hardware capable of executing software.) Illustrative examples may include microprocessor and/or digital signal processor (DSP) hardware, read-only memory (ROM) 740 for storing software performing the operations described below, and random access memory (RAM) 750 for storing results. Very large scale integration (VLSI) hardware examples, as well as custom VLSI circuitry in combination with a general purpose DSP circuit, may also be provided.

The logical operations of the various examples are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 700 shown in FIG. 7 can practice all or part of the recited methods, can be a part of the recited systems, and/or can operate according to instructions in the recited tangible computer-readable storage devices. Such logical operations can be implemented as modules configured to control the processor 720 to perform particular functions according to the programming of the module. For example, FIG. 7 illustrates three modules Mod1 762, Mod2 764 and Mod3 766 which are modules configured to control the processor 720. These modules may be stored on the storage device 760 and loaded into RAM 750 or memory 730 at runtime or may be stored in other computer-readable memory locations.

One or more parts of the example computing device 700, up to and including the entire computing device 700, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 720 can include all types of processors disclosed herein, including a virtual processor. However, when referring to a virtual processor, the processor 720 includes the software components associated with executing the virtual processor in a virtualization layer and underlying hardware necessary to execute the virtualization layer. The system 700 can include a physical or virtual processor 720 that receive instructions stored in a computer-readable storage device, which cause the processor 720 to perform certain operations. When referring to a virtual processor 720, the system also includes the underlying physical hardware executing the virtual processor 720.

In each case within this disclosure, reference to "Amazon" or Amazon.com" is broad enough to encompass any purchasing/delivery or ecommerce website, as well as websites for traditional, brick-and-mortar businesses that provide goods or services. References to a "Google" site or search refer to any generalized search engine. In many instances, the principles set forth herein may be applicable to other, non-search and non-commerce sites, which the system can manipulate or traverse in order to accomplish a specific, intended action on behalf of the user.

Figure 8:
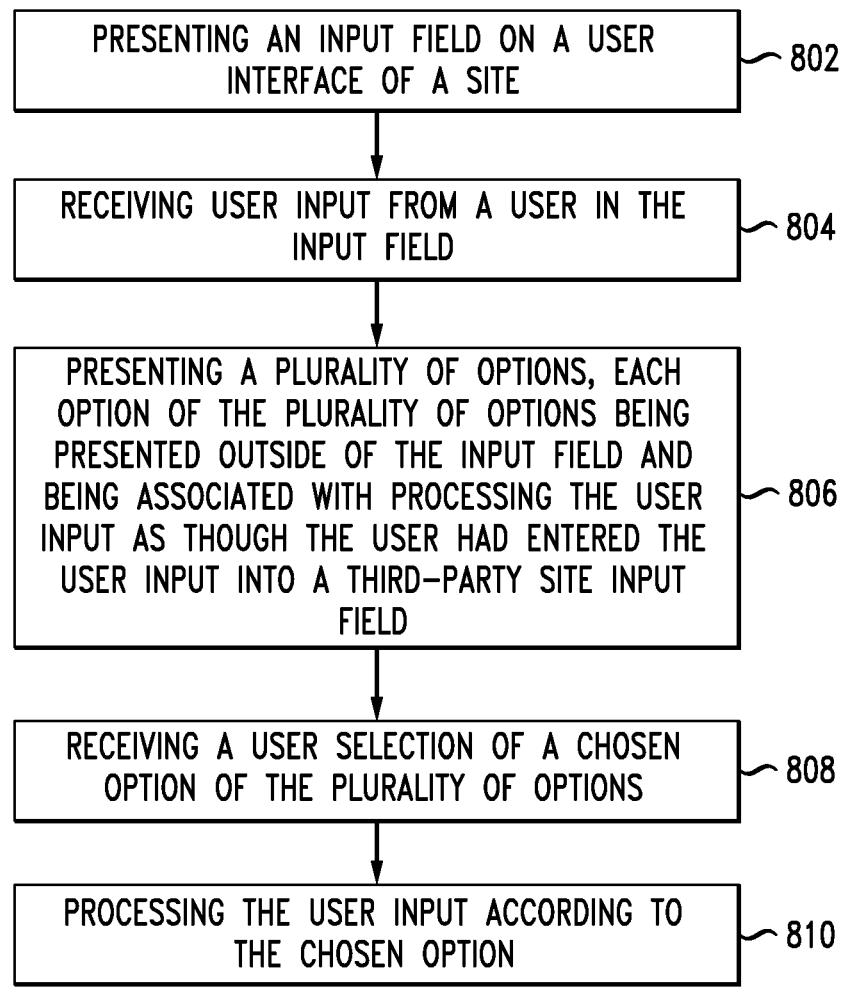
FIG. 8 illustrates an example method example for processing a selection from a user.

FIG. 8 illustrates an example method example. In each case, wherever a "website" is mentioned, an application or site could also apply, such as when a mobile application is used to access data. A system will perform the steps of the method. The system presents an input field on a user interface of a website (802) and receives user input from a user in the input field (804). The system analyzes the input to determine whether the user wanted a search, to make a purchase, to perform some other function such as making a call, or watching a video, and so forth. The system presents a set of options, each option of the set of options being presented outside of the input field and being associated with processing the user input as though the user had entered the user input into a third-party website input field (806). FIGS. 2 and 3 provide examples of presenting the set of options for processing. A component of this approach is that the input field is not pre-designated or pre-designed to process the input in one particular context, but the input field is open to a variety of ways of processing the input, thus reducing the number if clicks necessary to navigator from one website to another to input data. The system receives a user selection of a chosen option of the set of options (808) and processes the user input according to the chosen option (810).

A first option of the set of options can be associated with a search engine and a second option of the set of options is associated with a purchase-processing engine. If the chosen option is the second option and associated with a purchase-processing engine, then the system will identify in item associated with the user input and process a purchase of the item and delivery of the item to the user. If the chosen option is the first option and associated with a search engine, then the system processes the user input to perform a search associated with the user input and returns search results. The method can also include identifying respective types for the set of options and presenting the set of options in groups based on the respective types.

The user input can include at least one of text input, multimodal input, gesture input, or voice input, or any combination thereof. The user can have a pre-existing account storing preferences governing how the set of options are presented.

Figure 9:
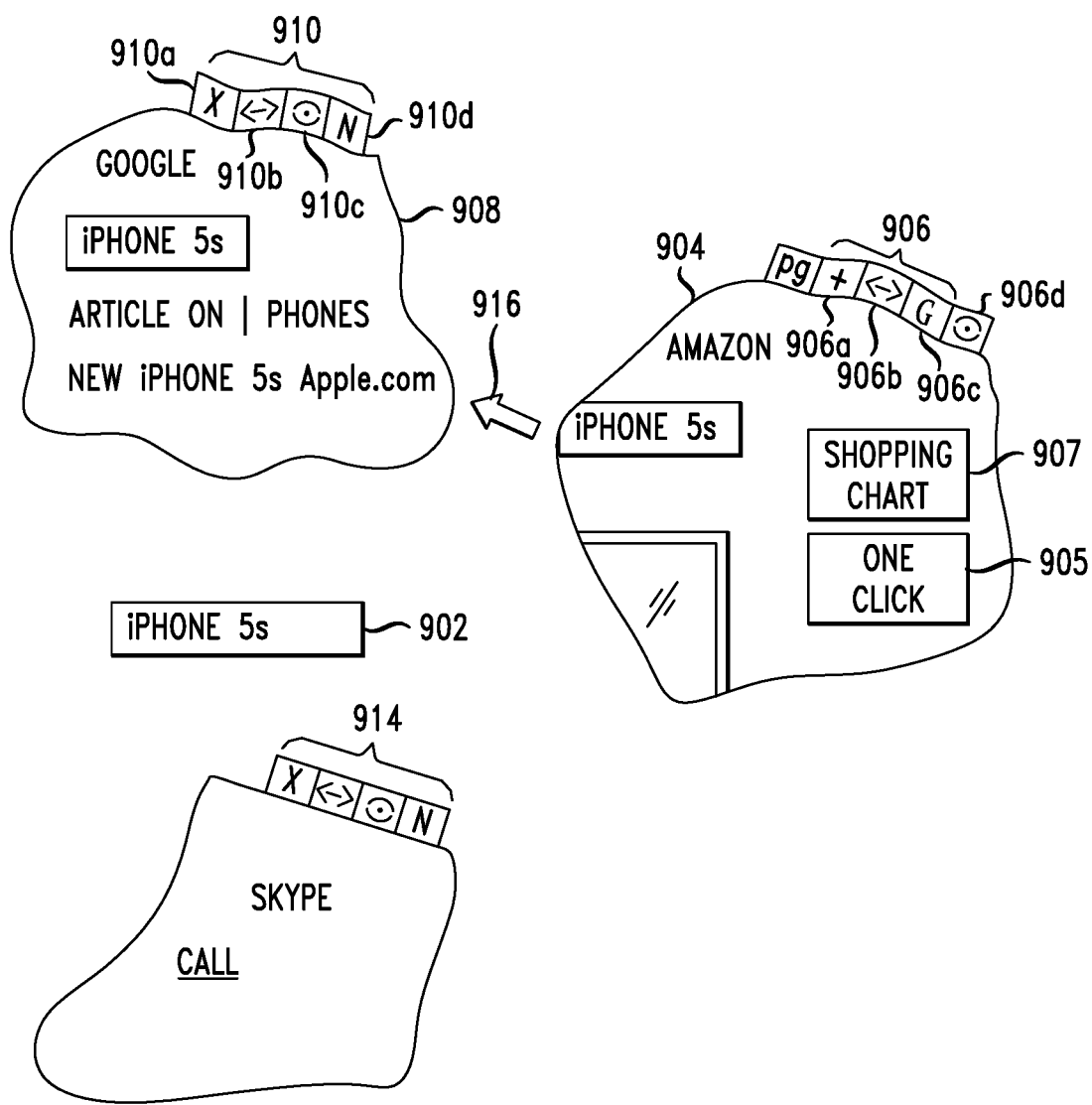
FIG. 9 illustrates a user interface associated with an example.

Executing an Action Based on Input Directed to a User Interface Integrated from Another Source FIG. 9 illustrates a user interface associated with an example. In this example user interface, the user enters the text "iPhone 5S" into a unified input field 902. The browser communicates the text to a one-search server that returns navigation destinations. The web browser can render "tears" 904, 908 in the page that appear to be holes in the interface peering into underlying other pages. The tears have two position considerations, the position of the tears in the host page, and the view of the tears onto the destination page. The system can consider both of these positions when determining the location and size of the tears to present. The user can click on the tear to navigate to that destination website. In that case, the tear can transition in the same manner as a click on a link to navigate to a different page, or can present an animated transition, such as expanding the boundaries of the tear until the tear completely replaces the previous page. The tears can include various controls 906, 910, 914 fitted along an edge of the respective tear so a user can manipulate the tear to move, maximize 906*a*, expand 906*b*, 910*b*, preview 910*c*, 906*d*, close 910*a*, go to the page 906*c*, or perform some other action on the tear. Further, the user can directly manipulate exposed user interface elements shown in the tear, such as the one-click purchase button 905 or the view shopping cart button 907. Some tears can show other non-web actions, such as a view into a Skype application to make a call. The system can position tears that are a closer match to an intent determined from the text entered in the unified input field so the more important tears are closer to the mouse cursor 916 or to the unified input field, for example. The system can expand a tear dynamically as a mouse 916 moves closer to the tear, and shrink the tear as the mouse 916 moves farther away. The tear edges can be any shape, including standard geometric shapes, or can have more complex edges that are sharp or smooth, or that are dynamic and can change based on various factors.

In a touch-based interface, a user can use touch gestures to manipulate the tears. For example, the user can tap and hold on a tear to begin moving the tear around on the page. The user can swipe to move the view of the page in the tear, or pinch to zoom on a page displayed in the tear. A user can double tap on a tear to navigate to the page displayed in the tear. The system can display content in the tears at a same zoom factor as the host page, or can shrink the content displayed in the tears to display a broader view of the content.

Figure 10:
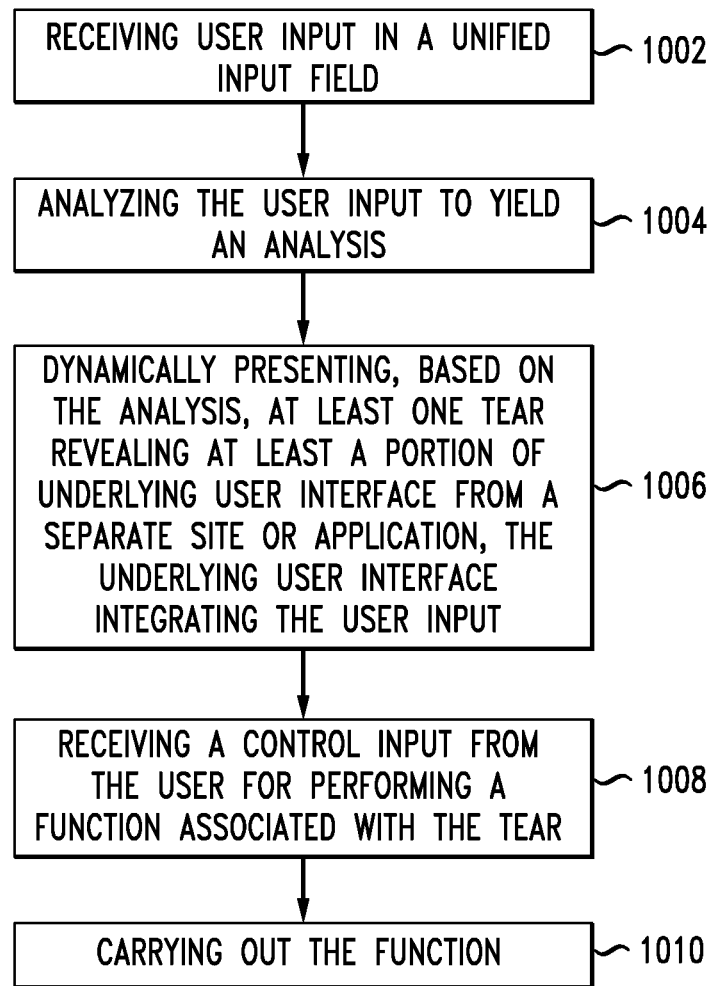
FIG. 10 illustrates a method example for executing an action based on input directed to a user interface integrated from another source.

FIG. 10 illustrates an example method example for executing an action based on input directed to a user interface integrated from another source. In this example, a system performing the method receives user input in a unified input field (1002). The system analyzes the user input to yield an analysis (1004). The system dynamically presents, based on the analysis, at least one tear revealing at least a portion of underlying user interface from a separate site or application, the underlying user interface integrating the user input (1006). The system receives a control input from the user for performing a function associated with the tear (1008). The system can then carry out the function (1010).

Modifiable Entry Button

A system, method and computer-readable storage devices are disclosed which dynamically morph or adapt the search button associated with a unified input field based on an intent determined via a classifier and based on text provided to the unified input field. Typically a unified input field has two main components: a text input field, and a search button to execute a search based on input provided via the text input field. The search button is typically labeled with the text "search" or "go" or something similarly generic. However, as the user enters a search term, the system can identify some other, more specific action, and can modify the search button to not only display different a different text or graphical label, but can also modify the action associated with the button accordingly. Additionally, the system can expand the single search button into multiple buttons.

For example, the user enters the text "Apple." At that point, the classifier does not determine that the text string "Apple" is sufficiently tied to a specific action or item to modify the label on the search button. So the search button remains unchanged. The user continues to enter the text "Apple iPhone." At this point the classifier identifies, based on the additional text, that several specific items or actions are likely, but too many of the items or actions are available or none are above a certainty threshold to modify the search button. The user continues on to enter the text "Apple iPhone 5S," at which point the classifier identifies a model of iPhone, the 5S. Then, based on user preferences or on other available data, the classifier can identify a specific variant of the iPhone 5S, such as a gold 64 GB iPhone 5S. Thus, the system can modify the label of the search button to no longer say "search," but instead to say "Purchase iPhone 5S, 64 GB, Gold." The user can, at that point, simply hit enter on the keyboard to execute that action and purchase the indicated iPhone 5S.

As an alternative to modifying the search button, the system can generate and present additional buttons next to the search button. The system can provide an indication that different keys or key combinations will activate the different buttons. For example, hitting enter will activate the functionality associated with the "search" button, while hitting ctrl-enter will activate the functionality of the "Purchase iPhone 5S, 64 GB, Gold" button. As the system presents additional buttons, the user can also click on the additional buttons to activate their various associated actions.

In some cases, the modified button can still require some additional disambiguation. For example, the modified button can be labeled "Purchase iPhone 5S, 64 GB." As the user presses enter to activate the modified button, the system can present an additional dialog or button modification, such as modifying the button to say "Press enter once for Gold, twice for Silver, or thrice for Black." After the user provides that input, the system can modify the button label to say "Press enter once to purchase from Apple, twice to purchase from Amazon." The system can modify the button label with these additional messages, or can present them at some other location on the page. In this way, the user can quickly enter the text associated with a desired action or purchase, and select the various options easily and without moving his or her hands back and forth between the keyboard and the mouse, and can navigate between a disambiguation decision tree using very simple and familiar inputs.

If the user makes a mistake or wants to cancel the selection, the user can simply hit backspace to delete characters in the entered text, which would potentially change the context, and trigger a reset of the modified button and corresponding action or actions. If the user made a mistake and wants to back out of the selection, he or she can simply hit the escape key or provide some keyboard, mouse, or other input indicating to the system to go back.

The system can learn the behavior patterns and preferences of the user and adapt accordingly, so that, over time, the system can require less and less input from the user to accurately determine or classify the user's intent. For example, the system can know which items the user has already purchased, which items the user has discussed with friends or family, which gift-giving events are coming up soon, and so forth. Based on all these data points, the classifier can make more accurate guesses regarding the user's possible or likely intent.

In a mobile device, which does not have a mouse and a keyboard, but instead is typically equipped with a touch sensitive screen or a stylus, the approaches set forth above may be modified. For example, instead of modifying a button in a traditional desktop style search field and search button pair, a mobile variation of the system can provide a search field for the user to enter text via an on-screen virtual keyboard, voice input, or some other input approach. As the user inputs text, the system can present a list of one-click actions in a drop down manner from the search field. While some of the one-click actions may be implementing a search in the traditional manner, other one-click actions may include navigating to a specific stage in a website, such as the stage in Amazon.com where the user is already logged in and simply has to execute the "one click" to purchase, or placing a bid on eBay, or at the final check-out phase of an online merchant's shopping cart with a desired item already added to the shopping cart. The user can dismiss one-click actions in the list by swiping them off the screen.

Figure 11:
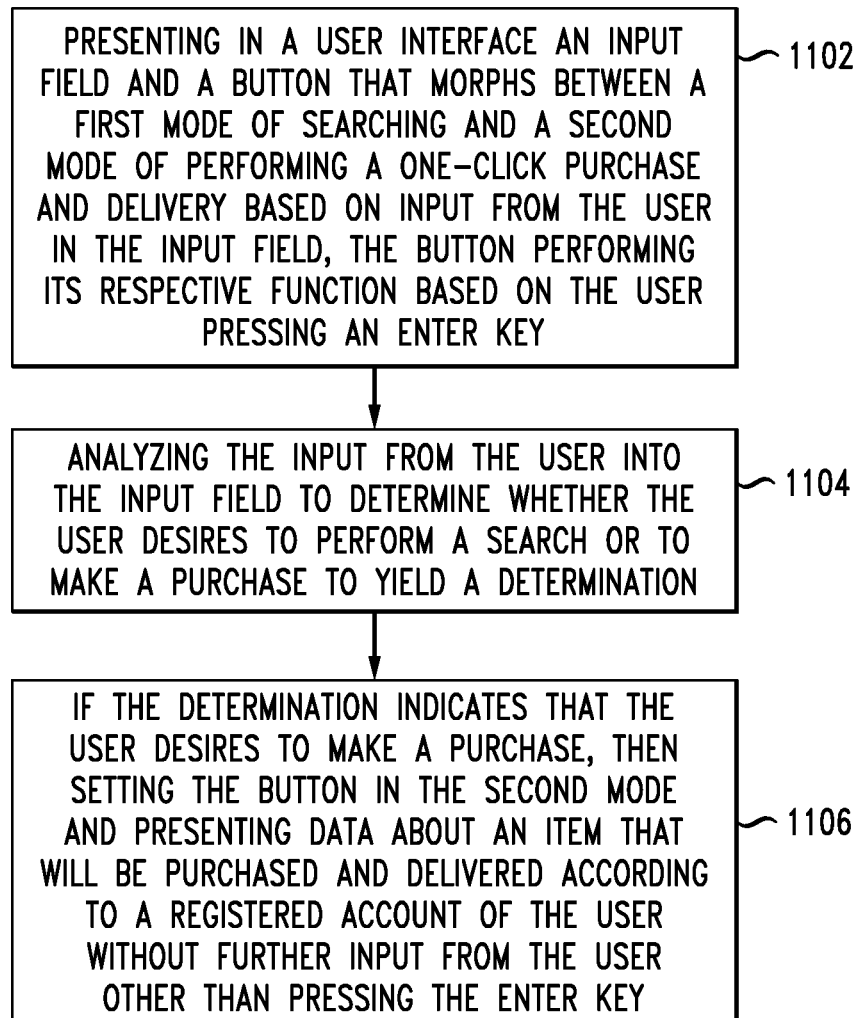
FIG. 11 illustrates an example method example for a modifiable entry button.

FIG. 11 illustrates a method example. The steps in the method example can be performed in any order, can be performed in other combinations or permutations that include additional steps or exclude all or part of some of the described steps. The system can present in a user interface an input field and a button that morphs between a first mode of searching and a second mode of performing a one-click purchase and delivery based on input from the user in the input field, the button performing its respective function based on the user pressing an enter key (1102). The user interface, while receiving the input, can present disambiguation information indicating to the user what key entry is needed to disambiguate the item to be purchased, and wherein upon receiving the key entry from the user such that a confidence level in the item desired to be purchased meets a threshold, the button can morph into the second mode. The first mode of the button can be a default mode for the button.

The system can analyze the input from the user into the input field to determine whether the user desires to perform a search or to make a purchase to yield a determination (1104). If the determination indicates that the user desires to make a purchase, then the system can set the button in the second mode and present data about an item that will be purchased and delivered according to a registered account of the user without further input from the user other than pressing the enter key (1106). The system can manage the entire process of buying and delivering an item by processing a payment for the item from the registered account associated with the input field entity and coordinating the delivery of the item through a business partner merchant.

The item can be a product or a service. The system can select the item that will be purchased and delivered based on a probability that the item is a most likely item that the user desires to purchase based on the input. For example, a classifier can determine the probabilities and the items based on a user history of purchases, a user history of searches, a time of day, a time of year, social media data, information about holidays, user profile data, and/or user account balance information.

Figure 12A:
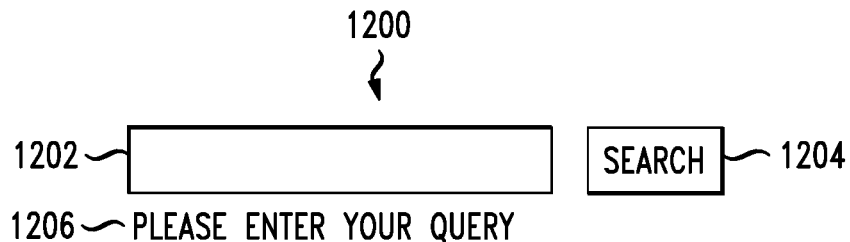
FIG. 12A illustrates an example modifiable entry button.
Figure 12B:
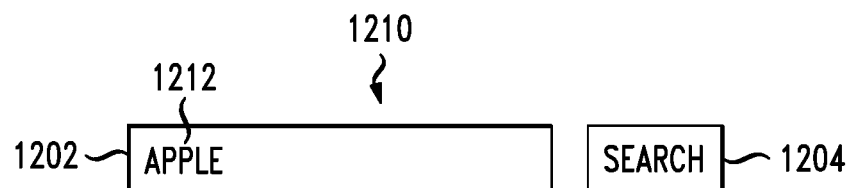
FIG. 12B illustrates input into an input field with a modifiable entry button.
Figure 12C:
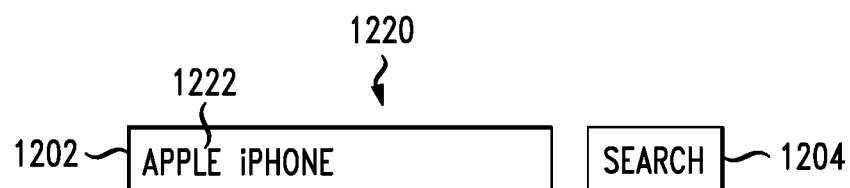
FIGS. 12C and 12D illustrate various changes and modifications that occur as a user types into an input field.
Figure 12D:
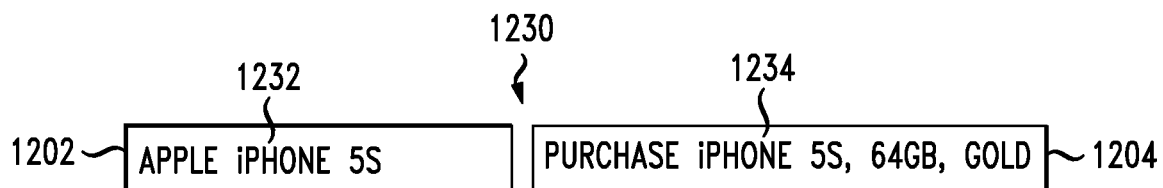

FIG. 12A illustrates a user interface 1200 with a generalized input field 1202 and a morphable search button 1204. The search button 1204 is really a generalized function button. The system can instruct the user 1206 to input a query or other input. The difference in this approach is that the function performed by hitting the "search" button will differ depending on the user input. This will be explained in stepping through the figures. FIG. 12B shows input in the interface 1210 starting to be put into the field 1202 of the word "Apple" 1212. The system processes this input to determine whether to change or modify the function performed when the user clicks "search" 1204 or hits the enter button. FIG. 12C illustrates additional input "Apple iPhone" 1222 in the user interface 1220. The system would continue to process that input and would be beginning to determine that perhaps the user desires to perform the function of a purchase as opposed to just a Google-type search. FIG. 12D illustrates an interface 1230 in which the input as continued to be more specific to include "Apple iPhone 5s" 1232. At a threshold point in analyzing the user input, the system reaches a high enough confidence that a particular function is desired. Here, the system changes the button 1204 from "search" to "Purchase iPhone 5s, 64 GB, Gold" 1234. Options not identified in the user input can be inserted into the text such that disambiguation can occur as well. But in this instance, the system, from a unified, generalized input field (from which searches and purchases can be made), enables the user to simply press "enter" or click on button 1204 in FIG. 12D and complete the processing and delivery of the purchase.

A further interface can include which various buttons are presented for clicking on by the user. Buttons can show different options for the user to make the purchase via "one-click." If there is still a likelihood that the user may simply want to search, then the search button can also be made available. One of these can be highlighted in some way to identify that if the user hits "enter" on the keyboard, that the particular highlighted button will be the one that will process the input as a purchase or a search. In this manner, the user can enter the input data first, and then perform the function, rather than first navigating to a website (like Google or Amazon.com), and then entering the user input data. Another interface allows the user to give a direct hint by typing "purchase iPhone 5S, 64 GB, Gold." In this case, the system could then present options for the user to purchase it through Apple with shipping information, or Amazon with its price and shipping information 1256 or through a carrier, for in store pickup. The system negotiates the necessary purchasing information (credit card, debit card, delivery address, etc.) with the various websites so that it is presented to the user as a one-click purchase in the interface. This currently is not available to users and they must navigate to the separate website, like Amazon.com, where they have such information registered.

In another example of how the search button can be morphed, in some browsers, the input field at the top can be used to either enter a URL or enter a google search. When you start with a search, there is a tag to the right of your typing that indicates what is going on. For example, like this: "dentists Dunkirk Maryland—google search." The "google search" language is not what the user types but is an indication that the browser is treating the text as a google search. This text of course can also be morphed such that as the text being typed is analyzed, the indication to the user of what will happen when "enter" is hit can change. For example, the user may start typing as see the following: "apple—google search." However, as the user continues to type, it may change as follows: "apple iPhone 5s—Amazon search." As the user continued to type and disambiguate, it could result in the following: "apple iPhone 5s 64 GB silver—Amazon one-click purchase." At this point, the user can hit "enter" and the system coordinates the information necessary to identify the product, purchase account information (which can be with one entity) and delivery information such that the desired product can be purchased and delivered to the user. Delivery can be managed by a second merchant entity from one entity that handles the payment processing.

Figure 13:
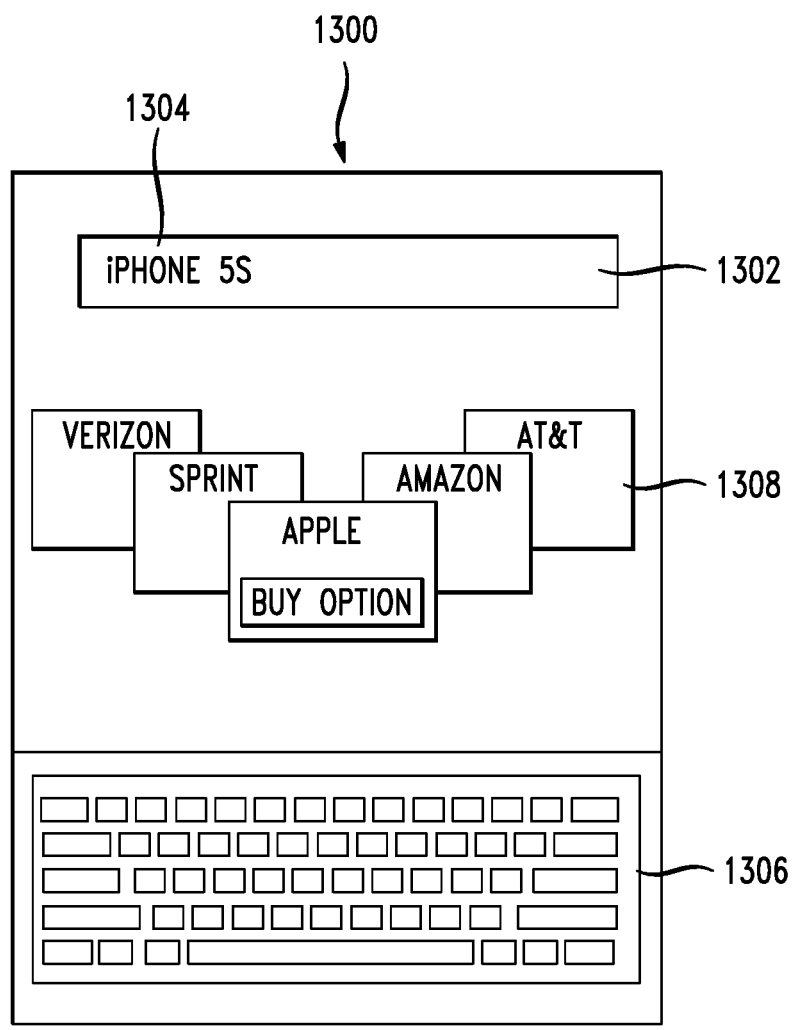
FIG. 13 illustrates an example user interface.

FIG. 13 illustrates a smartphone version of a user interface 1300 in which the input field 1302 has data 1304 that results in various options 1308 presented. A mobile keyboard 1306 is shown as well. Here, the one—search input field 1302 enables the user to put in a generalized input and have various "one-click" options 1308 to scroll through to process the input. Other user interfaces 1300 of course are contemplated for a mobile device or computer. An application and/or backend associated with the interface 1300 can preprocess purchasing and delivery information with various websites, vendors, etc. to enable the user to scan through options 1308 from different sources and just "one-click" from the chosen source. Further, the system can present preprocessed input to a stage not quite at a "one-click" stage but at a search-result stage such that the user can browse and study more before purchasing. For example, the results 1308 can indicate that the advertisement is associated with a buy now option and would be processed according to the principles disclosed herein, such as where the search entity has stored payment information for processing a payment and is communicating with the merchant which will handle delivery. As can be seen in FIG. 13, various merchant branding can be provided in the responses such that merchants can maintain a relationship with the buyer but the purchase process is simplified using the buy option features and APIs disclosed herein.

Universal Search Application Programming
Interface (API)

A system, method and computer-readable storage devices are disclosed which replace a URL based on intent determined by a classifier that processes input provided to the unified input field. In a typical web search, a user clicks to select a search field, enters text, waits for the results page to load, clicks a desired link in the results page, and finally arrives at the desired link after waiting for it to load. This process requires many steps. A unified input field can simplify this process.

For example, one-search.com can provide a unified input field. The user provides input via the unified input field, such as a search for "iPhone 5S." The system can identify, based on a user profile and on the entered text, a most likely desired page, such as a top ranked page in a listing of search results. The system can modify the "search" button associated with the unified input field to indicate that pressing enter or clicking the button would transition the user to that top ranked page from the search results without the intermediate steps outlined above. However, if the user enters additional information, such as "iPhone 5S 32 GB Silver," then the classifier can determine, based on the text and in conjunction with a user profile or search history, that the user's intent is to purchase the indicated iPhone. In this situation, the system can modify the search button to link directly to an Amazon.com or Apple.com page as if the user had already navigated there, selected the iPhone 5S, 32 GB, silver, added the iPhone to the cart, and was at an advanced stage or potentially the final stage in the check-out process. In the case of Amazon.com, the system could modify the button to transition to user to a page ready for the user to make a one-click purchase of the indicated iPhone. Alternatively, the system can modify the button to also include the action of clicking the one-click purchase button, so that the user can go to one-search.com, enter the text in the unified input field, and hit enter to purchase through Amazon. In this case, hitting enter after entering the text in the unified input field could lead to a purchase summary of the just-executed order, potentially allowing the user to modify shipping options, product options, billing information, or other order details. In another variation, the system can place the order automatically based on the user hitting enter in the unified input field, and transition the user to a webpage for purchasing accessories, service related to the item purchased, technical support pages, or some other related web resource.

Thus, the system can immediately transition the user from a one-search.com unified input field to a one-click purchase page on Amazon, for example, when the user hits enter in the unified input field. The system could also include the purchase in the transition action, so that the purchase is completed based on the user pressing enter in the unified input field. In this regard, one-search.com would handle the purchase but then coordinate with the second entity such as Amazon.com or a merchant to complete the delivery of the item.

The system can present different options or different destinations based on user input. For example, the system can present a message or indication that pressing "enter" by itself would transition the user to a one-click purchase page for the desired item on Amazon.com, while pressing "alt-enter" would automatically make the purchase on Amazon.com. The system can present a message to the user stating that pressing "shift-enter" would transition the user to a pre-populated shopping cart page on Apple.com, ready for the user to click "submit order." Multiple different keys and/or key combinations can trigger different behaviors based on the input in the unified input field. Further, the various actions and key combinations triggering those actions can change as the user enters additional text in the unified input field, or modifies text in the unified input field.

The user can establish preferences with the system, such as indicating that all purchases default to Amazon.com unless the price difference is greater than 20% at a different retailer with which the user has an existing account, or a price difference greater than 30% at a different retailer with which the user does not have an existing account. In this way, the system can act intelligently based on rules or policies that the user establishes.

The system can transition immediately to the new URL as if the user had clicked and navigated through a series of pages in a shopping cart, loading each page in turn and entering data automatically on the browser side, or the system can communicate with the target website directly to accomplish the various sub-tasks associated with selecting an item, adding that item to a cart, entering or selecting shipping and payment information, and so forth, leading up to the final stage where the user simply clicks "submit order." One example of such sub-tasks is that the one-search entity can process payment information and coordinate delivery data to the merchant who will deliver the item. The system can pre-perform all of these steps prior to presenting the page to the user after the user hits enter in the unified input field.

Figure 14A:
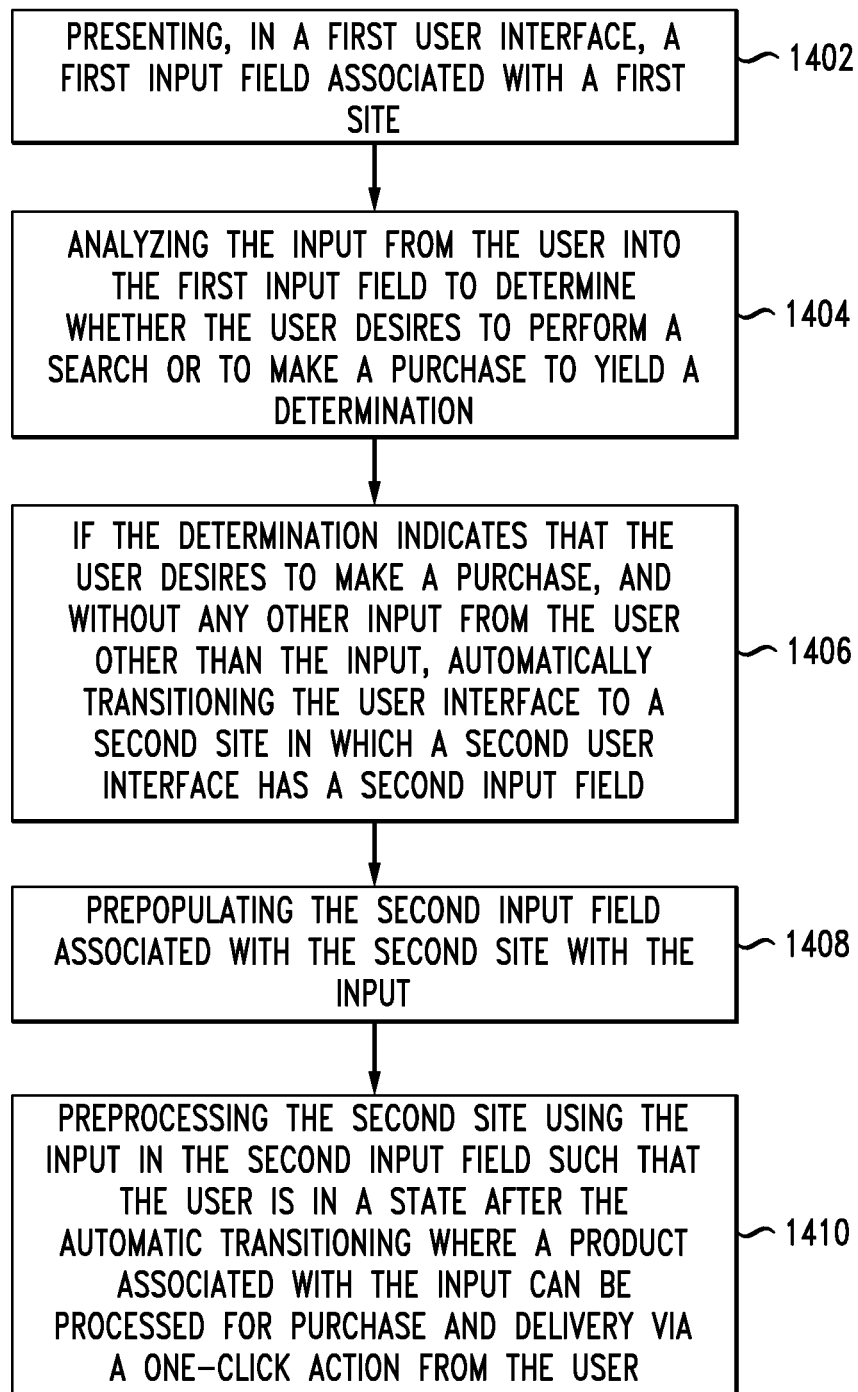
FIG. 14A illustrates an example method example for operation of a search application programming interface (API)

FIG. 14A illustrates a method example. The steps in the method example can be performed in any order, can be performed in other combinations or permutations that include additional steps or exclude all or part of some of the described steps. The system can present, in a first user interface, a first input field associated with a first website (1402). The system can analyze the input from the user into the first input field to determine whether the user desires to perform a search or to make a purchase to yield a determination (1404). The determination can indicate that a confidence level that the user desires to make a purchase has passed a threshold.

If the determination indicates that the user desires to make a purchase, and without any other input from the user other than the input, the system can automatically transition the user interface to a second website in which a second user interface has a second input field (1406). The system can prepopulate the second input field associated with the second website with the input (1408). The system can preprocess the second website using the input in the second input field such that the user is in a state after the automatic transitioning where a product associated with the input can be processed for purchase and delivery via a one-click action from the user (1410). The system can, for example, transmit user data from one of the first website and a browser to the second website, or automatically navigate through a shopping cart model of the second website to yield the state where the product can be processed for purchase and delivery via the one-click action. The system can automatically transition the user interface to the second website by replacing the first website in the uniform resource locator field of a browser with the second website in the uniform resource locator field of the browser. The system can further prepare a third website having a third input field preprocessed using the input, wherein the user can provide a switching input to indicate that the third website should be presented rather than the second website. In another example, the first site can process a payment for the item and coordinate with the second site to provide the necessary information for delivery of the item.

Figure 14B:
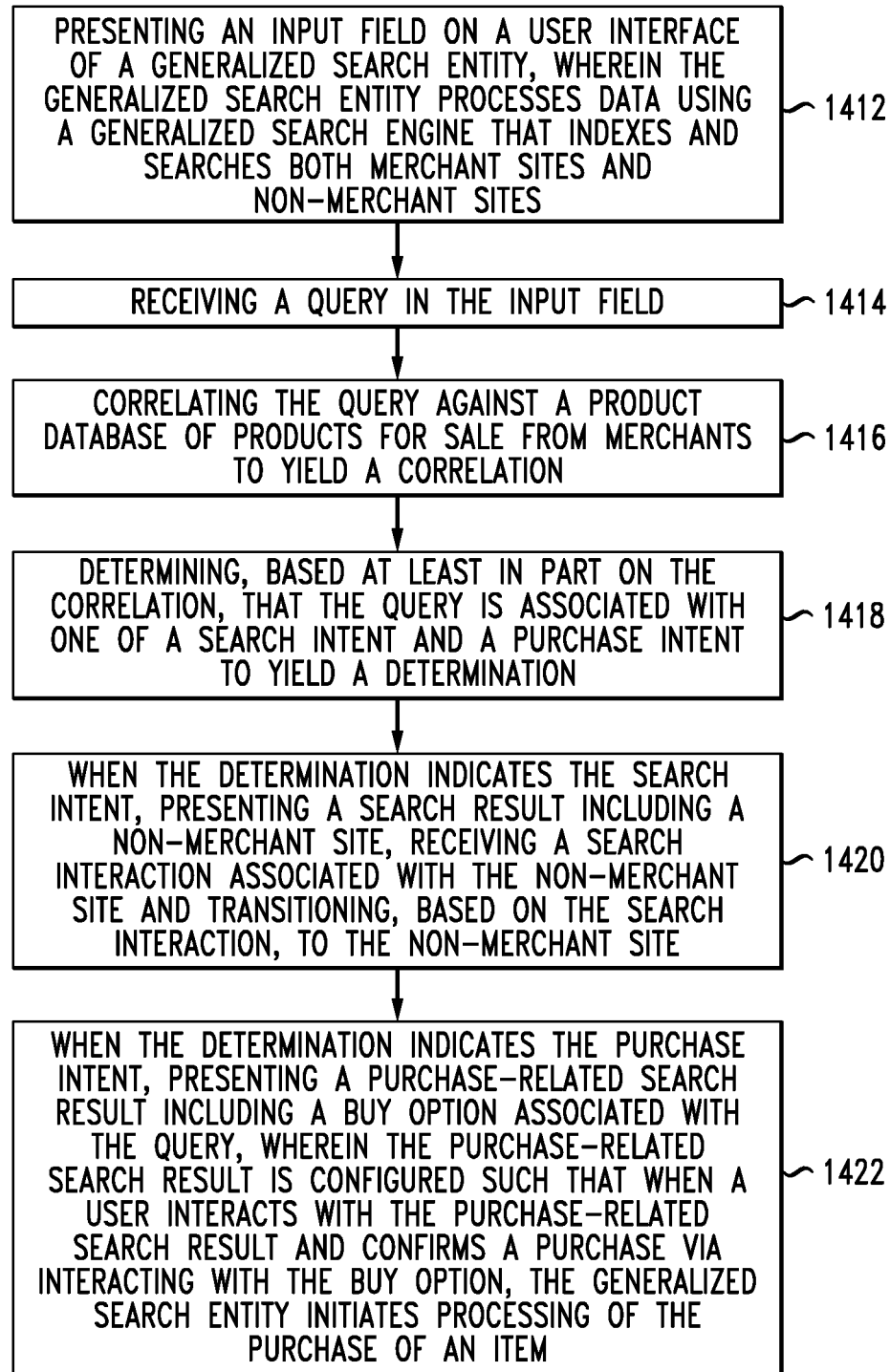
FIG. 14B illustrates another example method for operation of a search application programming interface (API) from a search engine side of the processing.

FIG. 14B illustrates an example of processing between a search engine and a merchant via the API from the search engine viewpoint. The method includes presenting an input field on a user interface of a generalized search entity, wherein the generalized search entity processes data using a generalized search engine that indexes and searches both merchant sites and non-merchant sites (1412), receiving a query in the input field (1414) and correlating the query against a product database of products for sale from merchants to yield a correlation (1416). The method includes determining, based at least in part on the correlation, that the query is associated with one of a search intent and a purchase intent to yield a determination (1418). When the determination indicates the search intent, the method includes presenting a search result including a non-merchant site, receiving a search interaction associated with the non-merchant site and transitioning, based on the search interaction, to the non-merchant site (1420). When the determination indicates the purchase intent, the method includes presenting a purchase-related search result including a buy option associated with the query, wherein the purchase-related search result is configured such that when a user interacts with the purchase-related search result and confirms a purchase via interacting with the buy option, the generalized search entity initiates processing of the purchase of an item (1422). The generalized search entity stores payment information, or a third party payment processing service stores payment information, and one or both of these entities communicates via a communication interface such as an API with merchant site for exchanging advertising information for products from product databases and payment information. Any piece of information of processing can occur on either side of the API between the browser, non-commercial site and/or the merchant site.

Figure 14C:
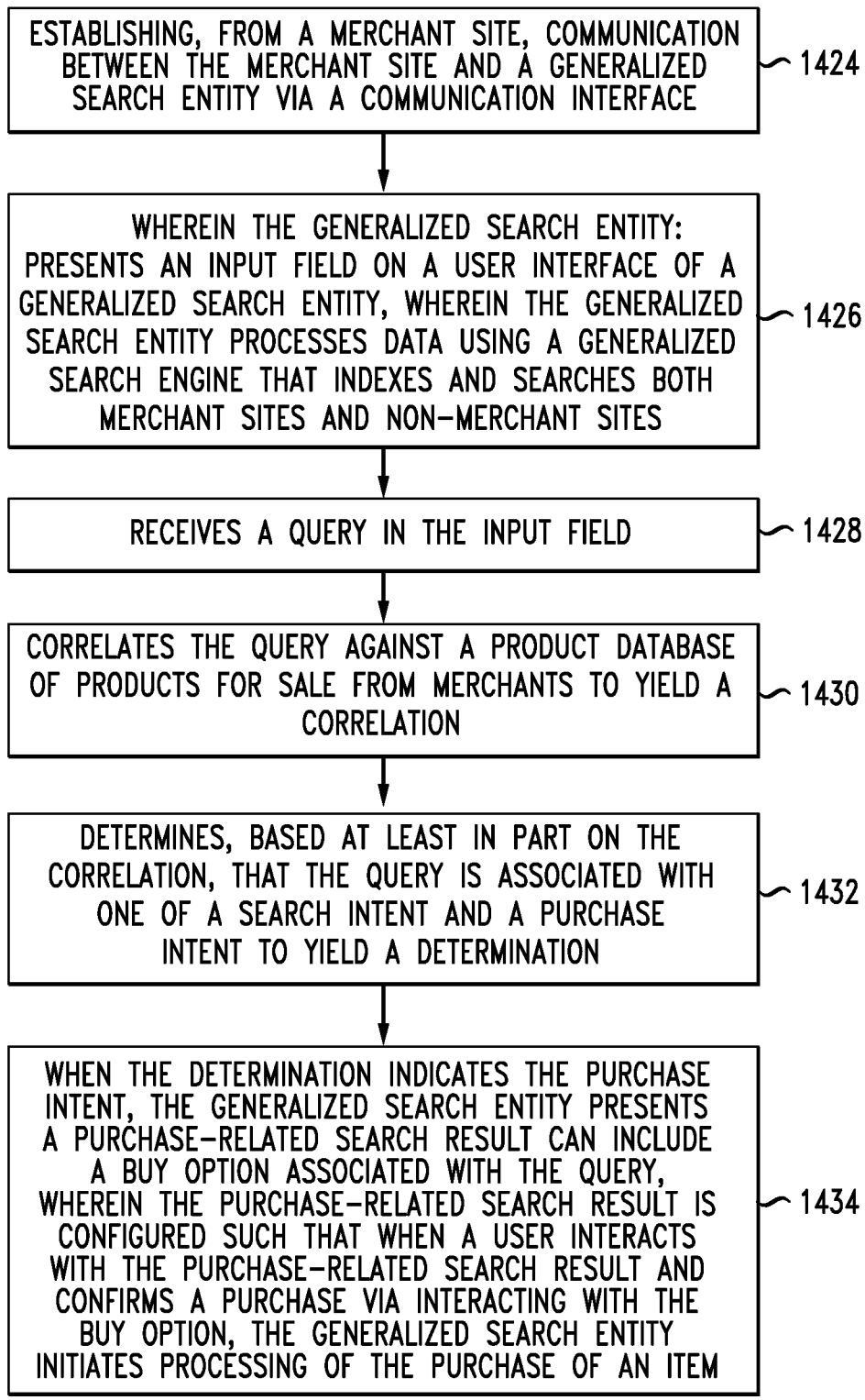
FIG. 14C illustrates another example method for operation of a search application programming interface (API) from a merchant side of the processing.

FIG. 14C illustrates a similar process to FIG. 14B but from the merchant viewpoint. A method includes establishing, from a merchant site, communication between the merchant site and a generalized search entity via a communication interface (1424). The generalized search entity in this case performs the operations describe above. Namely, the generalized search entity presents an input field on a user interface of a generalized search entity, wherein the generalized search entity processes data using a generalized search engine that indexes and searches both merchant sites and non-merchant sites (1426), receives a query in the input field (1426), correlates the query against a product database of products for sale from merchants to yield a correlation (1428), determines, based at least in part on the correlation, that the query is associated with one of a search intent and a purchase intent to yield a determination (1430). When the determination indicates the search intent, the generalized search entity presents a search result including a non-merchant site, receives a search interaction associated with the non-merchant site and transitions, based on the search interaction, to the non-merchant site (1432). When the determination indicates the purchase intent, the generalized search entity presents a purchase-related search result can include a buy option associated with the query, wherein the purchase-related search result is configured such that when a user interacts with the purchase-related search result and confirms a purchase via interacting with the buy option, the generalized search entity initiates processing of the purchase of an item (1434). The merchant site can then receive, via the communication interface, data about the purchase being accomplished and the necessary information to manage the delivery of the product to the buyer (1436).

Figure 15:
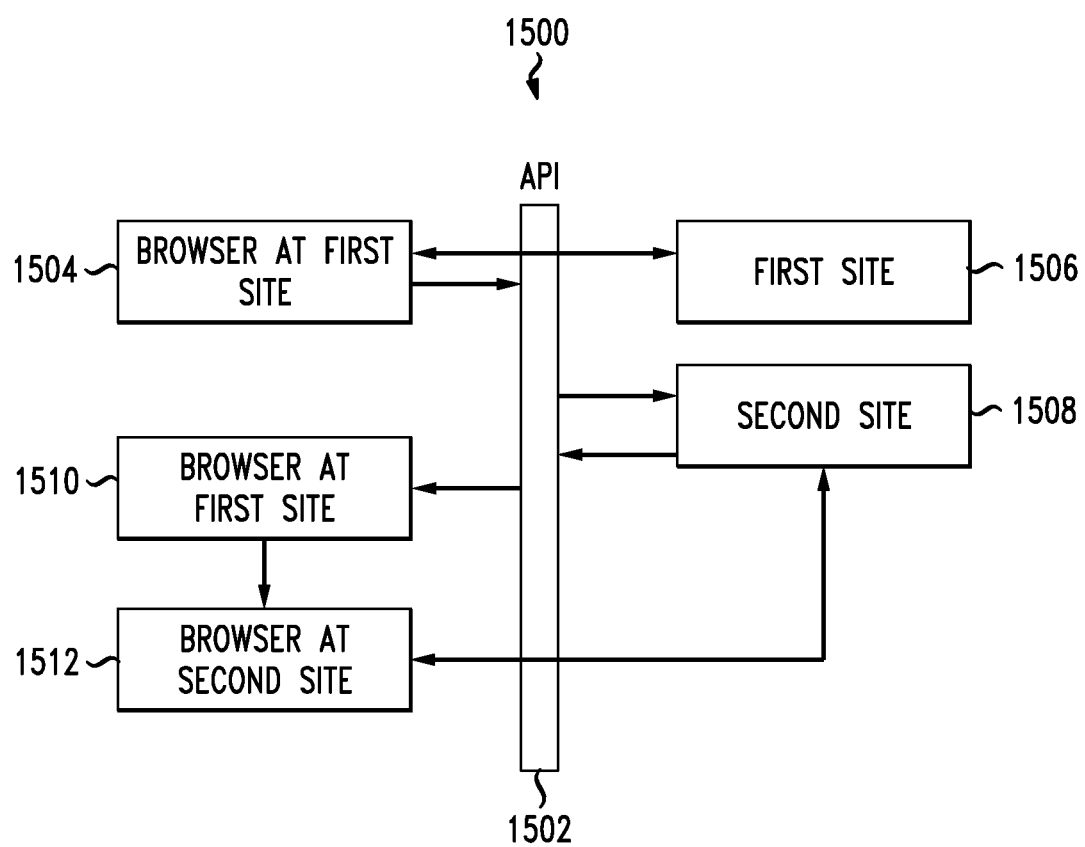
FIG. 15 illustrates communications via an application programming interface (API)

FIG. 15 illustrates an example scenario 1500 showing communications via an application programming interface (API) 1502. A one-search server, a web server, social media site or some other computing device or computing devices can provide services accessible via the API 1502. The services provided by the API 1502 can be accessible from a web server serving pages to web browsers or other web clients, an application for mobile devices, or from a web browser, such as through a JavaScript call to the API 1502. In this example, a browser navigates to a first website 1504, and retrieves the data for the first website, such as HTML, CSS, JavaScript, images, metadata, or other data, from a first website server 1506 without relying on the API 1502. Then, when the browser parses the data for the first website 1504, renders the page, and loads scripts or other executable instructions for the website, one or more portions of the data are linked to or reference the API 1502. For example, the attributes or instructions associated with a text field can instruct the browser to request search data via the API 1502.

The API 1502 handles the complexity of how to handle the request so that the browser 1504 does not necessarily know or care which server is handling the request, how the data is processed to achieve a result, and so forth. From the perspective of the web browser 1504, data is submitted to the API 1502, and the API provides resulting data or performs a resulting action. In this case, the text field can instruct the browser to submit a request to the API 1502 based on text entered in the text field. Thus, as the user enters the text "buy iPhone 5S 64 gb," the browser 1504 that has loaded the first website can submit the text string to the API 1502 character by character, word by word, or at some time interval (such as 250 milliseconds). Further, as part of the page loading and rendering process, the browser 1504 can submit user data for the user or can establish, re-establish, or link to an existing session with the API 1502, so the API 1502 has sufficient context data about the user to make appropriate decisions. In response to receiving text from the web browser 1504, the API 1502 can analyze the data, determine a response of one or more action, web browsing destination, desired item to purchase, and so forth. Then the API 1502 can cull the list of one or more actions to an N best list, which can be based on the type of device or browser the user is using. For example, on a mobile device with limited screen space the N best list can be limited to 3 actions or destinations, while on a desktop or laptop computer with more ample screen space the N best list can be limited to 10 actions or destinations. As part of determining the best actions or destinations, the API 1502 can communicate with a second website 1508. If the action is a one-click purchase action with the second website 1508, the API 1502 can, on behalf of the user or the browser 1504, negotiate with the second website 1508 to navigate to the appropriate location at the second website 1508, populate the appropriate data fields automatically, create an account (if necessary) or log in to an account for the user, and so forth. The API 1502 can handle all of these tasks automatically in response to an API request, and pass that information back to the browser at the first website 1510, which presents these possible destinations or actions to the user. If the user selects the destination or action associated with the second website, the browser can then directly continue the session with the second website 1508 that the API 1502 created or modified. In this way, the API 1502 can coordinate between websites and automatically enter user data in response to API calls and pre-navigate to various actions or destinations on behalf of the user so they are ready for the user to select and open.

An example method of applying the use of the API is as follows. A method includes presenting an input field on a user interface, wherein the input field is associated with processing data using a generalized search engine that indexes and searches both merchant websites and non-merchant websites, receiving input from a user in the input field to yield user input, and receiving an interaction associated with the user input indicating that the generalized search engine should process the user input. When the user input is determined to indicate a search intent, the method includes presenting a search result can include a non-merchant website and receiving a search interaction associated with the non-merchant website and transitioning the user to the non-merchant website. When the user input is determined to indicate a purchase intent, the method includes receiving, via an application programming interface, data associated with item from a merchant site, the item being selected based on the user input, presenting a purchase-related search result can include a buy now option associated with the item, receiving a user interaction associated with the buy now option and, based on the user interaction, processing a payment for the item via stored payment information for the user at the generalized search engine to yield purchasing data. The method can then include communicating the purchasing data via the application programming interface to the merchant site, whereby the merchant site can manage delivery of the item to the user.

From the merchant side, the process is as follows: A method includes establishing, from a merchant site, communication between the merchant site and a generalized search entity via a communication interface or an application programming interface. The generalized search entity operates to present an input field on user interface, wherein the input field is associated with processing data using a generalized search engine that indexes and searches both merchant sites and non-merchant sites. The generalized search entity receives user input in the input field. When the user input indicates a search intent, the generalized search entity presents a search result can include a non-merchant site, receives a search interaction associated with the non-merchant site and transitions the user to the non-merchant site. When the user input indicates a purchase intent, the generalized search entity presents a purchase-related search result including a buy option associated with the user input, the search result including an item offered from the merchant site. The generalized search entity receives a purchase interaction associated with the buy option. THe merchant side of the process is as follows. When the user input indicates the purchase intent, the method includes, receiving, via the communication interface and at the merchant site, payment information from the generalized search entity, the payment information associated with the purchase interaction for the item and processing deliver of the item via the merchant site. In this manner, the merchant site or application can communicate and receive communications via the application programming interface or communication interface to achieve the presentation and a sale of one of its items.

It is also noted that while FIG. 15 illustrates websites communicating via an API, that the API could also enable communication between two applications on a device, or could cause communication between a website and an application on a device. The API is meant to be the means of two different entities, each of which have different purposes or means of interfacing with users, such that coordination between the two entities can be facilitated.

Social Networking Applications

Twitter

Another aspect of this example is how the concepts apply to social networking applications such as Twitter, mentioned above. Twitter is a social networking application or service in which users can send and read short messages, usually equal to or less than 140 characters. Registered users can post "tweets" which are transmitted through the network to followers. Users can post images and videos as well. Unregistered users can read tweets. Users access the service through a website, a mobile device application or through some other application. An example of the concepts disclosed herein applying to a social network like Twitter are as follows. A method can include presenting an input field on a user interface of a social networking site, wherein the input field is associated with processing data for social networking within the social networking site. The social networking site, in the case of Twitter, can transmit short 140 character or less text-based messages from senders to followers. Images or videos can also be transmitted through this site with metadata pointing to or referencing a product. In the case of an image or video, metadata can be associated with the image or video that references the product database and triggers the processing and presentation of a buy option. This would apply to a Twitter account, Facebook, Instagram, Pinterest and so forth. The general approach in these examples is described below in FIG. 29 and its associated discussion.

Usually, users input data into an input field and the data (text, pictures, and/or video, etc.) is transmitted to followers of that user. The method can include presenting an input field or mechanism through a social networking site and receiving text-based user input in the input field and determining whether the text-based user input is associated with a product database of products for sale from a merchant using the text-based user input to yield a first determination. This can be done through a link or analysis of the user input. In this regard, for example, a twitter user can input text into a tweet and the system will analyze that text to determine whether the input references a product database and thus can be associated with a sale, advertisement, purchase or other intent. If the user input does not reference a product database, then the system can determine that the user input is not sale related but merely to be transmitted through the social networking system. In other words, the user may just be providing a normal tweet to the system which is distributed or transmitted in the normal fashion through the social networking site according to a first intent (a normal tweet intent to share information with followers).

However, when the determination indicates that the user has referenced a particular product database, and thus the sale-related intent, the method includes transmitting the text-based user input through the social networking site with a buy option associated with the text-based user input. In this case, for example, the text input can provide a link to the product database or a service that indicates an intent to send an advertisement, or to buy a product, or to sell a product. If the intent is a sale or purchase-related intent, then in additional to just transmitting the tweet through the social network, the system can coordinate and present a buy button associated with the text input. Much like the Google example disclosed herein, the social networking site or a service associated with the social networking site can store user payment processing information thus only requiring a user to input such information once. Thus, a recipient of the tweet will not only see at least some text of the tweet but will see a buy button and the system can receive a purchase interaction associated with the buy option. The system would then process the purchase of in item associated with the tweet. Through an API, as is noted herein, the purchase can be processed (by the social networking site) and delivery can be managed by the merchant as coordinate through the API. This process will increase conversion of sales through social networking. In each case where "text-based input" is mentioned herein, an alternate approach can be to receive an image or a video with metadata which provides the information necessary to access the product database and the processing continues in a similar manner. Of course similar approaches can be used through any social networking site like Facebook and others.

Another aspect is handling buy options through a social networking site from the standpoint of the merchant who is selling products. In this aspect, a method can include establishing, from a merchant, communication between the merchant and a social networking site that processes and transmits short messages of 140 characters or less within the social networking site. An API can be established through which such communication can occur. The social networking site presents an input field on a user interface, receives textual user input in the input field, and determines whether the textual user input is associated with a product database of products for sale from the merchant using the text-based user input to yield a determination. For example, a URL can be placed within a tweet that access a database of products and the merchant can have products offered through that database.

When the determination indicates that there is no reference in the textual user input to the product database, the social networking site transmits the textual user input through the social networking site in the normal fashion, such as sending the tweet or posting the Facebook post. When the determination indicates that the textual user input references the product database of products for sale, and thus indicating a sale-related intent, the site transmits the textual user input through the social networking site with a buy option for an item associated with the textual user input. Thus, those reading or receiving a tweet or a posting will see a buy option associated with that item. Recipients can have their payment information stored through the social networking site or another service like Apple Pay or Paypal such that products from all different merchants that are offered through this service can be purchased without needing to be transferred to that merchant for inputting payment information, etc. The merchant then receives an indication that a purchase interaction associated with the buy option was received (i.e., a recipient clicked on the buy button) and processes a delivery of the item to a person who provided the purchase interaction or processing the delivery based on the purchase interaction. The social networking site can then make a payment to the merchant for the item. The social networking site, or its agent, may also charge a small fee for processing the sale. Determining whether the textual user input is associated with the product database of products for sale from the merchant using the textual user input comprises communicating or correlating between the social networking site and the product database via an application programming interface. Processing delivery of the item can include receiving information from the social networking site that payment for the item is complete and receiving information that the merchant selling the item through an application programming interface is to ship the item to the person.

An example of the Twitter example relates to the processing from the merchant standpoint. In this case, the merchant posts a short message of 140 characters or less within an input field on a user interface of a social networking site. The social networking site receives text-based user input in the input field and determines whether the text-based user input is associated with a product database of products for sale from a merchant using the text-based user input to yield a determination. When the determination indicates that there is no reference to the product database, the social networking site transmits the text-based user input through the social networking site. When the determination indicates that the text-based user input references the product database of products for sale, and thus indicating a sale-related intent, the social networking site transmits the text-based user input through the social networking site with a buy option associated with the text-based user input, receives a purchase interaction associated with the buy option, and processes a purchase of an item based on the purchase interaction. The merchant then receives, at the posting entity, purchase data indicating that the item has been purchased. Thus, the merchant, through an API, will receive notice that a recipient has made a purchase of the item, and that the merchant should ship the item.

In another aspect, the method can include presenting an input field on a user interface of a social networking site, wherein the input field is associated with processing and transmitting short messages of 140 characters or less within the social networking site, receiving user input including at least user text in the input field, and determining whether text based on the user input correlates to a product in a database of products for sale by a merchant to yield a correlation. When there is not a product that correlates to the text, the method includes transmitting the user input through the social networking site. When there is a product that correlates to the text, and thus indicating a sale-related intent, the method includes transmitting the user input through the social networking site with a buy option associated with the user input, receiving a purchase interaction associated with the buy option and processing a purchase of an item based on the purchase interaction.

Facebook, Instagram, Pinterest, Youtube

Of course similar approaches can be used through any social networking site like Facebook, Instagram, Pinterest, Youtube, and others. In each case, the determining of whether a sale or purchase related intent is associated with a posting can involve analyzing the input (often text but it does not necessarily require text and can include an image like in Pinterest) for a reference to a product or service that can be purchased by recipients of the posting through the respective site. If the analysis does not yield any reference to such a product or a service, found often in a database of products/services, then the respective site simply transmits or posts the sender data (Tweet, Facebook posting, pictures on Instagram, Pinterest, etc.) through the social networking site without any buy now option. The site in that case processes the input in the conventional manner. In other word, the determination that does not necessarily require a parameter to be set or a specific result stored in memory. For example, if the tweet does not include a URL pointing to a product database, and the system is analyzing the input for such data, the absence of the reference to the product database can in and of itself be the determination that there will not be a buy now option presented through the social networking site for that posting. When the input includes a reference to a product database, the site can implement unconventional processing in which a buy button is presented to recipients or viewers of whatever results the site presents by processing the user input. The site includes additional coding and processing to enable the user to either purchase an item while still in the site or easily transition to a merchant site at a deep-link to enable quick and easy purchase of the product, or to continue shopping at the merchant site. For example, if a picture of a red hammer is presented with an associated buy button, the site, when the user clicks on the red hammer picture, can be transitioned to a deep link with the merchant site as though the user had searched for a red hammer and was ready to make a purchase. Upon being transitioned to the deep link, the user in this case can easily simply purchase the hammer or put it into a shopping cart and continue shopping or continue processing the purchase on the merchant site.

In a social networking case such as Instagram or Pinterest where images are posted from a posting entity to a group of recipients, the process can operate as follows. A method includes receiving a posting of an image through a social networking site, wherein the social networking site receives and transmits posted images from a posting entity to receiving entities. A system can analyze the image for associated text-based data or metadata. The text data can be metadata or other data that provides information about the image and can reference a product database, for example an inventory database, associated with an item in the image. The system determines whether the associated text-based data identifies a product within a product database for sale from the posting entity to yield a determination. For example, the system can determine that there is inventory for the item in the product database. When the determination indicates that there is no reference to the product in the product database, the system transmits the image input through the social networking site without a buy now button. In this manner, the posting of the image would proceed through the social networking site in the normal, conventional fashion. When the determination indicates that the image references the product in the product database, and thus indicating a purchase or sale-related intent, the system transmits the image through the social networking site with a buy option associated with the image. When the system receives a purchase interaction associated with the buy option, the system processing a purchase of an item based on the purchase interaction. This involves implementing additional code to provide an unconventional series of steps for a social networking site.

Determining whether the image is associated with the product in the product database from the posting entity can include communicating between the social networking site and the product database via an application programming interface. The social networking site can process the payment and communicate the sale to the posting entity such as a merchant. The merchant can then deliver the item. Processing delivery of the item comprises managing a payment for the item and informing the posting entity selling the item through an application programming interface to ship the item. A user or merchant can have a pre-existing account storing preferences governing how the image and the buy option are presented. The buy option can include a one-click purchasing option, which, because the social networking site stores the purchase data of the recipient who is making the purchase, can occur without the need of moving or transitioning from the social networking site to a merchant site to complete the sale.

One example also covers the above process for an image sharing site from the standpoint of the merchant, who can post images on the social networking site that operates as described above. In this case, the merchant posts the images with the text data that points to or accesses a product database such that upon confirmation of a product in the product database for sale, the social networking site presents the image with the buy button and upon confirming a purchase, informs the merchant of the purchase so that the merchant can process delivery.

With respect to processing from the merchant, side for a buy option in a social networking site, the method can include posting, by a posting entity such as the merchant, of an image, text or a video through a social networking site in which users share images, text or videos. The social networking site is typically structured to receive and transmit posted images, text or videos from the posting entity to receiving entities. The social networking site determines, using text data or metadata associated with the image or the video, whether there is a product within a product database for sale from the posting entity to yield a determination. The social networking site can determine whether the image or the video is associated with the product in the product database from the posting entity via an application programming interface between the social networking site and the product database.

When the determination indicates that there is no reference to the product in the product database, the site transmits the image or the video through the social networking site to the receiving entities without an option to buy a product but performs in the conventional manner. When the determination indicates that the image or the video references the product in the product database, and thus indicating a sale-related intent, the site transmits the image or the video through the social networking site with a buy option and receives data that a user of the social networking site interacted the buy option to yield a purchase interaction. The merchant (posting entity) then processes a delivery of an item based on the purchase interaction. The social networking site can process a payment for the item through its own mechanism or can use a service like Apple Pay and the like. The posting entity can receive from the social networking site payment data after the social networking site processes the payment for the item. When the user of the social networking site interacts with the purchase interaction, the merchant can receive a transition of the user of the social networking site from the social networking site at a deep link on a site of the posting entity. This is an optional approach in which the payment processing can occur outside of the social media site and by the merchant. The social networking site can transition the user to a deep link within the site of the posting entity in a state in the site of the posting entity in which the user of the social networking site can purchase the item. In this case, the posting entity can receive a payment of the item from the user of the social networking site.

For example, from the merchant standpoint, the method can include posting, from a posting entity such as the merchant, an image, text or a video on a social networking site. The social networking site can receive and transmit posted items from a posting entity to receiving entities, wherein the posted items comprise at least one of text, images, and videos. The social networking site analyzes the image, text or the video for associated text-based data or metadata and determines whether the associated text-based data or metadata identifies a product within a product database for sale from the posting entity to yield a determination. When the determination indicates that there is no reference to the product in the product database, the social networking site transmits the image, text or the video through the social networking site without an option to buy, in other words in the conventional fashion. When the determination indicates that the image, text or the video references the product in the product database, and thus indicating a sale-related intent, the social networking site transmits the image, text or the video through the social networking site with a buy option associated with the image or the video and receives a purchase interaction from a buyer associated with the buy option. Once the social networking site receives this interaction, there is a necessity of completing the sale of the product. From the merchant standpoint, the merchant then receives a transition of the buyer from the social networking site to a deep link in the site operated by the posting entity. The merchant processes the purchase and delivery of the item from the posting entity. In one aspect, the merchant presents to the user after the transition a deep link within the site of the posting entity in a state in the site of the posting entity in which the user of the social networking site can purchase the item. The item presented in the image, text or video posted on the social networking site can be the same item purchased. In one aspect, the determining of whether the associated text-based data identifies the product within a product database for sale from the posting entity to yield a determination is performed via an application programming interface between the social networking site and the product database.

In another aspect, the method includes receiving a posting of an image or a video through a social networking site including Facebook, identifying data associated with the image or the video and determining whether the data identifies a product within a database of products for sale from the posting entity to yield a determination. When the determination indicates that there is no reference to the product in the product database, the method includes transmitting the image or the video through the social networking site without a buy now button. When the determination indicates that the image or the video references the product in the database of products, and thus indicating a sale-related intent, the method includes transmitting the image or the video through the social networking site with a buy option associated with the image or the video to buy the product, receiving a purchase interaction associated with the buy option and processing a purchase of the product based on the purchase interaction, wherein processing the purchase occurs within Facebook.

Facebook, Twitter and any other social networking site can process user input including text plus optional other input such as a video, an image or other user input in connecting with a posting. The combination of user input can depend on the structure of a particular non-commerce site. For example, Twitter's user input differs from Facebook's user input. Both involve posts that can include text alone or text plus other user input. The respective social networking site will process user input according to its functioning. An image plus some description or metadata describing a location or a product in a product database can be input. The user input in this case can include any combination of user input according to a non-commerce site that includes a reference to a product in a product database that indicates that the posting on social media should include a buy button when the post is processed through the social networking site. The posting can be prepared and posted by an individual user or an automated system depending on the processing of the non-commercial site.

Modified Browser Interface

A system, method and computer-readable storage devices are disclosed which prepopulate tabs based on intent determined by a classifier that processes input provided to the unified input field. In a typical web search, a user clicks to select a search field, enters text, waits for the results page to load, clicks a desired link in the results page, and finally arrives at the desired link after waiting for it to load. This process requires many steps. A unified input field that prepopulates tabs in the browser can simplify this process.

For example, one-search.com can provide a unified input field. The user provides input via the unified input field, such as a search for "iPhone 5S." The system can identify, based on a user profile and on the entered text, the n most likely desired pages, such as from a listing of search results if the user were to execute a search using the text entered to that point. The system can then instruct the user's browser to create and populate new tabs in the browser with the n most likely desired pages. The value for n may vary based on user preferences, already open tabs, how many pages exceed a confidence threshold, available memory, network bandwidth, which pages are ready to be loaded, diversity within the pages to be populated in the tabs, and so forth. In one variation, the system can automatically create and populate three new tabs in the browser, each with a different likely desired result in response to the input provided via the unified input field. One tab can be an Amazon one-click purchase page, one tab can be the final page of a populated shopping cart at Apple.com, and one tab can be the final page of a service contract for purchasing the iPhone 5S with a 2 year service contract through AT&T. In this way, the user can automatically select, browse, and compare the tabs to determine which one he or she desires. At this stage, however, the input data does not necessarily provide sufficient information to lead to a specific purchase. Thus, the system can select pages like an Apple information page about the iPhone 5S, a Wikipedia page about the iPhone 5S, or a popular video review of the iPhone 5S.

However, if the user enters additional information, such as "iPhone 5S 32 GB Silver," then the classifier can determine, based on the text and in conjunction with a user profile or search history, that the user's intent is to purchase the indicated iPhone. In this situation, the system can load purchase-specific tabs in the browser. For example, the system can load tabs directly to an Amazon.com or Apple.com page as if the user had already navigated there, selected the iPhone 5S, 32 GB, silver, added the iPhone to the cart, and was at an advanced stage or potentially the final stage in the check-out process. In the case of Amazon.com, the system could load a tab that is ready for the user to make a one-click purchase of the indicated iPhone. Alternatively, the system can load a tab that automatically performs the actions of clicking the one-click purchase button, so that the user can go to one-search.com, enter the text in the unified input field, and hit enter to purchase through Amazon, and the resulting purchase page is loaded in a new tab automatically for the user. In this case, hitting enter after entering the text in the unified input field could cause a new tab to be loaded with a purchase summary of the just-executed order, potentially allowing the user to modify shipping options, product options, billing information, or other order details. In another variation, the system can place the order automatically based on the user hitting enter in the unified input field, and transition the user to a new tab of a webpage for purchasing accessories, service related to the item purchased, technical support pages, or some other related web resource.

When the user enters a first partial input string in the unified input field, the user may click back and forth between one or more tabs to preview the results. Then the user can go back to the tab with the unified input field, and modify or add to the input string. The system can remove the previously generated tabs and populate new ones, or the system can keep the tabs that the user has opened, looked at, manipulated, or clicked on, for example, while eliminating the other previously generated tabs. In this way, the user can select which tabs to keep and which tabs the system is free to remove or replace based on the updated input string.

The system can predictively retrieve and cache potential matching pages for inserting into new tabs based on what the user is typing. For example, if the user is typing "Apple" in the unified search field, the system can retrieve pages of the three most popular Apple products or the three Apple products in which the user is most likely to be interested. Then, as the user types "Apple iP", the system can narrow the search to products that match the partial string, such as Apple iPods, iPhones, and iPads. Items such as the MacBook Air or the Apple TV would not be included, as they do not match the partial input string in the unified input field. The process can continue refining the cached pages, thereby saving time so the pages are ready to present to the user when a certain event occurs or a threshold is met. For example, in one variation, the system can wait for the user to press enter in the unified input field to populate the new tabs, even though the system is preparing, retrieving, and caching pages in advance of the user pressing enter. In this way, when the user presses enter in the unified search field, the system can very quickly create new tabs and populate the new tabs with the retrieved pages. If any additional pages have not been predicted or retrieved, tabs for those pages can load normally, while others are ready for the user to view.

In one variation, the system can immediately transition the user from the tab displaying the unified input field to a different tab that is created in response to input provided via the unified input field. While most browsers allow the user to a mouse to click on the tab, or press a keyboard shortcut such as ctrl-tab, ctrl-shift-tab, ctrl-pgup, or ctrl-pgdn to navigate between tabs, the unified input field can allow the user to press enter or some other key at the end of providing input via the unified input field to automatically switch to a newly created tab populated in response to the input. For example, the system can switch to a tab of a one-click purchase page on Amazon when the user hits enter in the unified input field. The system could also include the purchase in the transition action, so that the purchase is completed at Amazon based on the user pressing enter in the unified input field as well as switching the user to that new tab.

The system can present different options or different destinations based on user input. For example, the system can present a message or indication that pressing "enter" once would transition the user to a first new tab, while pressing "enter" twice would automatically transition the user to a second new tab, and pressing "enter" thrice would automatically transition the user to a third new tab, and so forth. Multiple different keys and/or key combinations provided via the unified input field can trigger different behaviors for managing or navigating tabs based on the input provided in the unified input field. Further, the various actions and key combinations triggering those actions can change as the user enters additional text in the unified input field, or modifies text in the unified input field.

Figure 16:
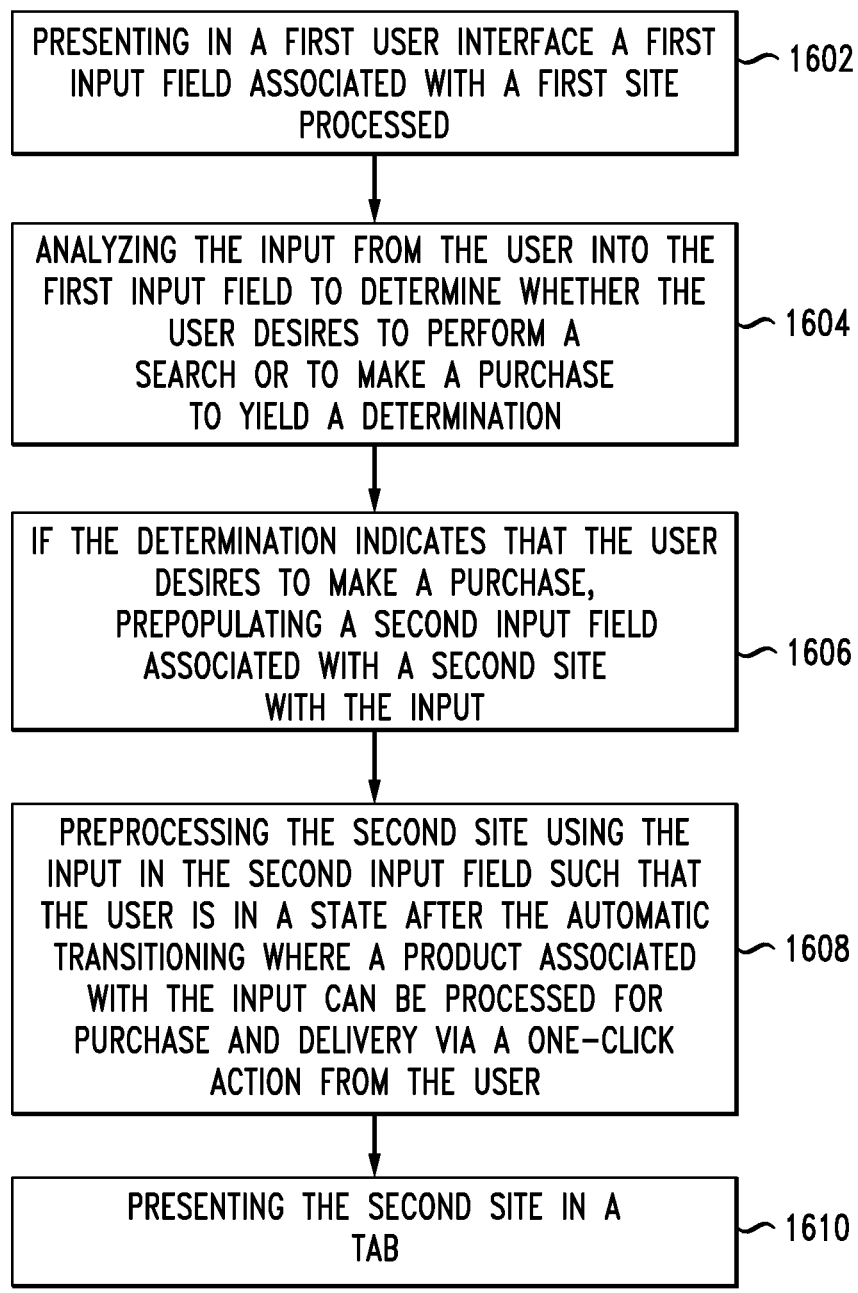
FIG. 16 illustrates an example method example for an example modified browser interface.

FIG. 16 illustrates a method example. The steps in the method example can be performed in any order, can be performed in other combinations or permutations that include additional steps or exclude all or part of some of the described steps. The system can present in a first user interface a first input field associated with a first website processed via a browser (1602).

The system can analyze the input from the user into the first input field to determine whether the user desires to perform a search or to make a purchase to yield a determination (1604). If the determination indicates that the user desires to make a purchase, and without any other input from the user other than the input, the system can prepopulate a second input field associated with a second website with the input (1606). The system can preprocess the second website using the input in the second input field such that the user is in a state after the automatic transitioning where a product associated with the input can be processed for purchase and delivery via a one-click action from the user (1608). The system can preprocess the second website by transmitting user data from one of the first website and a browser to the second website. Payment data can be communicated between the browser and the site to simplify the process for the user. The system can preprocess the second website by automatically navigating through a shopping cart model of the second website to yield the state where the product can be processed for purchase and delivery via the one-click action. The processing can include that when the user interacts with the interface to make a purchase, the entity associated with the input field processes a payment of an item and coordinates with a separate merchant for delivery.

The system can present the second website in a tab in the browser (1610). The system can present a visual notification to the user associated with the tab that clicking on that tab will present to the user the second website in the state in which the user can process for purchase and delivery the product via the one-click action. The visual notification can be a popup, an indication on the first website, a browser-specific notification associated with the tab, or in some other location in the user interface. The system can present multiple additional websites in additional tabs in the browser, and can provide a mechanism, via the unified input field, to manipulate or navigate through those tabs independently of the established keyboard shortcuts and mouse clicks inherent in the browser. For example, the system can preprocess a third website using the input in a third input field such that the user is in a state after the automatic transitioning where a product associated with the input can be processed for purchase and delivery via a one-click action from the user, and presenting the third website in a second tab in the browser.

Figure 17A:
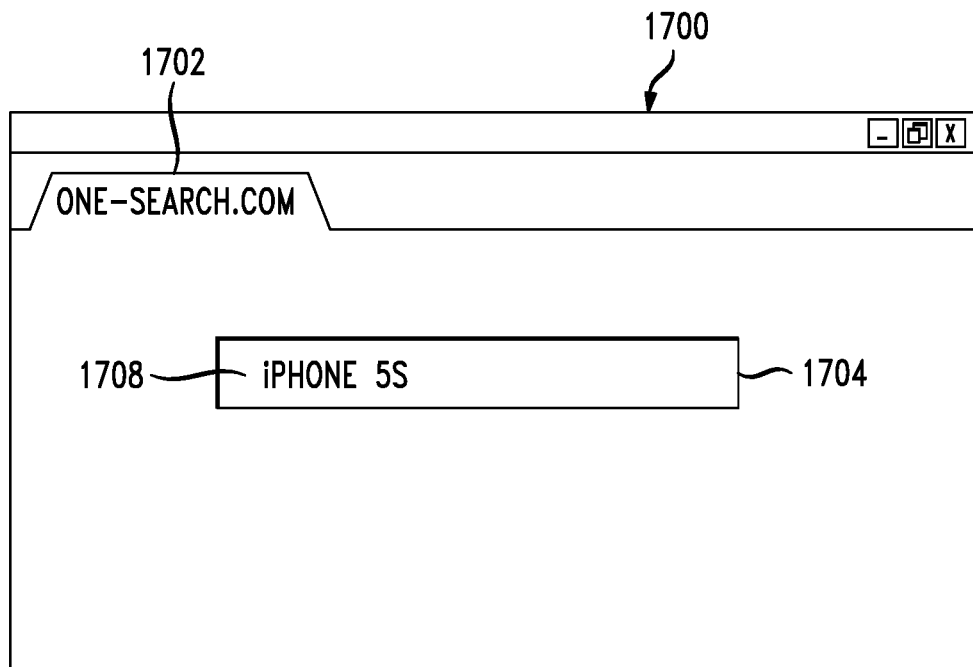
FIG. 17A illustrates an example browser interface.
Figure 17B:
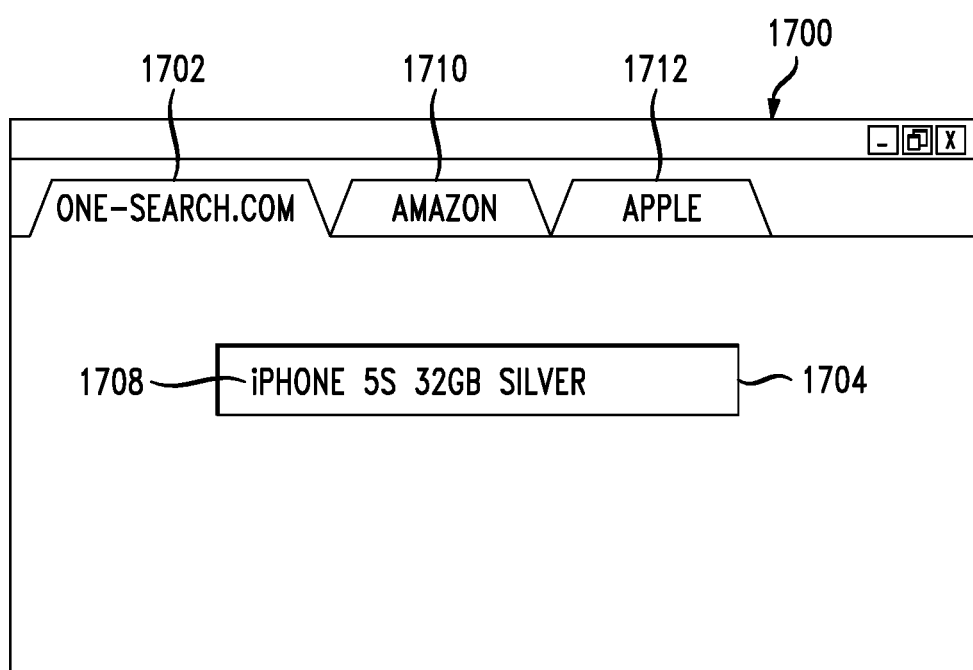
FIG. 17B illustrates an example interface with prepopulated tabs.

FIG. 17A illustrates an interface 1700 having a tab 1702 with an input field 1704 and user input 1706. This input field 1704 is open ended or open loop in that it does not automatically process the user input as a search but can process the input to perform a number of different functions. Assume the user inputs "iPhone 5S." The system analyzes that input and determines that there is a high likelihood that the user desires to make a purchase. The system then preprocesses that input on one or more website, such as Amazon.com and Apple.com, such that each of these alternate websites are positioned in a state which is the equivalent of the user having navigated to that website, and entered "iPhone 5S" and continued to browse and navigate to a state in which one more click causes a purchase and delivery of the product. Thus, in FIG. 17B, the system can present a tab 1710 for Amazon and a tab 1712 for Apple. The user can continue to type further text such as "32 GB Silver" 1708. The system continues to refine the preprocessing of the alternate websites. Thus, after the user is done, if the user clicks on the Amazon tab 1710, that tab will reveal a preprocessed search in a "one-click" state such that the next click can enable the user to buy and have delivered that product. Where websites like Apple don't have a similar "one-click" option, the system can navigate and preprocess a shopping cart model to essentially cause the tab 1712 to present the shopping cart, ready in a state where the user just needs one more click to make the purchase. The browser or one-search.com application can, via an API communicating with the alternate website, provide the purchasing account data, delivery address, passwords, etc. necessary to navigate in the background through the purchasing pages of a website that does not have one-click purchasing capability. The API may only need to communicate necessary data for completing a transaction if one-search.com handles the processing of the payment for the item. In this manner, merchants can easily communicate with one-search.com through the API for delivery.

The positioning of the tabs can be based on history, personal preferences, likelihood of intent, and so forth. For example, if the user typically purchases items through Amazon.com, then that tab will be presented 1710 next to the current tab 1702. The probability of a search intent over a purchasing intent may be equivalent, and thus a Google or Yahoo! Search may be presented in tabs next to a purchasing option. The tabs may also give hints as to how deep the preprocessing went. For example, one tab may say "Amazon search" and another may say "Amazon one-click" indicating to the user, that clicking on the Amazon search tab means that the "state" of that tab is that the user input has been preprocessed such that, as in a normal Amazon search, a list of items is returned for browsing but that the state is not a "one-click" state in which the user could do just one more click to complete a purchase and delivery. The depth of the preprocessing can also be performed based on how much disambiguation is needed. If the user does not provide enough data, then only search-level states may be provided. If there are only two options such as two colors to choose from on an item, and the user did not specify a color, the system could present in a tab, two different items, each having a "one-click" purchasing button, such that the tab is still in a one-click purchasing state, but two items are presented on the page such that no further navigation is necessary. The system could present a gold "one-click" option and a silver "one-click" option for purchase.

In a typical web search, a user clicks to select a search field, enters text, waits for the results page to load, clicks a desired link in the results page, and finally arrives at the desired link after waiting for it to load. If the user desires to continue and make a purchase, then the user must either log in with an existing account or create a new account with the website, place the item in a virtual shopping cart, check out, provide shipping information, and so forth. This process requires many steps. A unified input field that prepopulates a shopping cart for the user can greatly simplify this process.

Browser/Agent—Merchant Site API

In one aspect, this disclosure covers a novel browser having an API through which information is exchanged to simplify the payment process. Such a browser addresses prior problems with trying to address the complexity and deficiency of requiring users to enter in all of their payment information. Some browsers had included form filling ability in which stored payment information is used to fill in forms on the browser send. However, these form filling features never caught on and were still too cumbersome. The forms served from merchant sites were not coordinated and users still had to view all of the data being entered and then sent back through the form to the merchant site. What is needed is a more comprehensive and coordinated effort to simplify the payment and checkout process. The browser API disclosed herein solves this problem in a more comprehensive way such that the payment process truly can be simplified down to its essential element in a way previously unachievable. For example, the site and the browser can exchange back and forth much more data in a more specific, strategic and tailored way then the old form filling approach. Being able to exchange much more information via the API enables a more efficient approach which will be noticeably easier to the user.

A browser or a web browser is a software application for retrieving, presenting, and traversing information resources on the World Wide Web. An information resource is identified by a Uniform Resource Identifier (URI/URL) and can be a web page, image, video or other piece of content. Hyperlinks present in resources enable users easily to navigate their browsers to related resources. Example web browsers are Firefox, Internet Explorer/Microsoft Edge, Google Chrome, Opera, and Safari. They can run on servers, desktop computers, laptops, mobile devices, and any other device configured to run the software. Web browsers typically include a user interface, layout engine, rendering engine, JavaScript interpreter, user interface backend, networking component and data persistence component.

The primary purpose of a web browser is to bring information resources to the user ("retrieval" or "fetching"), allowing them to view the information ("display", "rendering"), and then access other information ("navigation", "following links").

The process begins when the user inputs a Uniform Resource Locator (URL), for example http://en.wikipedia.org/, into the browser. The prefix of the URL, the Uniform Resource Identifier or URI, determines how the URL will be interpreted. The most commonly used kind of URI starts with http: and identifies a resource to be retrieved over the Hypertext Transfer Protocol (HTTP).

In the case of http, https, file, and others, once the resource has been retrieved the web browser will display it. HTML and associated content (image files, formatting information such as CSS, etc.) is passed to the browser's layout engine to be transformed from markup to an interactive document, a process known as "rendering". Aside from HTML, web browsers can generally display any kind of content that can be part of a web page. Most browsers can display images, audio, video, and XML files, and often have plug-ins to support Flash applications and Java applets.

Information resources may contain hyperlinks to other information resources. Each link contains the URI of a resource to go to. When a link is clicked, the browser navigates to the resource indicated by the link's target URI, and the process of bringing content to the user begins again. Browsers can store user data such as payment data as disclosed herein. Other payment services like Android Pay and Apple Pay can communicate with a browser for payment functions. Further, the browser functionality can be modified to communicate via an API with sites such data to simplify the purchasing process.

Accordingly, this embodiment covers the interaction through the API between the browser and a merchant (such as http://www.merchant.com) to manage the request and transmission of payment data through the API to the merchant.com site so that the site can process a purchase of a product according to their normal payment processing structure. If a separate payment service is used, the API can handle in an organized way the management of the payment by the payment service and communicating payment data to the site. In this regard, the browser (or any other agent) can provide the intermediary communication of data between the merchant, the buyer and the payment method or payment account. The browser can store the payment information or can communicate with another local application that stores the payment information or can communicate with a payment service like Android Pay or Apple Pay. There is a standardized specification of parameters and data that are communicated through the API to achieve the overall objective of enabling a payment process which does not require the user to manually enter in credit card data, address, etc. The process can enable the site to receive or create a pay button (different in function from their locally used pay button which does not interface through an API with the browser), request and receive payment data about the user such as an address and payment account data, which can be encrypted, enable the user to update any of the payment data and then locally process the payment using the received payment data. There are many mechanisms through which the browser can pass payment information to the site. For example, the browser can store a credit card and/or could be integrated with Android Pay through Chrome or Apple Pay through Safari. In this regard, there may be a separate application or software such as Android Pay or Apple Pay that communicates with the browser to provide one or more of the data needed to pass to the site for payment processing. The separate application could also process the payment and report back through the API to the site that the payment has been made. All the attending information associated with the payment can be provided.

In one aspect, the process can proceed as follows. A computer-readable storage device stores browser instructions which, when executed by a processor, cause the processor to perform browser operations for retrieving content, presenting the content in a user interface, and traversing information resources on a world-wide network. The browser instructions are modified and extended such that, when executed by the processor, the instructions cause the processor to perform further operations including receiving, via the user interface and from a user, an interaction with an object associated with a site which can lead to a purchase. The object might be a button on a site or a kiosk, a button in a game that can lead to the need to process a payment, or a buy button associated with a product or service. The operations include receiving, based on the interaction and via an application programming interface, a request from the site for payment data for the user in connection with the purchase and transmitting, to the site and via the application programming interface, the payment data, wherein the payment data can be used to process the purchase on the site. In one aspect, another agent, search engine, or entity processes the payment and reports back to the site as noted herein.

Figure 17C:
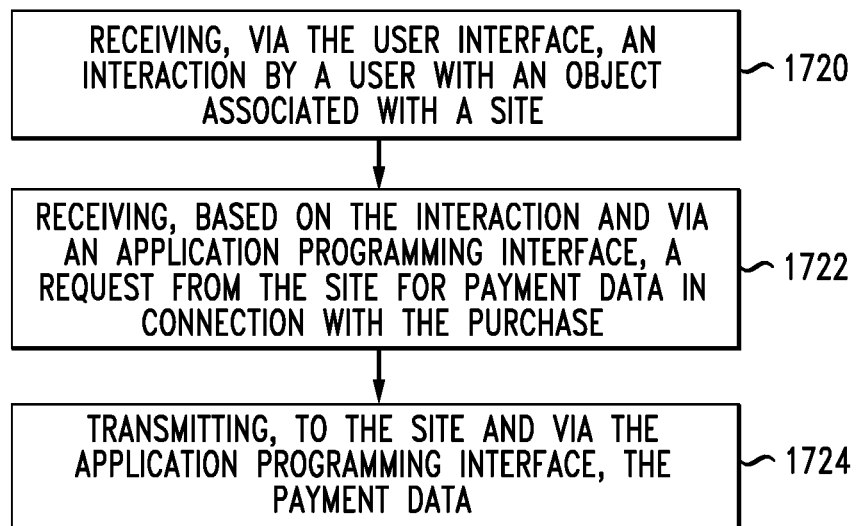
FIG. 17C illustrates an example method.

In another aspect, the disclosure covers, as is shown in FIG. 17C a browser receiving, via the user interface, an interaction by a user with an object associated with a site (1720), the interaction indicating a user intent to make a purchase, receiving, based on the interaction and via an application programming interface, a request from the site for payment data in connection with the purchase (1722) and transmitting, to the site and via the application programming interface, the payment data (1724), wherein the payment data can be used to process a payment or deliver a product associated with the purchase.

The process can in more detailed be performed as follows. After a user interacts with the object, the site can make the JavaScript API call for a payment request. The API request can include data such as acceptable forms of payment for the site (Visa, Mastercard, Bitcoin, etc.), the amount to be charged, what currency they expect and so forth. The API request can also include details about the transaction such as total amount, currency, how amounts are calculated, tax, discounts, shipping costs, etc. The browser can then determine a match between acceptable payments and available payments through stored credit card information, access to an altcoin wallet for the user, Apple Pay, Android Pay PayPal, or any other type of payment service. The system may present the user with current information and an opportunity to add a shipping address, correct data, or change any of the necessary data for the transaction. The system receives and updates any changed data. If options are presented to the user, the user can select which payment option to use for processing the transaction.

Next, the user needs to authorize the transaction. A shipping address might be exchanged or used to include in a total amount a shipping charge. An interface can be presented to the user to confirm one or more of a payment method, a payment amount, a shipping address, and so forth. The payment method might be through a stored credit card in which the last 4 digits might be presented for confirmation. If that is used, then the credit card information (card number, expiration date, name, CVC) is transmitted through the API to the site for processing using the site's payment process system. This can be an encrypted transmission or some secure mechanism to maintain security. If a local payment is chosen through say a Google Wallet, Android Pay or Apple Pay type of service, then the chosen service can process the payment and a report through the API can be provided to the site. Other information about the user can be sent to the merchant as well such as email address, address, payer phone, social media data, contacts in social media etc. The merchant can then continue with a relationship with the buyer.

Figure 17D:
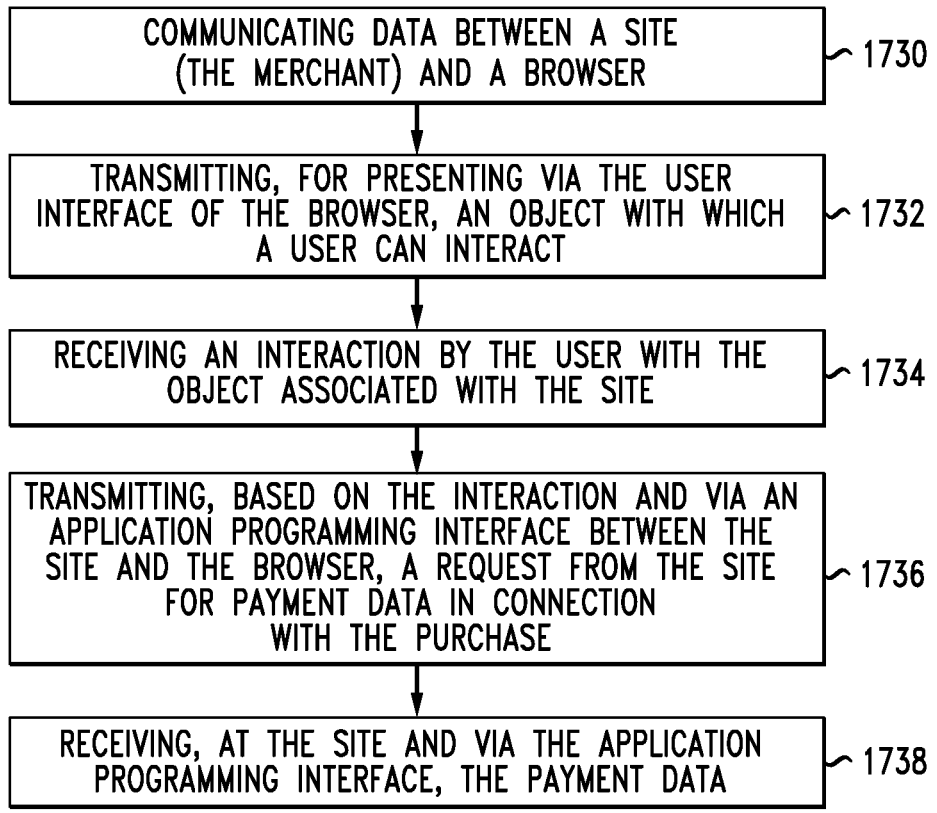
FIG. 17D illustrates another example method.

From the merchant standpoint, the method can generally proceed as follows and shown in FIG. 17D. The method includes communicating data between a site (the merchant) and a browser (1730). The method includes transmitting, for presenting via the user interface of the browser, an object with which a user can interact (1732), receiving an interaction by the user with the object associated with the site (1734), the interaction indicating a user intent to make a purchase, transmitting, based on the interaction and via an application programming interface between the site and the browser, a request from the site for payment data in connection with the purchase (1736) and receiving, at the site and via the application programming interface, the payment data (1738), wherein the payment data confirms a payment or can be used to process a payment for a product or deliver the product associated with the purchase. As noted above, the payment processing can occur on either side of the API depending on what service the user is signed up for or the preferences of the user. When the site processes the payment for the product, the payment data can include at least user payment account data and the method further includes the site processing the payment for the product based on the payment account data received from the browser via the application programming interface. When a payment service processes the payment for the product, the payment data can include a confirmation that the payment for the product has occurred by the payment service such that the site can deliver the product to the user. Alternately, if an altcoin approach is selected, the API protocols can include a feature for exchanging, in an encrypted fashion, information or personal keys, addresses, amounts, conversion data between currency and altcoin values, and any other data necessary to enable an altcoin wallet or payment service to make the altcoin payment to the merchant site and report the success of the payment. In this regard, the API protocol is structured such that the user can select various methods of payment, including payments occurring on the browser side of the API (through the browser or payment service associated with the browser or communicating with the browser, or an altcoin system) or on the merchant side of the API, through the merchant's standard payment processing structure for payment systems like Visa, Mastercard, Debit cards, PayPal, etc. Thus, in one user interface as the user is getting close to making a purchase, the user could see payment options such as "Visa ********1234" or "Android-Pay". Choosing the Visa payment method would cause the back end processing between the merchant and the browser to have the Visa payment information, account number, security code, user name, address, etc. transmitted to the merchant site so the merchant can process the payment. Choosing Android Pay would result in the purchase amount, tax, shipping and/or any other necessary data to be transmitted through the API such that the Android Pay service could process the payment and report back a confirmation of a completed payment such that the merchant can deliver the product.

The above approach also can be applied to the drop down or drop up menus. With the API in place, the efficiency of making purchases from a drop down/up menu option can be increased. For example, a user's information such as hat size, shoe size, shirt size, pant size, etc. can be stored. User preferences for color, style, etc. can be stored and such information can also be accessed via social media sites or contact information. This data can be used to help autocomplete or select products to list in a drop down menu. If the user starts to type "green baseball cap", a drop down menu item could state "green baseball cap 7 8/5 inches, buy now with Visa, $11, delivered by Walmart on Tuesday". As the user types the words, a correlation to a product database at a merchant site could lead to the merchant exchanging product information or make a request for a payment request through the payment request API. The user's address can be drawn upon to determine shipping costs, taxes, etc, quickly such that the drop down/up menu can include one or more of a charge, a payment option, delivery information, description of product, size information, etc. The user merely clicks on that option to make the payment (on either side of the API depending on the capabilities of the merchant, user payment accounts, and so forth), and have the product delivered. If more than one payment option is available (Visa, Android Pay, Bitcoin), the item in the drop down menu can perhaps have multiple sub options to choose from perhaps in a left to right fashion. This would be a more dynamic drop down/up menu in which the user could drop down to select the row but then slide to the right or left until the cursor is over the Android Pay option. Releasing the cursor could cause the system to continue to exchange information via the API and process the payment through the Android Pay option and report that payment to the merchant. The menu option could report any number of different pieces of information for the product, such as a pickup location ( . . . For pickup at Walmart in Dunkirk), and so forth. Current drop down menus provide some options like to search for the item on Amazon.com or Yahoo.com but they do not provide the purchasing simplicity that can be achieved by tailoring the drop down/up choices through use of the browser API between the browser and merchant sites.

Another benefit of this approach is that as the user is typing in the product information into the search field, the user can view the drop down/up results and narrow the scope as they go. For example, if a user types in "baseball cap", a drop down/up item could include items such as: "G"reen Baseball cap sold from "W"almart or "C"osco. The user could continue to type: "baseball cap G C" which could utilize the hints from the drop down menu to make it green and from Cosco. Perhaps two prices could be shown "$11 or $20" and the user continues to type "11" into the input field. The dynamic exchange of typing and feedback from the drop down/up menu item could also indicate which of a number of different drop down/up menu items the user is interacting with and continue to focus the search and the results on what the user is looking for. Throughout this process, it can quickly be assumed that a purchase intent is likely and the exchange of payment data and options can be presented and chosen by the user. For example, the drop down menu item may say "Green Baseball Cap, $11, "A"ndroid Pay, "V"isa or "B"itcoin"" and the user could continue to type "baseball cap G C V" which would indicate the choice of Visa as the payment method. Pictures can be dynamically presented through this process including the opportunity to click on a picture and continue providing information through the input field such that ultimately the user has chosen the item, its color, size, and so forth, the payment mechanism, and can confirm the payment. In one example, the menu item could be more dynamic than current menu items to let the user click on different objects within the item to choose payment options, size, color, merchant, delivery address, and so forth. As the user narrows down which drop down/up item the user wants to focus on, more information to complete a purchase could be provided such that the process becomes very quick and simple. The menu items could start out short and simple but as the user types more or interacts with a menu item, new data or objects could be presented which, in a dynamic fashion through interaction with the API, could lead to a quick finalizing of the item for purchase. For example, the user may initial choose "iPhone 8, from Bob's Audio Video", but then the merchant can communicate that it can handle Visa and Android Pay through the API. If the user also has these payment options available, then the menu item can add two selectable objects which the user could click on or alternately continue typing in the input field (since the user is already at the keyboard typing anyway) a "v" or an "a" to represent the choice. The system after interacting to confirm an item, an amount, a delivery address, a payment option, etc. can manage the payment as disclosed herein on either side of the API, and instruct the merchant to make the delivery.

The process, through the browser API, enables the exchange of payment data and to process the payment in the manner chosen by the user. The merchant delivers the item. The drop down/up menu concepts disclosed herein work in a different way with the browser payment request API but achieve a similar result of more efficient purchasing process for the user. The disclosure covers the interactions both from the side of the browser interacting throughout the process through the API with the merchant and the processing from the merchant site where they manage their database of products and interact and exchange information, requests and so forth via the API with the browser.

Here is Line

The following discussion continues to relate to the use of an API or other protocol to communicate payment related data from a browser, site, agent, or other storage location to a merchant site for the purpose of populating payment fields for the user to simplify the purchasing process. In one aspect, the disclosure relates to now to transition a user from a search engine to a merchant site using the API. In another aspect, the merchant site can (independent of how the user navigated to the site) interact via the API with the browser/agent/entity to obtain the payment data for automatically populating the payment information to eliminate or reduce the need of the user to fill in data fields, which is particularly cumbersome on a mobile device.

In one aspect, a system, method and computer-readable storage devices are disclosed which prepopulate a shopping cart in an online vendor's website based on intent determined by a classifier that processes input provided to the unified input field. The user intent can be classified or determined in any manner. A user can be registered with and/or logged in with his or her browser, such as Chrome, Firefox, Internet Explorer, or Opera, such that user's purchasing credit/debit card or other accounts and delivery addresses are stored in a user profile. Then, if the user desires to make a purchase through a destination website that may have a product not found on their registered website, the browser (or system processing in a network) can handle negotiation (via an API) between the browser and the website such that the system can convert a shopping-cart based model website with which the user is not registered into a "one-click" purchasing experience for the user. For example, the system (through a service like Google Wallet, Apple Pay, Android Pay, or PayPal, etc.) can handle the payment for the item and communicate with the merchant site to handle delivery. Of course in this scenario, the process can initiate not from a search from a search engine but merely from a state within the merchant site in which the user is in a position of making a purchase of an item. At that state, the merchant site could communicate via the API with the browser, agent, or search entity, to retrieve payment data for populating the necessary payment fields and present via the interface with the user a simplified purchasing experience. With payment data (one or more of account data, delivery data, dates, delivery options, preferences, etc.) communicated through the API to the merchant site, the merchant site can process a payment from the user's payment account using their normal payment system.

Assuming that appropriate permissions are in place, such as in a browser setting authorizing the browser to navigate and provide input in a website's purchasing, registration, or shopping cart process to automatically input name, address, credit card information, etc., the system can automatically populate a shopping cart, including even registering on behalf of the user at a website with which the user has not registered. The user provides input in a unified input field, such as "buy acme toaster 4.5" which the system and the classifier categorize as a desire to make a purchase of a particular toaster model. The system determines, based on various criteria such as pricing, shipping, country, and so forth, a merchant website that offers that toaster model. The user has never registered or made a purchase at the merchant website offering the toaster for sale. Thus, if the user were to buy the toaster from that merchant website, the user would have to place the toaster in a virtual shopping cart, then enter personal information such as address, credit/debit card information, user name, password, and so forth to have the item shipped.

The system, in one aspect, can identify the merchant website based on the input provided via the unified input field or can initiate the process directly from the merchant site independent of a search to arrive at the merchant site. Then the system can navigate to the state in the merchant website where the user would normally click to place the item in the shopping cart. In this case, however, the system will navigate to the merchant website where the item can be placed in the shopping cart, and determine that the user is not registered with this merchant website. Then the system can automatically communicate with the merchant website, such as via a new user registration page, or an API, to create a new account on behalf of the user using the user data available to the system and/or to the browser. Thus, the system can present to the user just the confirmation in a button to purchase via one click. The confirmation can be a double confirmation of authorization to create a new account and authorization to then place the order using the new account. The user can automatically authorize new registrations and can establish settings or preferences governing new profile registrations. The system can then enter all the necessary data, retrieved from the browser or some other location, to complete the registration and cause the item to be purchased and shipped without the need of further user input. This approach can turn non-one-click purchasing websites into one-click purchasing websites, via input through the unified input field. The system can also use the registered payment information to process the payment as well and coordinate with the merchant site for filling the order. The process of obtaining payment data through the API for automatically providing payment and/or delivery data can also occur simply between the merchant site and the browser through the API. The merchant site, at the appropriate state in which the user may make a purchase, can submit a request through the API for payment data which can be provided as stored by the browser or agent for simplifying the purchasing process. The data can also be provided from the browser to the merchant site via a tokenized process to protect payment account information. The interface the user views can be a combination of merchant information (picture of the product, reviews, other date) as well as a "'buy now" or "buy through google" or "Android Pay" type of button which is provided via the API to the graphical interface.

In yet another aspect which relates to processing from a browser or application standpoint, an example method includes presenting, on a graphical user interface, a presentation, the presentation being received from a site over a network, receiving, via the user interface and from a user, an interaction with the presentation, receiving, via an application programming interface, a request from the site for payment account data for the user and transmitting, to the site and via the application programming interface, the payment account data, wherein the payment account data can be used to populate payment fields for payment processing on the site. The payment account data may just be used by the merchant site for processing the payment and may not literally populate fields that otherwise would be manually populated by user input. For example, if payment data is received in a tokenized secure manner, the data may just be used to process a payment and not literally used to fill in pre-set form fields. The presentation can include one of a product for purchase and a service. The method can include the site processes a payment for an item or a service using the payment account data for the user. The graphical user interface can be associated with a browser or an application. In one aspect the API that communicates data between the site (merchant site) and a browser that can store the payment account data for the user. This aspect covers the process from the standpoint of the browser that stores the payment/deliver data of the user and communicates that data via the API with the merchant site for populating the necessary fields (or an equivalent type of process) to create a one-click purchasing experience for the user who is on the merchant site.

The method can further include updating the presentation to include a buy option which is configured, based on a confirmation from the user, to enable the site to utilize the payment account data received through the API to process a purchase of an item or service without a need of the user to fill in the payment fields on the site. The browser or other agent communicating via the API can also provide the graphic for a "pay now" type of button to integrate with site graphics. The payment account data can further include one or more of address data for the user, a payment account number, an expiration date, a security code, a cardholder name and shipping instructions for the user.

The request through the API can further include one or more of a supported payment method for the site, a total amount value for a purchase, items that may be displayed for purchase, shipping options, payment modifiers, a request for a user email address, a request for a user's phone number, and a request to update information. A user agent similar to or separate from the browser can communicate the payment account data between the application programming interface and the site.

In another aspect, the method includes the concept from the standpoint of the site. The method in this context includes transmitting, for viewing on a graphical user interface, a presentation, the presentation being transmitted from a site over a network to a device having the graphical user interface, receiving, via the network and from a user, an interaction with the presentation, transmitting, to an application programming interface, a request for payment account data of the user, receiving, at the site and via the application programming interface, the payment account data and populating payment data fields associated with a payment process with the payment account data for the user to yield populated payment data fields. The site can process a payment for an item or a service using the payment account data for the user. The API can coordinate data between the browser and the site wherein the browser stores the payment account data for the user. Upon receiving a confirmation from the user to make a purchase of an item or service associated with the presentation, the method can include processing a payment for the product using the populated payment data fields.

The method can further include, upon receiving the payment account data, updating the presentation to include a buy option which is configured, based on a confirmation from the user, to enable the site to utilize the payment account data to process a purchase of a product or service without a need of the user to manually fill in the payment data fields on the site. The payment account data can further include one or more of address data for the user, a payment account number, an expiration date, a security code, a cardholder name and shipping instructions for the user. The request can further include one or more of a supported payment method for the site, a total amount value for a purchase, items that may be displayed for purchase, shipping options, payment modifiers, a request for a user email address, a request for a user's phone number, and a request to update information. A user agent can also communicate the payment account data between the application programming interface and the site. In another aspect, a method includes presenting, on a graphical user interface, a presentation, the presentation being received from a site over a network, receiving, via the user interface and from a user, an interaction with the presentation, receiving, via an application programming interface, a request from the site for payment account data for the user, autopopulating a payment field associated with the presentation with the payment account data and transmitting, to the site and via the application programming interface, the payment account data, wherein the site can process a payment based on the payment account data for the user. The method can also include receiving a confirmation from the user of a purchase after the payment field is autopopulated.

The system can process the new registration pages silently, such as in a background tab or new window in the browser, or can negotiate the new registration process with the merchant website without presenting the registration page to the user at all. The system can present a progress bar on the same page containing the unified input field after the user requests a purchase, such as by pressing enter after providing input via the unified input field. The progress bar can indicate to the user the progress of creating a new account, entering shipping data, adding the item to the cart of the merchant website, and placing the order.

The user can establish default preferences for which personal information to use for new registrations. The user can establish these default preferences in advance of encountering the merchant website, or even in advance of encountering the unified input field. Alternatively, at the first instance where a registration is required, the system can prompt the user to establish such settings and/or provide additional information.

The system can prefer merchant websites with which the user already has an account or with which the user is already registered. For example, if Merchant X and Merchant Y both offer the same item for sale, the system can choose to use the one of these two merchants where the user already has an account. The system can determine this by examining a browser history, profile data available to the browser, or cookies stored by the browser or by other browsers associated with the user. The system can intelligently determine when to use a merchant with which the user is not registered, such as based on a difference in shipping time, or a difference in price. For example, if the merchant with whom the user is not registered offers the desired item at a price that is at least 25% lower than the merchant with whom the user is registered, then the system can create a new account. If the user does not desire to have the system create user accounts on his or her behalf, the user can instruct the system to make purchases where he or she already has accounts, or at merchant websites which allow guest accounts.

However, the system can identify, using the classifier and user profile data, the merchants the user is most likely to select, and present them to the user for disambiguation. The system can present to the user a table, such as by a JavaScript popup, showing merchants, shipping times, and total price including shipping and tax. The user can simply click on a desired merchant from the table, and the system can automatically register the user with that merchant if necessary, and process the order with that merchant. The user only has to make one click to identify the merchant, and the system handles the rest of the steps, thereby providing a one-click interface into a non-one-click website via the unified input field.

Figure 18:
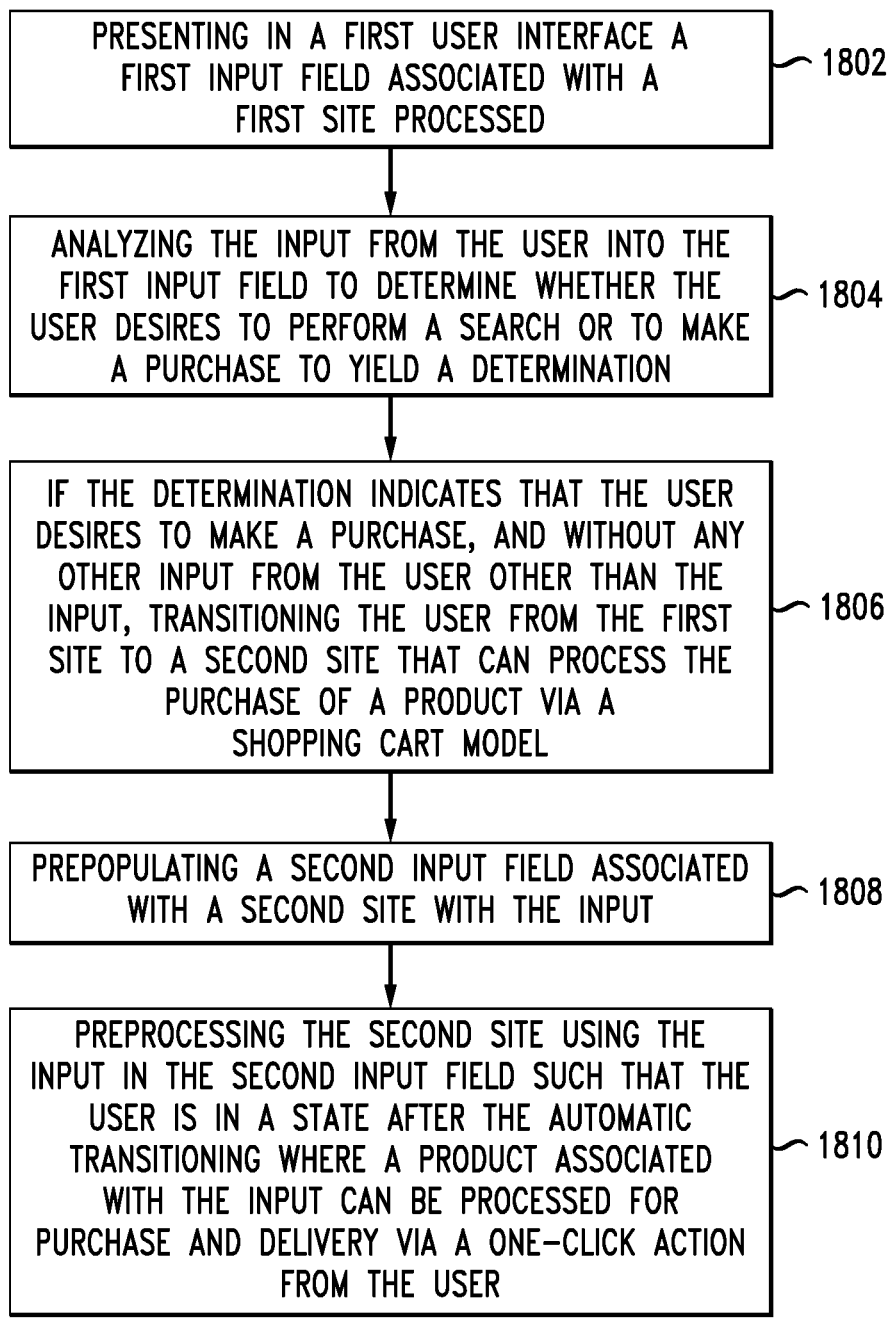
FIG. 18 illustrates an example method example relating to pre-populating a merchant shopping cart.

FIG. 18 illustrates a method example. The steps in the method example can be performed in any order, can be performed in other combinations or permutations that include additional steps or exclude all or part of some of the described steps. The system can present in a first user interface a first input field associated with a first website processed via a browser (1802), and analyze the input from the user into the first input field to determine whether the user desires to perform a search or to make a purchase to yield a determination (1804). If the determination indicates that the user desires to make a purchase, and without any other input from the user other than the input, the system can transition the user from the first website to a second website that can process the purchase of a product via a shopping cart model (1806). The system can prepopulate a second input field associated with a second website with the input (1808).

The system can preprocess the second website using the input in the second input field such that the user is in a state after the automatic transitioning where a product associated with the input can be processed for purchase and delivery via a one-click action from the user (1810). Preprocessing the second website can include transmitting user data from one of the first website and a browser to the second website, or automatically navigating through the shopping cart model of the second website to yield the state where the product can be processed for purchase and delivery via the one-click action. The system can further preprocess a third website using the input in a third input field such that the user is in a state after the automatic transitioning where a product associated with the input can be processed for purchase and delivery via a one-click action from the user, and present the third website as an option for the user to choose in the browser.

The preprocessing can be according to a user profile with various preferences. For example, in a user profile associated with the first website, or with a browser. The user profile can utilize information such as payment account data, delivery data, preferences such as not to click on receiving any email notifications, and any other possible choices that can be made in processing a shopping cart model. The application, browser, or website, via an API, can then communicate in the background can perform all of those navigations and input necessary so that such input can be automatically handled to the extent that the user is presented with the second website in a state where they are ready to "one-click" and make the final purchase and delivery. The API can include all of the information necessary for the second website that is necessary the fill in and enter all of the necessary data to finalize the purchase. For example, the first site can process a payment and the second site can finalize the order by filling it and handling delivery. The first website or browser or application can hold all possible information that various shopping cart models can and do request in processing the purchase. As a particular second website is chosen as the one to which or through which the user is likely to make a purchase from. The first website or browser establishes via an API a connection to the second website with the various information necessary for preprocessing the input. The data such as the user input identifying the product that they want to buy and any other generated data that helps to narrow down and disambiguate which product to present for purchase via a one-click input. For example, the user may input "iPhone 5S 32 GB" but not a color. The system can choose a most popular color and provide that data to the second website to enable a narrowing down of which model to present. The system can also present secondary options such that alternate choices can be easily made accessible via the second website for potential selection if the primary choice is the wrong color or is not the desired product to buy.

Figure 19:
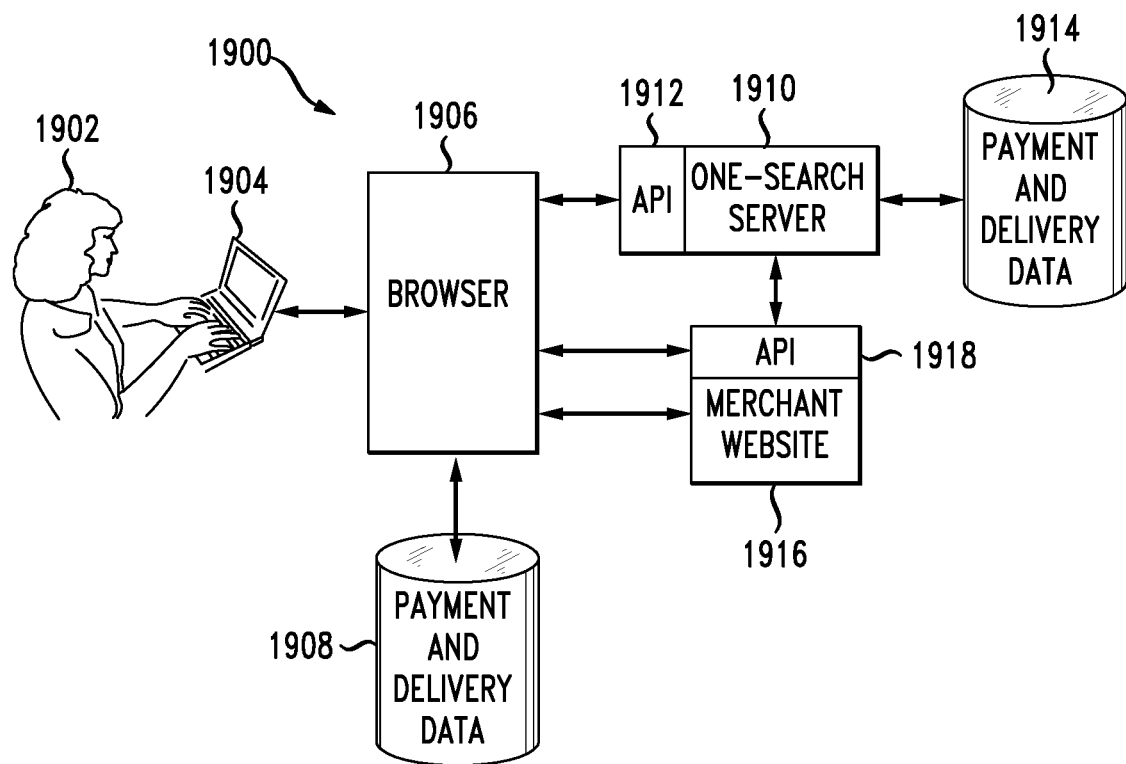
FIG. 19 illustrates an example architecture for pre-populating a merchant shopping cart.

FIG. 19 illustrates an example architecture 1900 for pre-populating a merchant shopping cart. In this example, a user 1902 of a computing device 1904 running a web browser 1906 loads a web page with a unified input field. The unified input field communicates with a server 1910 via an API 1912. As the user 1902 enters data in the unified input field, the browser 1906 sends the data, via the API 1912, to the server 1910. The server 1910 can analyze the data to identify that the intent of the user 1902 is to make a purchase, based on the data entered in the unified input field. The server 1910 can identify a merchant website 1916 that sells the desired item, and communicate with that merchant website 1916 via its associated API 1918, if available. In one aspect in this scenario, the payment data stored 1914 can enable the site 1910 to process the payment and communicate via the API with the merchant the payment details and information the merchant 1916 to deliver the product. If an API is not available, the server 1910 can communicate with the merchant website 1916 via HTTP and can navigate through the website in an automated fashion as if a user were clicking or entering data on the merchant website 1916. The server 1910 can use a network-based database 1914 of payment and delivery data or other personal data about the user 1902 to populate data fields at the merchant website 1916. However, if a network-based database 1914 is incomplete or does not exist, the server 1910 can, via the API 1912, request data from a database of payment and delivery data 1908 local to the browser 1906 or to the computing device 1904. The server 1910 can continuously receive additional data entered by the user in the unified input field via, and update or modify data entered at the merchant website 1916, products selected for purchase at the merchant website 1916, or even switch to a different merchant website altogether. The server 1910 can transmit a response to the browser 1906, via the API 1912, so the browser 1906 can present actions or destinations to the user 1902 based on the data entered in the unified input field. Then, if the user selects one of the actions or destinations, the browser 1906 can navigate to that page and communicate with the merchant website 1916 directly, or without the server 1910, although the server 1910 may continue to communicate with the browser 1906 to track behavior of the user 1902 at the merchant website 1916. For instance, the server 1910 may track eventual purchase details referred through the unified input field. The server 1910 can update the network-based payment and delivery data 1914 from time to time based on information processed from the local payment and delivery data 1908, or based on user input.

Figure 20:
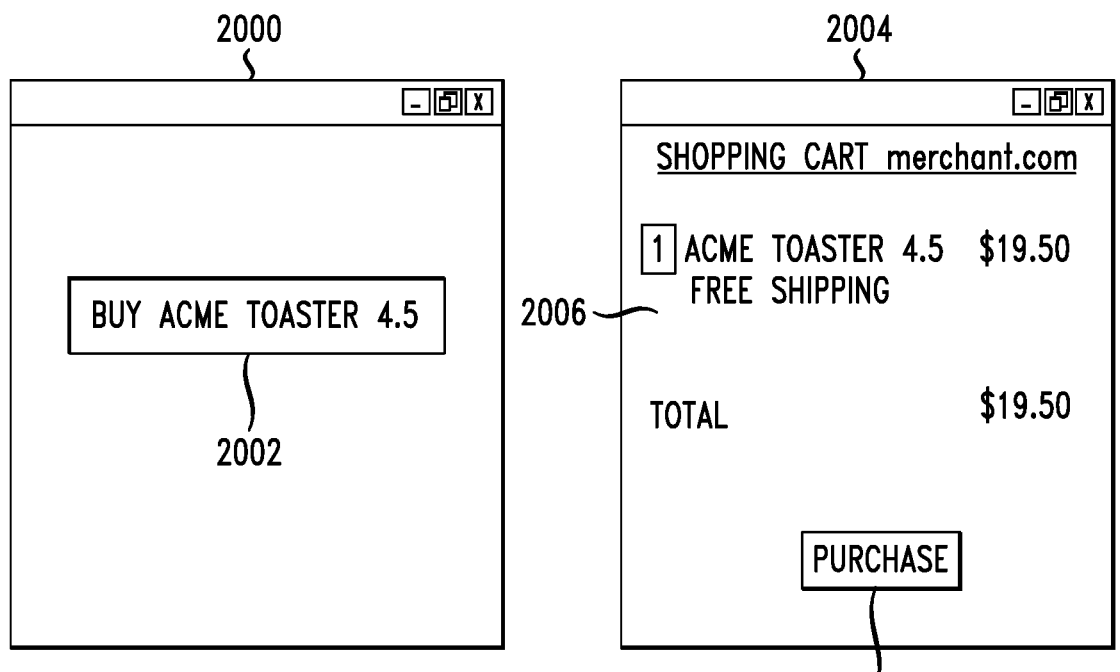
FIG. 20 illustrates example user interfaces for a pre-populated merchant shopping cart.

FIG. 20 illustrates example user interfaces for a pre-populated merchant shopping cart. In the first user interface 2000, the user has entered the text "Buy ACME toaster 4.5" in the unified input field 2002 of a web page in a browser. After hitting enter or clicking a search button, the browser communicates with a server that has already navigated to (or is currently in the process of navigating to) a merchant website to populate the shopping cart at the merchant website with the desired toaster. The server can hand off that browsing session to the browser to continue at a specific point in the checkout or shopping cart process, or can return a URL to the browser that is formed to go directly to a shopping cart that is populated based on the text entered in the unified input field. In this case, after hitting enter or clicking a search button, the browser navigates directly and automatically to a merchant website 2004 listing the item already placed in the shopping cart, order details, and a one-click purchase button 2008. Alternatively, the browser can navigate to a stage where the order has already been placed, such as the page that would load after the user clicks the purchase button 2008. Notably, the merchant has some branding on screen 2004. Where the purchase button 2008 is used to process a payment using the stored payment information at the search engine site, as can be appreciated via the disclosure here, the coordination between the payment processing on the search engine side of the API, and the delivery being handled on the merchant side of the API, makes the process more simple and easy for the buyer, thus increasing the chances that a sale will occur. The screen 2004 can be hosted by the search engine/social media site and/or the merchant. The system can populate other details of the shopping cart automatically on behalf of the user, as well. The system can even create a new account at the merchant on behalf of the user, if the user does not have an account with that merchant. In this way, the system enables a user to access websites, through a unified search field, as if they were one-click purchase merchant websites, even if the user has not previously registered with that merchant or if the merchant does not offer an "Amazon style" one-click purchase interface. For example, the first website entity associated with offering the generalized input field can process the payment for an item based on payment account information it stores and coordinate with the merchant on finalizing delivery of the item.

Determining Whether User Input is a Generalized Non-Purchasing Query or a Query with Intent to Purchase A system, method and computer-readable storage devices are disclosed which enable any input field in a website or in some other computer-based user interface to act as a unified input field. A unified input field allows a user to provide input that can lead not only to a listing of search results, but can cause any of a number of other actions to be performed on behalf of the user, such as directly navigating to a merchant shopping cart prepopulated with a desired item, or even automatically executing a purchase and placing an order for a desired item. Using such a unified input field can save significant time, effort, and clicks for a user. However, such unified input fields may not be implemented in every website or other user interface the user desires. The user may become accustomed to a particular workflow or set of capabilities when dealing with unified input fields, and may feel restricted or limited when using a traditional limited input field.

In one example, if the user is directed from a unified input field enabled site such as one-search.com to Apple.com, then that user's interaction with Apple.com could be modified such that the search field of Apple.com (or any website, such as Google.com or Amazon.com) becomes like a one-search.com unified input field. For example, a JavaScript script or browser plugin can intercept text entered into text fields on non-unified input field enabled sites or non-unified input fields, and redirect that input to one-search.com to implement these features and present the autocomplete options, and the one-click purchase options. In other words, the options to do any number of different processing options outside of the particular website can be made available to the user. In this manner, any search field, text field, or input field can be adapted to be a unified input field as disclosed herein. Of course, all of the functionality disclosed herein could be built into any search or input field on any website, application, or user interface.

Functionality of the browser can be modified directly or via a plug-in, script, or extension, to implement a unified input field in place of an existing input field. The user can activate the input field enhancer, such as by checking a checkbox in a menu, clicking a button, logging in with a username and password, or providing some other user identifying credentials. The input field enhancer can then identify the user, and retrieve personal data about the user, such as a profile stored in a browser cache or a profile stored on a server. The system can identify user preferences from the profile data, which may provide rules or preferences for when and how to modify certain input fields to be unified input fields. For example, a user profile may indicate not to modify input fields on craigslist.org, but to modify input fields everywhere else. Another user profile may indicate to modify all text input fields located within the top 10% of a website. Another user profile may indicate not to modify text input fields on mobile devices such as smartphones and tablets, but to modify text input fields on desktop or laptop computers. The user can log in to a user profile that is stored on a server, so that the user's preferences and other personal data are not limited to one local machine, but instead are accessible from any such enabled machine. Thus, the user can log in to a browser on a work computer to enable unified input fields and can do the same on a home computer, while using the same personal profile, preferences, and history. This personal information can be important for a classifier when determining intent based on a relatively short input string, and can provide a sense of consistency for the user when unified input fields behave similarly across multiple devices.

The enhancer can be triggered when a new page is loaded in the browser, or when the page is refreshed or updated, such as by an Ajax call that dynamically loads or modifies page elements. The enhancer can operate in conjunction with a rendering engine or web browser engine to identify input fields while rendering the page. In this variation, the enhancer can modify the code for a page as the page is being parsed and/or rendered. The enhancer can operate as a post-loading operation that goes back and revises an already loaded and rendered page. In either way, the enhancer modifies the functionality of an identified input field to capture and redirect the input to a local or remote server to provide similar or the same functionality as a unified input field. Then, the server can communicate with the browser to implement the various benefits and functionalities of the unified input field, such as presenting previews of one-click purchase actions as tears on the webpage, as new tabs or windows, expose such one-click purchase actions via the "search" button or some other button, and so forth.

The system can mark an input field or present some kind of visual or audible indication that the input field has been modified or enabled as a unified input field. For example, when the system detects a standard text input field, such as the search field at the top of ebay.com, the system can determine whether that standard text input field is suitable for repurposing as a unified input field. If the system makes a positive determination, then the system can modify the standard text input field's functionality as well as its appearance. For example, the system can render a different color border around the text field, or can make a noise when focus moves on to or in the text input field or when a mouse or text cursor enters the text field. The system can apply a change in size, font, appearance, or even introduce an animation highlighting the modified text field. User preferences can also dictate how the system highlights the modified text field.

Then, when the user enters text into the modified text field, the system can process the input via the classifier to determine an intent, and generate one or more actions which can be taken based on the intent. In some cases, if the classifier is unable to determine an intent above a certainty threshold, then the system may not present any actions based on the input, and may choose to wait for additional input which may change the intent and/or the certainty threshold. How the system determines to present the one-click actions based on the determined intent may vary based on the browser displaying the page, or the layout of the page hosting the modified text field. For example, if the text field has sufficient adjacent white space, the system can render one-click buttons proximate to the text field for performing the various actions. The system can present drop down menus with one-click actions as part of the browser, outside the rendered web page containing the modified text field. The system can use JavaScript to modify or rearrange certain page elements to temporarily or permanently (for the life the page as rendered) temporarily accommodate user interface elements for the one-click actions. The system can use JavaScript to overlay new user interface elements on top of the rendered page for providing access to the one-click actions. In one example, the system presents user interface elements that look like "tears" that peek through the rendered page to show a portion of a page that appears to be beneath the rendered page.

However, even when a text field has been modified, the system can still preserve the original functionality of an input field, while extending the input field to also act as a unified input field. For example, the user can toggle between the modified functionality and the original functionality by pressing shift in the beginning of the input field. The system can also toggle the appearance of the modified input field to indicate to which function of the modified input field the user is directing input.

The system can identify text fields which are candidates to be modified, but can leave them untouched until receiving some user command or input requesting the unified input field functionality. For example, the system can provide access to unified input field functionality, upon the user activating or requesting the functionality by pressing a key or key combination, or double clicking in the input field. The user can, in this manner, toggle between different functionalities for the input field. This can be beneficial to avoid breaking some websites that rely on specific functionality of the input field. However, the system can overlay the unified input functionality over the existing, original functionality of the input field, without hindering its operation. For example, the system can implement the unified input field one-click actions in a different region of the user interface, while allowing the original functionality to proceed unchanged. Or the system can incorporate the original functionality as one of the one-click actions presented via the unified input functionality. For example, if the user entered the text "iPhone 5C 32 GB yellow" in a modified input field on eBay.com, the system can generate a set of buttons overlaid on top of the page via JavaScript: a first one-click action button for purchasing the indicated iPhone 5C via Amazon.com, a second one-click action button for purchasing the indicated iPhone 5C via Apple.com, a third one-click action button for purchasing the indicated iPhone 5C via attwireless.com, and a fourth one-click action button for implementing the original input field functionality of executing a search of auctions on eBay.com.

The system can further adapt the functionality of the unified input field based on the detected type of browser or available space on the interface. For instance, the system can present a user interface that is consistent with the look and feel of the page hosting the modified input field. If the page hosting the modified input field has advertisements, the system can position the one-click action buttons or other user interface elements in such a way to avoid obscuring those advertisements. This setting can be dictated by code or settings in the page hosting the modified input field, such as a token or instruction intended to guide the behavior of a modified input field.

In one example, a website can pre-modify an input field by making it unified input field aware. In cases when the website detects that the user does not participate in or use unified input fields, the input field can retain its original functionality. However, when the website detects that the user does participate in or uses unified input fields, such as by detecting a cookie in the user's browser, the website can preemptively modify or activate the unified input field to provide a more familiar interface for that user. The website can interact with a server for managing such unified input field requests via an established application programming interface (API).

Figure 21:
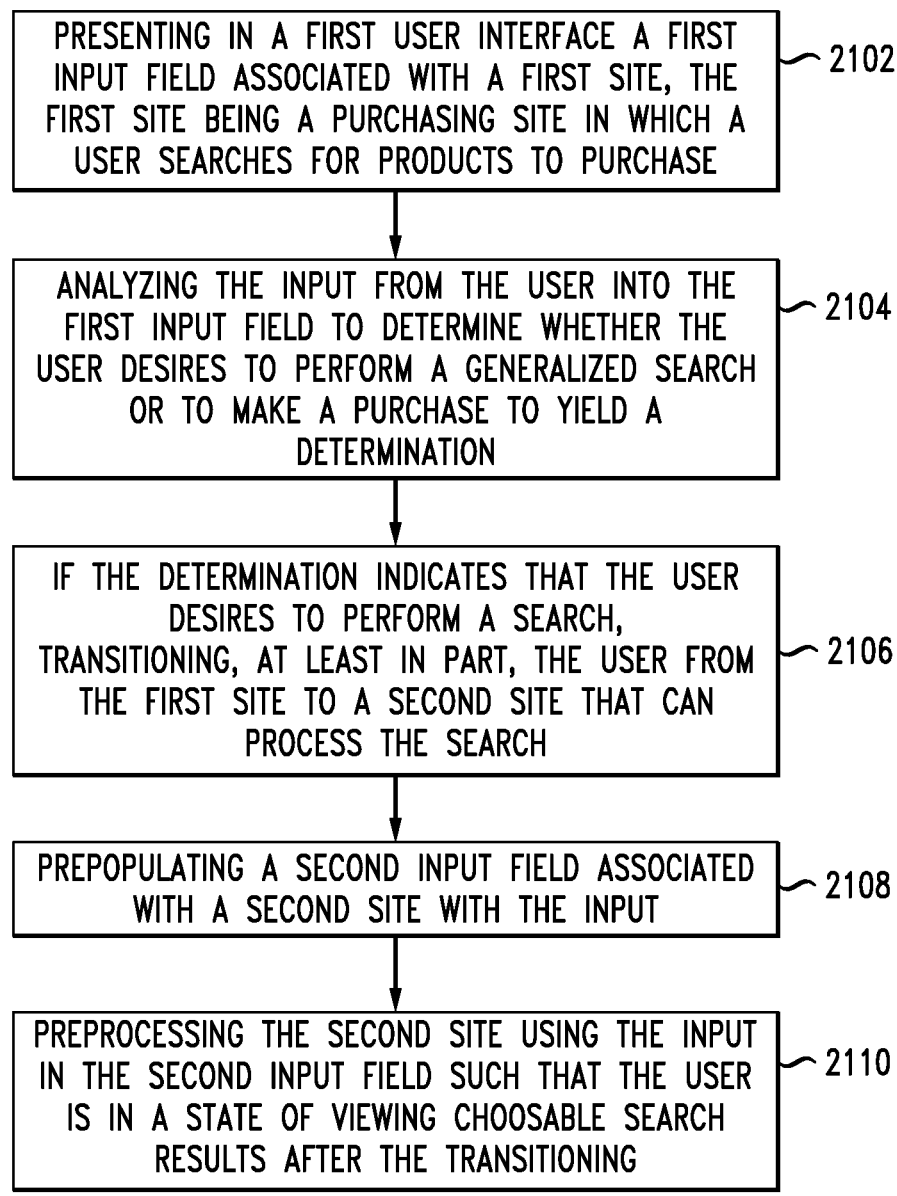
FIG. 21 illustrates a method example for determining user intent as one of a generalized non-purchasing search or a search with intent to purchase.

FIG. 21 illustrates a method example. The steps in the method example can be performed in any order, can be performed in other combinations or permutations that include additional steps or exclude all or part of some of the described steps. The system can present in a first user interface a first input field associated with a first website processed via a browser, the first website being a purchasing website in which a user searches for products to purchase (2102). The system can analyze the input from the user into the first input field to determine whether the user desires to perform a generalized search or to make a purchase to yield a determination (2104). An example of a generalized search is one that a person might do on Google.com. For example, the user might search using the term "North Dakota." In that case, they are looking for information on that state. However, if the user is at the URL for Amazon.com, entering in "North Dakota" would not necessarily mean that they desire to make a real estate purchase of the entire state. That user input has a strong indication that they do not want to make a purchase but rather to perform a generalized search in contrast to searching for products to purchase on Amazon.com. If the determination indicates that the user desires to perform a search, and without any other input from the user other than the input, the system can transition, at least in part, the user from the first website to a second website that can process the search (2106). Transitioning the user from the first website to a second website can include presenting the second website via a tear in the first user interface revealing at least a portion of the second website. Then the user can provide an indication through the tear that the user desires to navigate to the second website, and based on the indication, the system can navigate the user to the second website. The system can select a position of the tear in the first website based on an analysis of a structure of the first website. The system can prepopulate a second input field associated with a second website with the input (2108), and can preprocess the second website using the input in the second input field such that the user is in a state of viewing selectable search results after the transitioning (2110).

Figure 22:
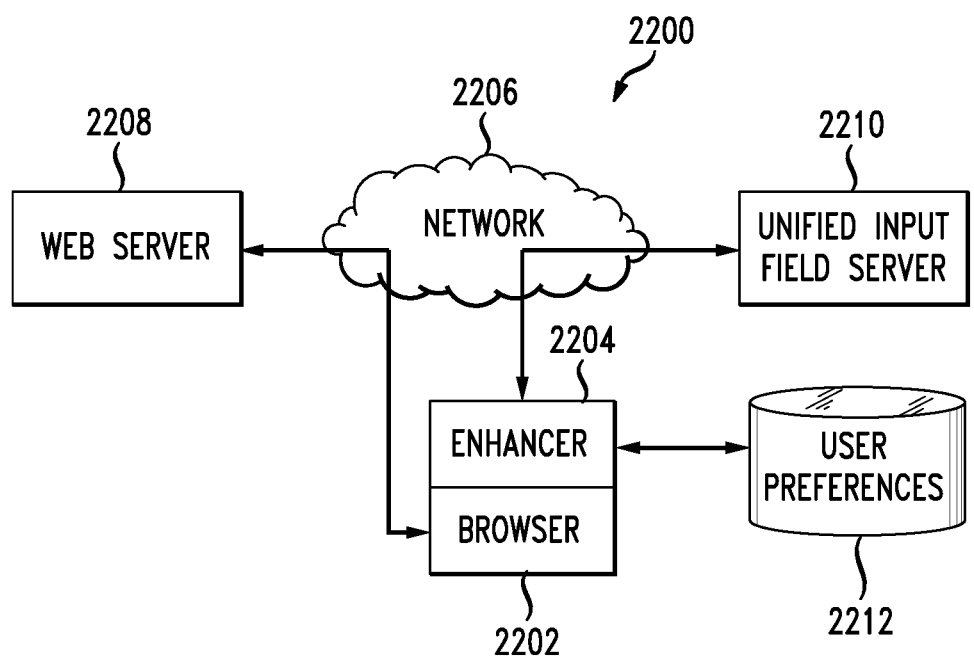
FIG. 22 illustrates some of the components that can be used with the method example shown in FIG. 21.

FIG. 22 illustrates some of the basic components 2200 of this example. An application like a browser 2202 or smartphone app can have an enhancer 2204 which is a module or a component that can communicate with a database of user preferences 2212 for helping to improve the processing of input via any input field. The browser 2202 can communicate via a network 2206 with a web server 2208 which serves up a website or application such as amazon.com. The browser and/or enhancer 2204 can also communicate with a unified input field server 2210 via a network 2206. This unified input field server 2210 can also communicate with the database of user preferences 2212 as instructed by the browser 2202 to tailor the processing of user input accordingly. Using this approach, the system can process and turn any input field served up from any web server 2208, into a unified input field by virtue of connecting the processing to the unified input field server 2210. In this manner, while the user may be on a website such as Amazon.com, which has input fields that typically expect items of purchase, and that input field can be turned into a more unified input field for jumping to other places and performing other functions as well. Thus, utilizes the connection to the unified input field server 2210, that amazon.com input field can become the jumping off point for a generalized search, a phone call, a Skype-type call, a video conference, or any other purpose which can be achieved through a more flexible and open input field processing approach as disclosed herein.

Searching Via an Application-Based Portal Rather than a Website

Figure 23:
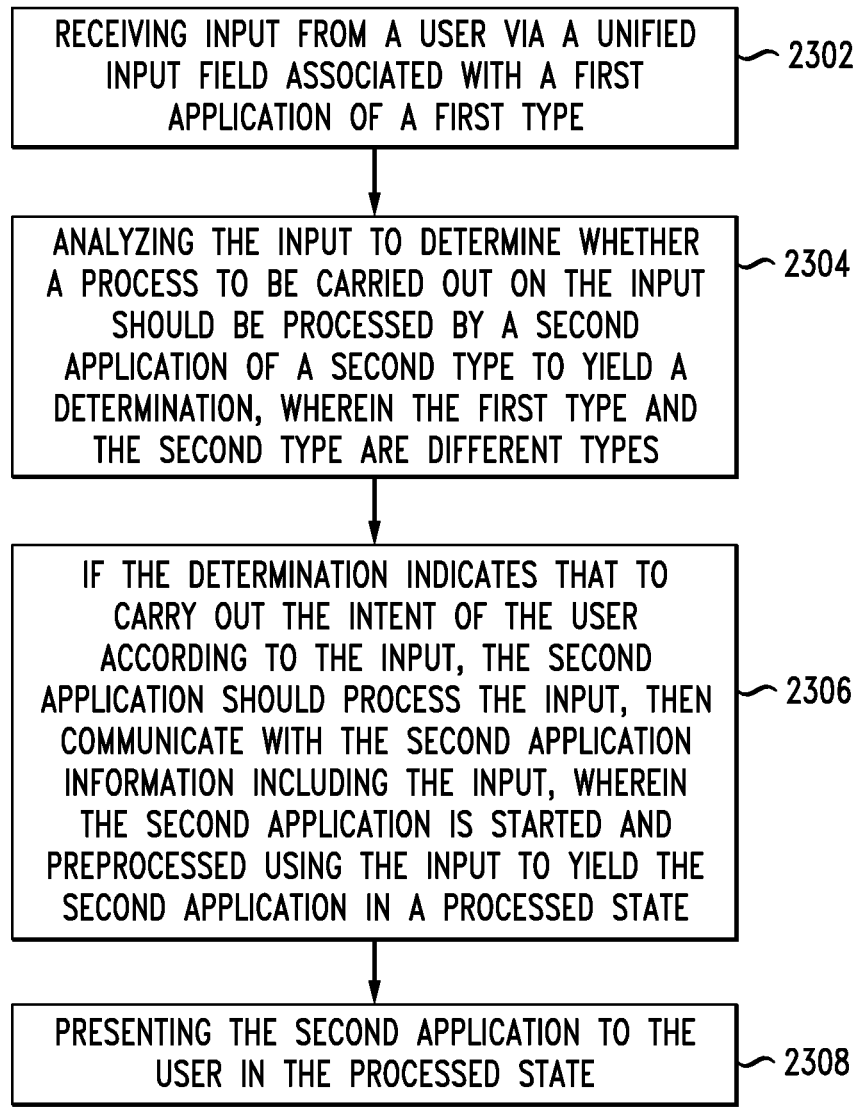
FIG. 23 illustrates a method example for an application-based search portal instead of a search via a website.

FIG. 23 illustrates a method example. This example focuses more on applications communication one with another rather than websites. The basic concepts are similar, however. For example, a user having a tablet or a smartphone may have an application for performing searches. This is different from a browser on the device that enables the user to just to a search engine URL. The application, which again can be anything such as a search app, or a Skype or FaceTime app, a banking application, etc. Any application of a first type can have an input field. The point here is to turn that input field which traditionally is associated with a particular purpose of the application, into a more generalized input field that can process the input and determine whether the user should automatically be transitioned to another app. Switching between a browser and an application is also possible. For example, the user could be on a smartphone using a browser application with the URL positioned on www.google.com. The user, however, may enter in a product into the search field. The system (locally, on a server, or via processing using a combination of both) determines that the user desires to make a purchase based on the input. The system could automatically launch an Amazon.com application (rather than transitioning to amazon.com via the browser), pre-negotiate such that the input and the "state" of the amazon.com application is positioned using the input to either present search results as though the user had already launched the application and search, or could position the application in a "one-click" state where the user simply makes the purchase.

A method includes receiving input from a user via a unified input field associated with a first application of a first type (2302) and analyzing the input to determine whether a process to be carried out on the input should be processed by a second application of a second type to yield a determination, wherein the first type and the second type are different types (2304). If the determination indicates that to carry out the intent of the user according to the input, the second application should process the input, then the system communicates with the second application information including the input, wherein the second application is started and preprocessed using the input to yield the second application in a processed state (2306). Finally, the system presents the second application to the user in the processed state (2308).

The presenting occurs without any additional input from the user to navigate to the second application. Communicating with the second application can further include communicating at least one of the following to the second application: user identification information, payment account information, delivery address information, and user preferences. As noted above, the process can involve switching between browsers at particular websites to apps on a smartphone or tablet, or other device. An application in this case is generally known. It is a software product purchased or downloaded for free that performs typically a single general purpose like enabling purchases through Amazon, or handling video and audio calls like Skype. Such applications of course differ from the URL which can be associated with the same company but provide different mechanisms of accessing the services of that company.

The first application and the second application are one of smartphone applications and tablet applications. Again, in another aspect, this disclosure provides a description of switching between a URL (website) and an application. The system can automatically close the first application and start and present the second application in the processed state on a user interface. This enables the user to avoid the process of closing one app and manually launching the desired application. In one example, the first type is a search type and the second type is a product purchasing type. The first type can, for example, be a type not associated with purchasing products and the second type can be associated with purchasing products. This provides an example of switching between contexts, types, applications purpose and so forth, but while using a single input field. This approach reduces the interactions necessary for a user to get a function performed (search, purchase, delivery, call, etc.) because it eliminates the need to navigate to a separate URL or a separate application that performs the desired function. In example, the first application can process a payment for an item and coordinate with the second application for delivery of the item to a buyer.

Selecting a Transition Type Between Search Interfaces

Figure 24:
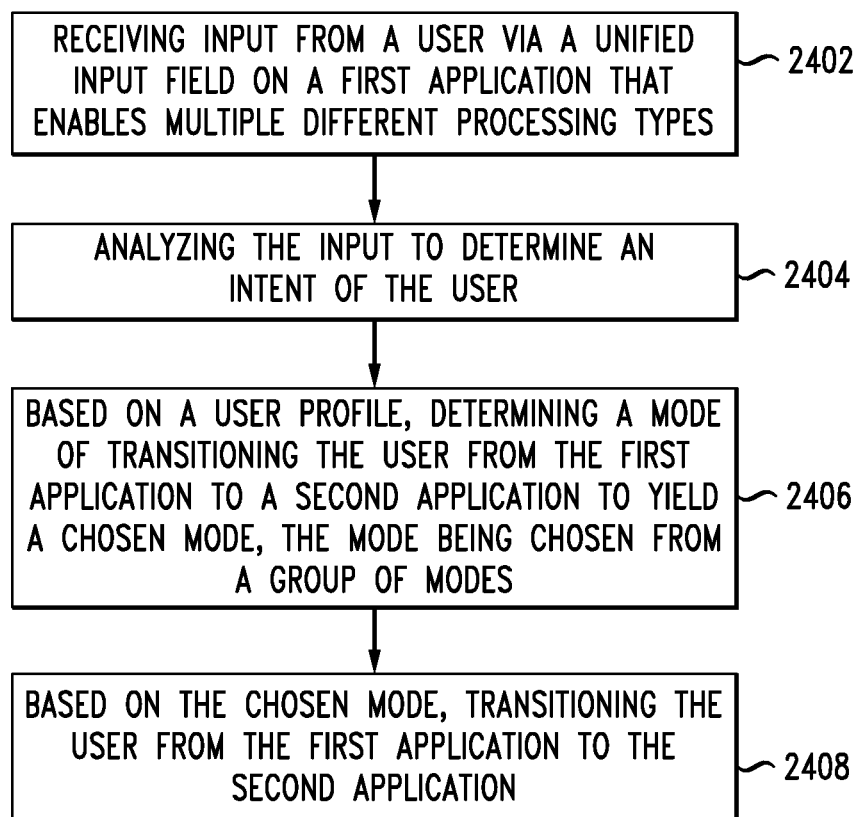
FIG. 24 illustrates a method example for selecting a transition type between interfaces.

FIG. 24 illustrates a method example. This example focuses on choosing the mode of transitioning from one interface to another. A method includes receiving input from a user via a unified input field on a first application that enables multiple different processing types (2402) and analyzing the input to determine an intent of the user (2404). Based on a user profile, the method includes determining a mode of transitioning the user from the first application to a second application to yield a chosen mode (2406), the mode being chosen from a group of modes and, based on the chosen mode, transitioning the user from the first application to the second application (2408).

The first application can be one of a first website and a first smartphone/tablet application and the second application is one of a second website and a second smartphone/tablet application. The group of modes can include: a tear, an autochange, a search button morph, a drop up menu, a drop down menu, a processing indictor morph and multiple reduced size one-click enabled windows. A "tear" represents an opening in a first interface that makes it appear that the first interface is tearing open to reveal another interface below it. So if the first application was google.com, and the user entered a search term that was determined to indicate that the user desires to make a purchase, an opening or a tear in the white space of the google.com page could appear and through that opening would appear a portion of an amazon.com webpage, preprocessed with the search term, such that the user can click on the opening space and easily transition from google.com to amazon.com with the input field data also transitioning as well. This approach reduces the number of necessary clicks. The autochange feature automatically replaces the URL from google.com to amazon.com (or whatever the two different websites are) without user input such that when the system determines that a switch is needed, it automatically does it and perhaps further processing to place the destination website in a one-click purchasing state based on the user input. The search button (the button that indicates what process is performed if a user clicks "enter") can morph in its functionality based on the user input. A notification of the function to be processed can also morph as well. Drop up, drop down, extension menus can also be provided which not only do auto complete but also present one-click purchasing options, calling options, video conferencing options, etc. These various modes present alternate mechanisms of transitioning automatically to a new webpage, application or function. However, given that there are different ways of making such a transition, the user can present and store preferences of how to make that transition. Alternately, various options could be presented and user history, previous searching and internet or application usage or other factors outside of or in connection with the user profile could be used to make the decision of the chosen mode.

The "tear" open to another page can include a one-click option that the user can click to make a one-click purchase. The system can maintain that tear view of the other page on the search interface while executing additional searches, exploring other search results, or browsing to other websites. For example, the user can "pin" the tear in place so it remains available while the user conducts additional browsing activity. Thus, the user could hold the one-click-purchase tear while reviewing, studying, searching around the web, and the user can still use the tear to make a purchase later on.

Transitioning the user can include transitioning the user without the user navigating manually to the second application. Transitioning the user can be achieved through the user performing a single click action to initiate and complete the transitioning. Transitioning the user from the first application to the second application can further include preprocessing the second application using at least one of the input, user identification, user account information, user delivery information and user preferences, to yield the second application in a one-click purchasing state. For example, the first application can process the payment and coordinate necessary data to the second application for delivery. Determining the mode can further be based on a screen configuration of a device running the first application. The mode may also be changing from one type of application (like a website accessed via a browser) to another type of application, like a smartphone/tablet application. All of the preprocessing and so forth can occur in any transition such that the user is positioned in a state within the destination that enables them to either browse search results (say on Amazon where the input provided on google.com is used to present search results) or in a one-click state where the user can just click to purchase an item.

Advertisements

Figure 25:
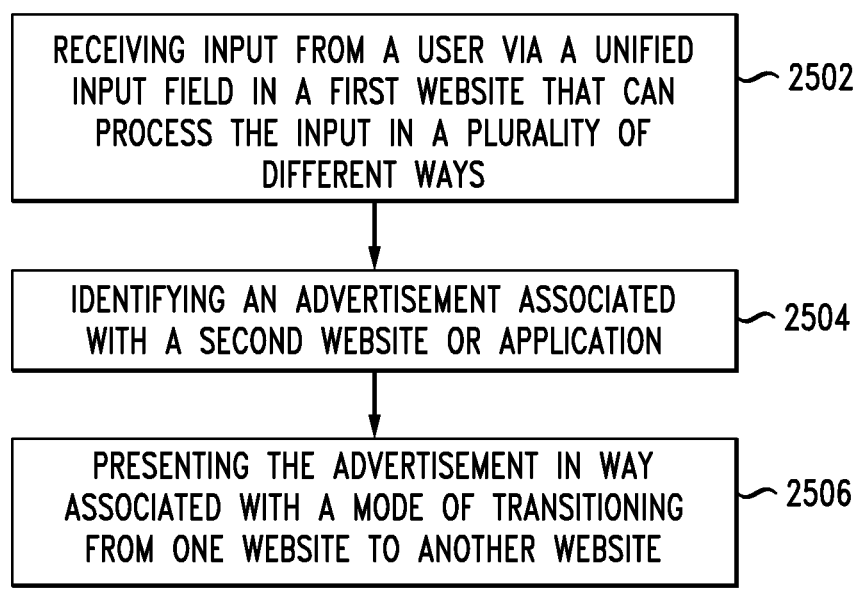
FIG. 25 illustrates a method example for presenting advertisements.

FIG. 25 illustrates a method example. This example relates to how various advertisements can be presented in connection with the use of a unified input field disclosed herein. A method includes receiving input from a user via a unified input field in a first website that can process the input in a number of different ways (2502). The first website could also be a first application or first user interface. The method includes identifying an advertisement associated with a second website or application (2504) and presenting the advertisement in way associated with a mode of transitioning from one website (application) to another website (application). There are various ways of transitioning smoothly and the advertising can be tailored to the mode of transition. For example, the ad can be presented one of the following ways or associated with one of the following transitions: a tear within the first website that reveals at least a portion of the second website, in a manner associated with an extension menu identifying the second website and available for selection by the user, in a manner associated with a morphed search button that alternates its function based on an intent identified from the input, in a manner associated with an automatic transition from the first website to the second website without user direct navigation and in a manner associated with a negotiated version of the second website which places the second website into a one-click purchasing state for selection by the user (2506).

There are a number of different ways of transitioning from a first input field context or environment to another without the need of the user actively navigating to the destination environment. In this example, since the system knows the intent of the user based on the analysis of the input data of the user, the system can use that intent and the knowledge of the destination site to present advertisements at some point during the transition.

For example, if the user is on google.com and enters "iPhone 5s 64 GB silver" the system may determine that the intent is to make a purchase. A tear could open up in the white space of the webpage revealing a portion of an amazon.com page in a purchase state where the user can just "one-click" and buy the iPhone and have it delivered. However, elsewhere on the white space, the system could present a Samsung device advertisement, which also could be positioned in a one-click state to tempt the user to purchase a different product or to explore a different product. Presenting the advertisement could be based on a price paid for the advertisement. A position within an extension menu of the second website or application of the advertisement could also be based on a negotiated price. In this case, when an extension menu is presented, a highest paid advertiser could be positioned closest to the input field. Presenting the advertisement in one of the ways identified can be chosen based on a negotiated price. The method can include transitioning the user from the first website (or application) to the second website (or application) based on an intent identified from the input and without manual user navigation.

Presenting Previews of Destination Websites in a Universal Search Interface

Figure 26:
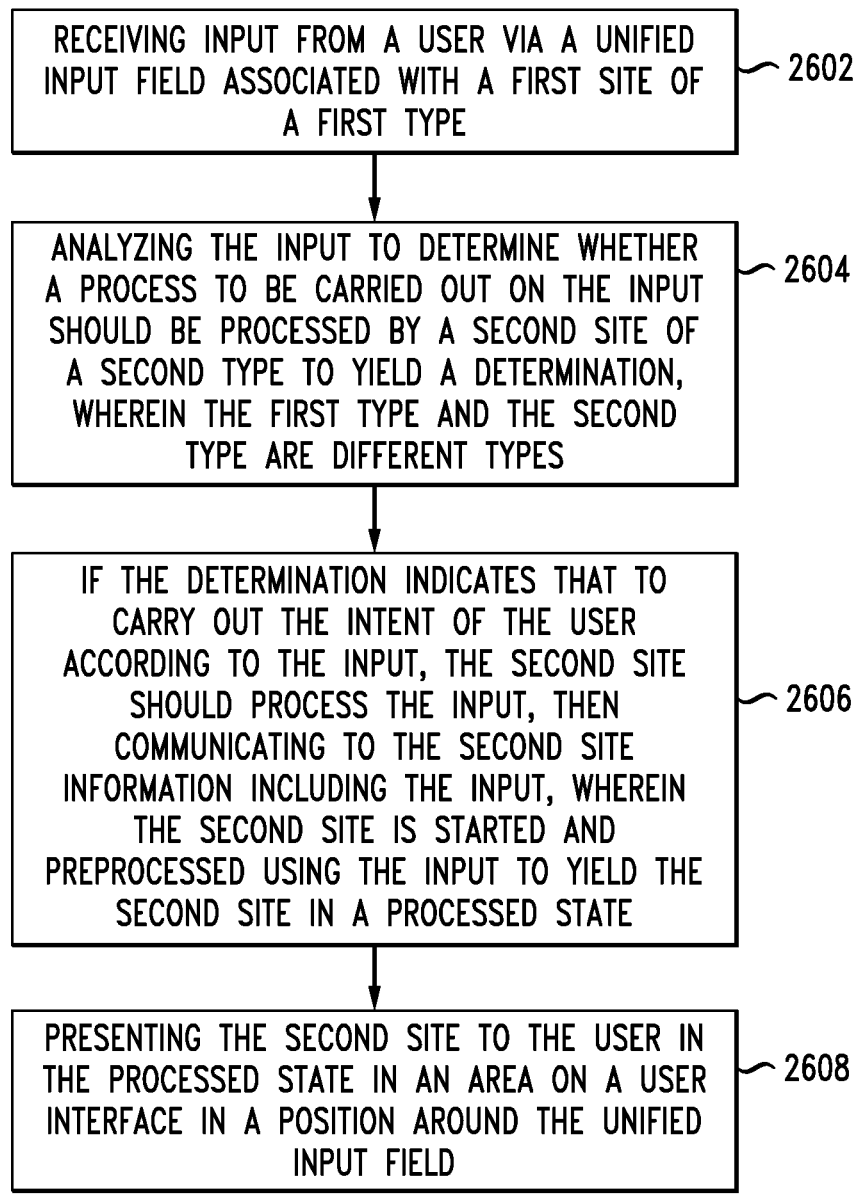
FIG. 26 illustrates a method example for presenting miniature versions of destination websites.

FIG. 26 illustrates a method example. This example focuses on presenting one or more miniature versions of destination websites or modified versions of other websites as a result of processing the input of the unified input field. For example, presenting a small version of amazon.com featuring the product associated with the input and preprocessed such that the user can touch a "one-click" button and make a purchase. A method example includes receiving input from a user via a unified input field associated with a first website of a first type (2602) and analyzing the input to determine whether a process to be carried out on the input should be processed by a second website of a second type to yield a determination, wherein the first type and the second type are different types (2604). If the determination indicates that to carry out the intent of the user according to the input, the second website should process the input, then the method causes a processor to perform the operation of communicating to the second website information including the input, wherein the second website is started and preprocessed using the input to yield the second website in a processed state (2606). The processed state could be a search results state which is the equivalent of the user navigating to the other website and entering in the input and searching for products. The processed state can be a best and most likely resulting product that the user desires to buy, based on their input and other factors, in connection with a one-click option to purchase that product. The buy option, when interacted with by a user, can result in the system processing a payment via payment data stored with the first application and coordinating delivery of the item via a second application. The method includes presenting the second website to the user in the processed state in an area on a user interface in a position around the unified input field (2608).

Figure 27:
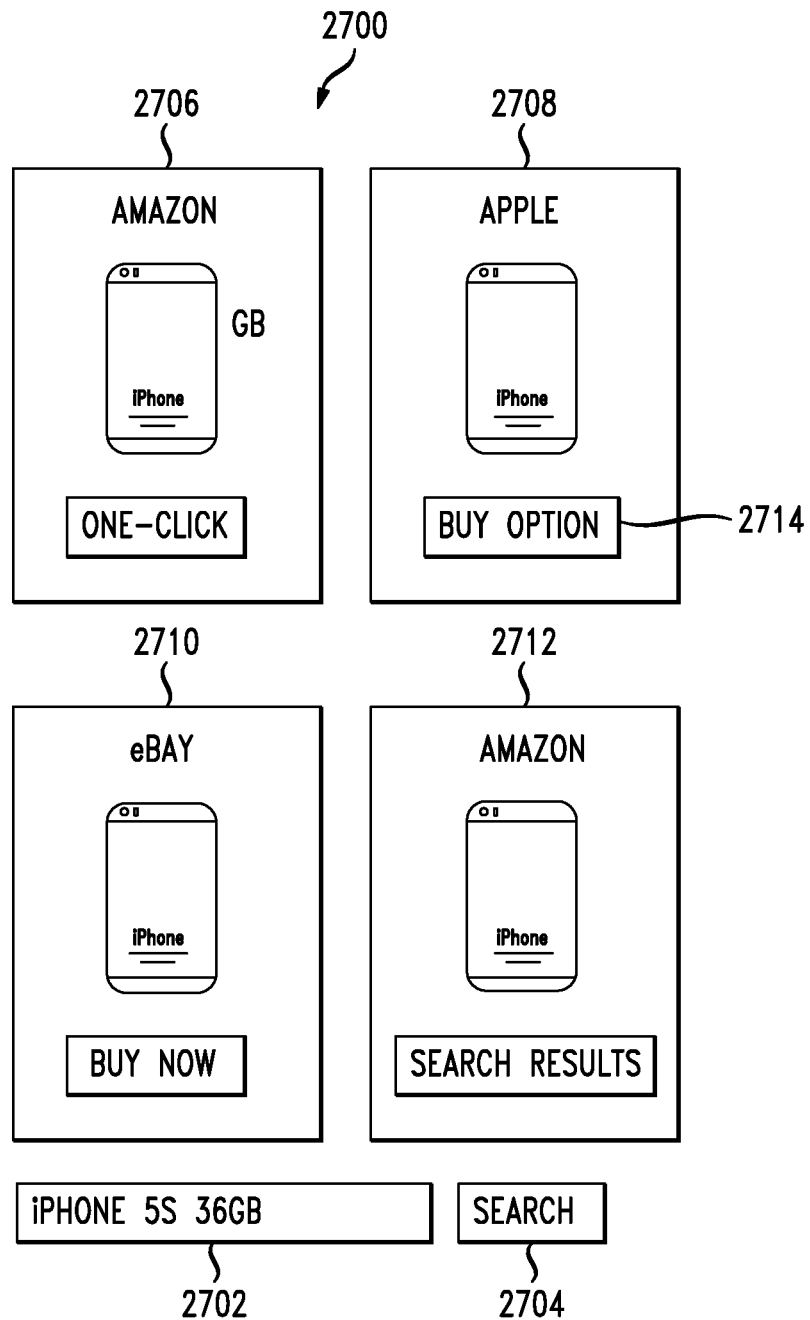
FIG. 27 illustrates a user interface with various destination sites in a preprocessed state.

The presenting can occur without any additional input from the user to navigate to the second website. In other words, the user just types in the input into the input field and the preprocessing of the other websites and presentation of those websites in one of a number of possible preprocessed states is performed automatically and without any navigation input from the user. The number of alternate websites presented in processed states could be also done based on the amount of disambiguation information needed. If the user only puts in "iPhone 5s" then many alternate preprocessed websites could be presented for 32 GB one-click purchase, gold 64 GB one-click purchase, etc. The user can see these various offerings and disambiguate by simply typing in disambiguation data such as "32" and "silver". The presentation then of the other website can automatically morph such that it narrows down the offerings to perhaps a one-click from Amazon and a one-click from Apple. FIG. 27 illustrates the interface 2700 with the search field 2702, search button 2704 and various alternate destination sites such as one from Amazon 2706 for a one-click purchase, and Apple website 2708 for a one-click purchase. Apple in this scenario of course can represent any merchant that communicates via an API with the search engine/social media/non-merchant site. The one-click or buy option button 2714 can be an indication that the advertisement 2708 is configured to enable an improved payment processing in which stored payment information at the site or via a server like Apple Pay can be used to process the payment and the delivery is managed and completed by the merchant. Thus, the user may click on the ad 2708 or the button 2714 and be asked to complete the purchasing process according to this improved set of steps which reduces the pain of fully being transferred to the merchant website to again enter in payment information. Thus, in this sense, the "one-click" button 2714 can mean literally one-click or an indication that the user desires to make the purchase using this new payment processing/delivery approach disclosed herein.

An eBay website 2710 with a one-click purchase or a one-click bid button and an Amazon search results offering 2712 wherein if the user click that button, the URL switches to amazon.com and is preprocessed as though the user had entered in "iPhone 5s 32 GB" and hit "search" directly on Amazon.com. As can be appreciated, preprocessing the input in this way reduces the number of interactions necessary by the user to navigate from a search website like Google.com to a product purchasing website like Amazon.com and then provide input to search and make a purchase.

The processed state can include one of a state wherein the user could perform a single click which would cause a purchase and delivery of an item associated with the input or wherein the user could perform a single click and view search results on the second website as though the user had navigated to the second website and entered in the input for a search. The method can include identifying a third website that could process the input and presenting the third website in the area on the user interface in a second position around the unified input field. FIG. 27 illustrates this approach. The second website and the third website can be in different states as is result 2712 compared to results 2706. Further, a position of the second website and the third website relative to the unified input field can be dependent on which of the second website and the third website has a most likely intent based on the input. Clicking on the "one-click" or the "search" button in one of the destination sites not only causes the purchase and delivery but also causes an automatic transitioning from the first website URL (such as www.google.com) to the chosen website URL (such as www.amazon.com). In other words, clicking on the "one-click" button (or other function button such as "search results") not only processes the purchase and delivery but also causes the transition to the other website. If a user had navigated to www.amazon.com initially and searched until they click on the one-click purchasing button, then they would see at www.amazon.com the notice "Thank you for your 1-click purchase, it is being processed." At that stage, the user could go to their account and change or cancel the order, track the order etc. The point here is that by clicking on the one-click button, presented in feature 2706 of FIG. 27, which is presented on the URL www.google.com, the system automatically causes the URL to change to www.amazon.com in such a processed states as to present that message: "Thank you for your 1-click purchase, it is being processed." At that stage, there is no difference in essence between the initial navigation to www.amazon.com and this automatic transition from www.google.com. Of course, the navigation can be from any website or application to any other website or application. The transition can also include separating the processing of payment and managing delivery. For example, google.com could handle payment for an item but coordinate with www.merchant.com for delivery of the order.

Figure 28A:
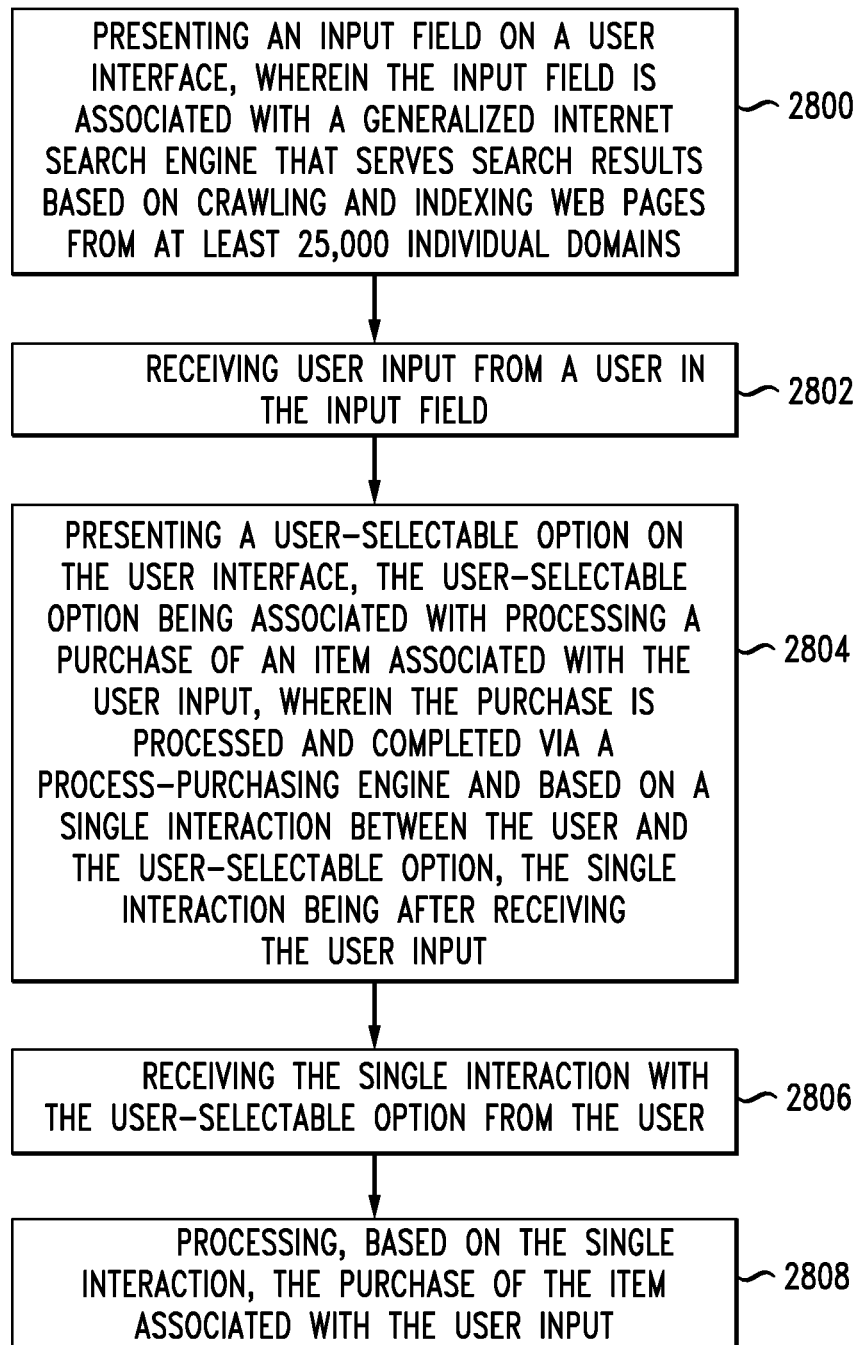
FIG. 28A illustrates another method example.

FIG. 28A illustrates another example related to the processing disclosed herein. A system can present an input field on a user interface, wherein the input field is associated with a generalized Internet search engine that serves search results based on crawling and indexing web pages from at least 25,000 individual domains (2800). This number of course can change but it is meant to distinguish between an Internet search via Google or Yahoo versus a search on a signal website like searching www.newyorktimes.com. The method includes receiving user input from a user in the input field (2802) and presenting a user-selectable option on the user interface, the user-selectable option being associated with processing a purchase of an item associated with the user input, wherein the purchase is processed and completed via a process-purchasing engine (which can be operated by the input field entity) and based on a single interaction between the user and the user-selectable option, the single interaction being a first interaction after receiving the user input (2804). The delivery of the item can be accomplished via a separate merchant from the input field entity.

As an example, a user enters in the iPhone 6 into the search field, thus the "user input" is "iPhone 6". The user types in the text and hits "enter" or "search". The system processes that input and constructs an interaction for the user that enables the user, without performing any further interactions after hitting "enter" (i.e., no need to navigate to another website or jump to another application), such that the next interaction can be (does not have to be but is structured such that it can be) a user interaction with the user-selectable option to buy (purchase and/or deliver) the iPhone 6. Thus, the method includes receiving the single interaction with the user-selectable option from the user (2806) and processing, based on the single interaction, the purchase of the item associated with the user input (2808). Of course the processing can include purchase and delivery. Other options available to the user of course could include tailoring the purchasing process to be a delivery to a relative or friend (someone other than the purchaser), or to pay in a different way that is preferable set on the user profile. Much like purchasing processes and capabilities with outlets like Amazon.com, the present disclosure encompasses all such functionality at this stage as well. For example, the interaction with the buy option can result in the first entity associated with the unified input field processing a payment of an item and coordinating with a separate merchant for filling or finalizing the order by delivering the item to the buyer. The first entity would them handle making a payment to the merchant.

Figure 28B:
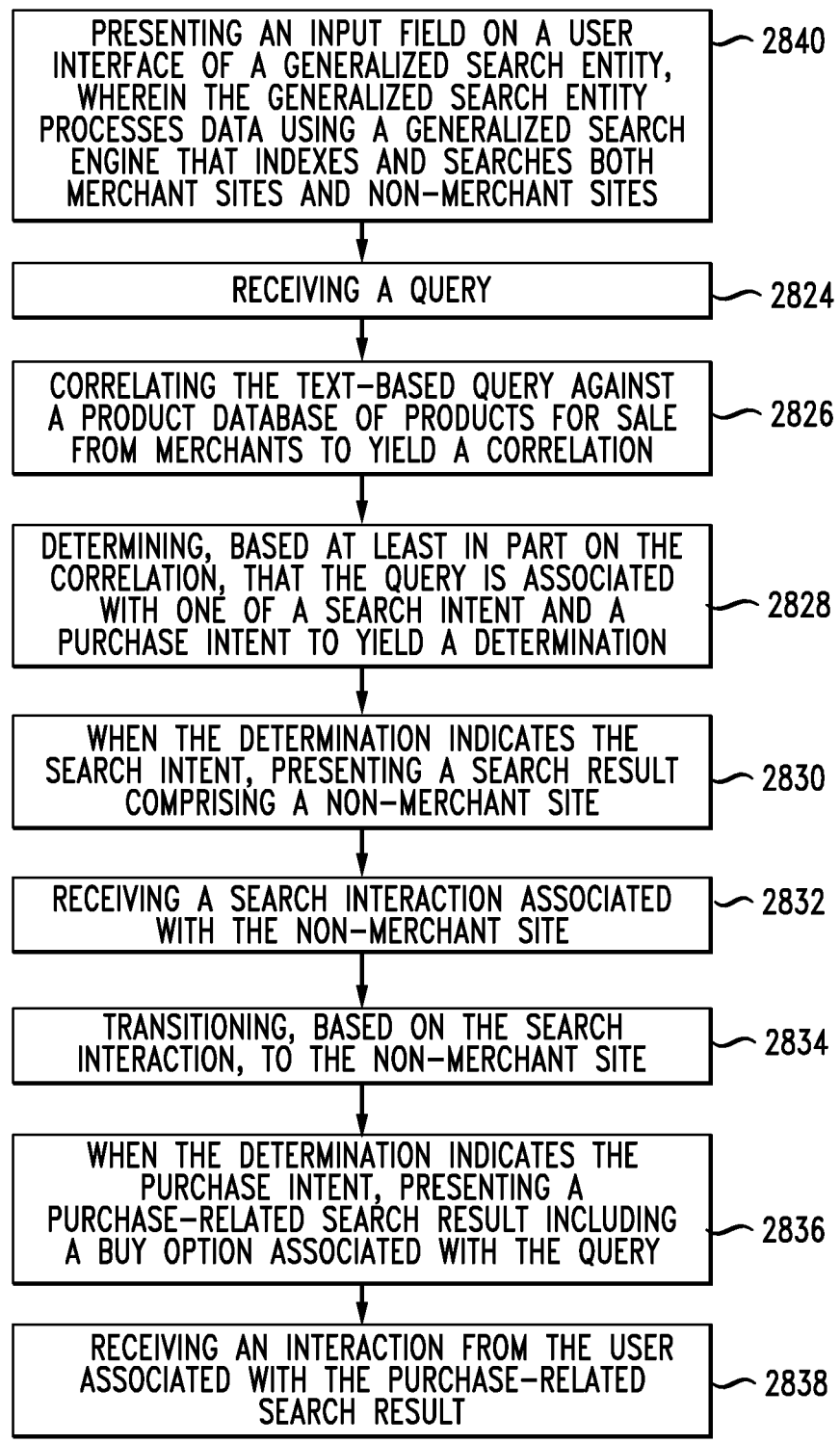
FIG. 28B illustrates yet another example method.

FIG. 28B illustrates another example which does not require the user to actually make a purchase. A method includes presenting an input field on a user interface of a generalized search entity, wherein the generalized search entity processes data using a generalized search engine that indexes and searches both merchant sites and non-merchant sites (2820), receiving a query (such as, for example, a text-based query, although other input modes are contemplated) in the input field (2822), and correlating the text-based query against a product database of products for sale from merchants to yield a correlation (2824). The correlation can simply mean accessing a database of products to determine whether a product is in inventory which could be presented as part of a search result with a buy option.

The method includes determining, based at least in part on the correlation, that the query is associated with one of a search intent and a purchase intent to yield a determination (2826). When the determination indicates the search intent, the method includes presenting a search result including a non-merchant site (2826), receiving a search interaction associated with the non-merchant site (2828) and transitioning, based on the search interaction, to the non-merchant site (2830). When the determination indicates the purchase intent, the method includes presenting a purchase-related search result including a buy option associated with the query (2832). The purchase-related search result can be configured such that when a user interacts with the purchase-related search result and confirms a purchase via interacting with the buy option, the generalized search entity (or a separate payment service, separate from the merchant) initiates processing of the purchase of an item. The method can include optionally receiving an interaction from the user associated with the purchase-related search result (2834). The structure of the search result having the buy option is part of this aspect. The user interacting with the search result and/or completing a purchasing transaction are optional features.

The method can include receiving, from the user, an interaction with the buy option and managing the purchase of the item based on payment information stored at the generalized search entity or another payment service, wherein delivery of the item is handled via a merchant site separate from the generalized search entity. The user can have a pre-existing account storing preferences governing how one of the search result, the purchase-related search result and the buy option is presented. The purchase-related search result can include an option selectable by a user to receive further search results. The user interface can in one aspect be on a mobile device. In another aspect, the purchase-related search result can be further configured such that when the user interacts with the purchase-related search result indicating a desire to transition to a merchant site, the method further includes transitioning to the merchant site associated with the purchase-related search result. In this case, typically the merchant would proceed with process the payment. In other words, the search result can include a buy option but can also include an option of transitioning to the merchant site for continued searching and/or to make the purchase. The generalized search entity and the merchant site can communicate via an application programming interface for managing the purchase and delivery of the item.

In another aspect, the steps can be performed by the merchant. In this case, the merchant establishes, from a merchant site, communication between the merchant site and a generalized search entity via a communication interface. The generalized search entity processes inquiries in the manner set forth above. The merchant provides access to product inventory and through an API will provide product offerings and receive payments from the generalized search entity or other payment service as well as data about purchases such that the merchant can process and manage delivery.

Figure 29:
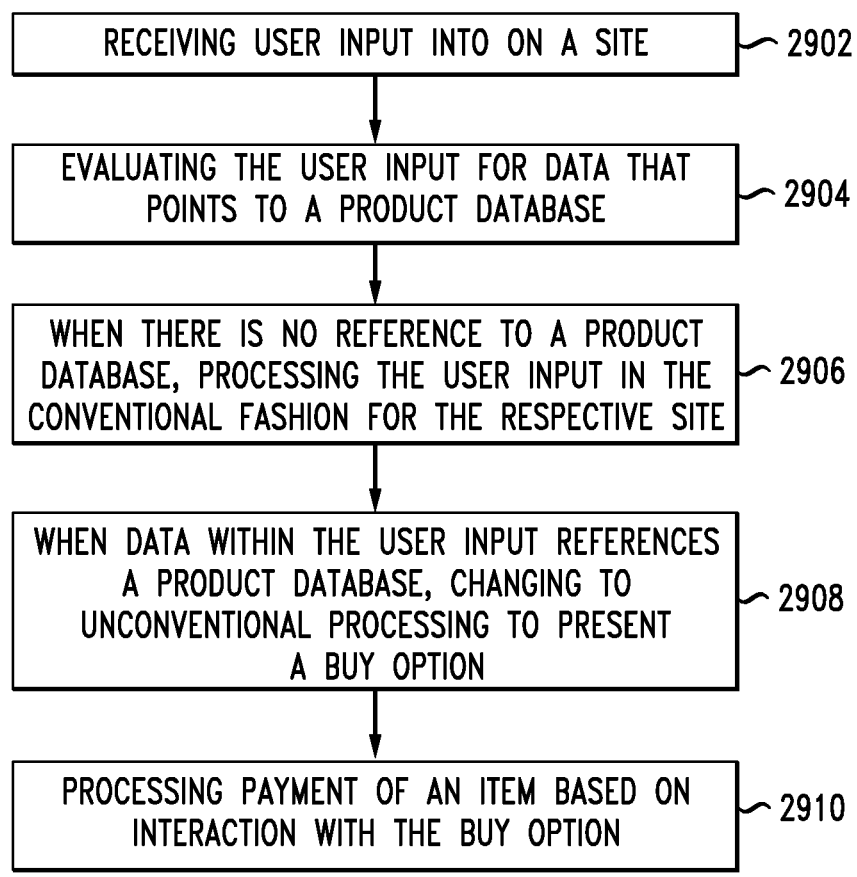
FIG. 29 illustrates another method aspect.

The disclosure now returns to social media or search sites functionality. FIG. 29 illustrates a general example of a method which can apply across different sites between a search site like www.google.com and social networking sites. The concept is to change the conventional processing of any of these sites to technically determine through the use of unconventional steps whether the user has included in the input to the site (text, image, video, tweet, etc) that has a purchase/sale intent. The first step is to receive user input into the site (2902). The system evaluates the user input for data that points to a product database (2904). The system may determine that no intent exists or may not identify a link to a product database or any reference to a product that may match products listed in a product database. When there is no reference to a product database, the system processes the user input in the conventional fashion for the respect site (Google, Twitter, Facebook, Instagram, Pinterest) (2906). When there is some kind of data within the user input that links to a product database, the system changes to unconventional processing to present a buy option associated with recipients of the further processing of the user input (2908). Recipients of tweets, Facebook posts, Instagram pictures, results of a Google search, etc., and the like, will see a buy option and be enabled to purchase the product within the site through a service like Apple Pay or through the site storing and processing payment data for a user. When the user interacts with the buy option, new processing occurs to process the payment and/or delivery of the item. For example, a smooth transition from the site to a deep-link into a merchant or seller site that posted the user input can occur such that the user can easily purchase the item from the merchant site (2910). Alternately, the site can store payment information or a separate payment service can be utilized to process payment generally at the site and not by the merchant directly or through the merchant site.

Figure 30:
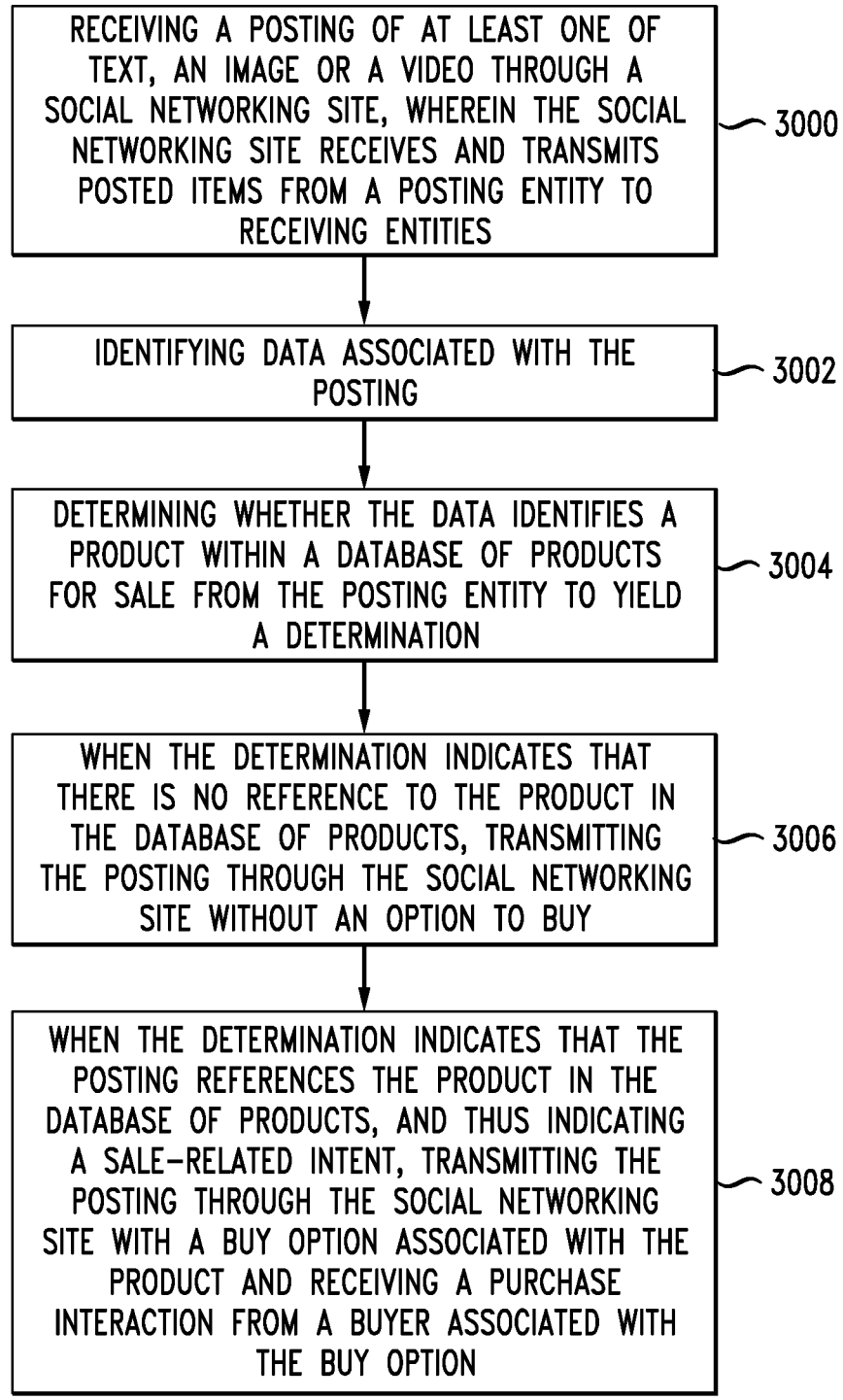
FIG. 30 illustrates a Facebook method example.

FIG. 30 illustrates an example related to social media and particularly to Facebook. An example method includes receiving a posting of at least one of text, an image or a video through a social networking site, wherein the social networking site receives and transmits posted items from a posting entity to receiving entities (3000), and identifying data associated with the posting (3002), determining whether the data identifies a product within a database of products for sale from the posting entity to yield a determination (3004). When the determination indicates that there is no reference to the product in the database of products, the method includes transmitting the posting through the social networking site without an option to buy (3006). When the determination indicates that the posting references the product in the database of products, and thus indicating a sale-related intent, the method includes transmitting the posting through the social networking site with a buy option associated with the product and receiving a purchase interaction from a buyer associated with the buy option (3008). This can simply include a user or recipient viewing or clicking on a posting to cause further processing to occur.

Optionally, the method includes processing a purchase of the product based on the purchase interaction, wherein processing the purchase occurs within the social networking site. Processing the purchase within the social networking site can be accomplished through payment information stored at the social media site or through another payment service like PayPal® or Apple Pay®. These services are integrated with the site such that user interaction with the buy button triggers a payment from one of the services which is integrated into the process between the social media site and the merchant.

Determining whether the posting is associated with the product in the database of products from the posting entity can further include communicating between the social networking site and the database of products via an application programming interface. The step of processing delivery of the product can include informing the posting entity selling the product through an application programming interface to ship the product. A user can have a pre-existing account storing preferences governing how the image or the video and the buy option are presented and processed.

In another aspect, rather than processing the payment at the site as described above, the method can include transitioning the buyer from the social networking site to a deep link in a site operated by the posting entity. In this manner, the merchant can receive the user at a preconfigured position and state within the merchant site for viewing and purchasing a product through the merchant site directly.

In another aspect, the method is practiced from the standpoint of the merchant. The merchant submits, as a posting entity, at least one of text, an image or a video through a social networking site to yield a posting. The site then processes the posting as outlined above. If a user clicks on the posting or initiates processing towards a purchase of an item in the posting, then the processing can include processing, by the posting entity, a delivery of the product based on the purchase interaction. The posting entity can also receive the deep link transition from the social media site to its own site for continuing to shop, process the payment and delivery of the item, and so forth. This process outlined above provides various aspects for managing buy buttons through social media sites like Facebook and others.

Figure 31:
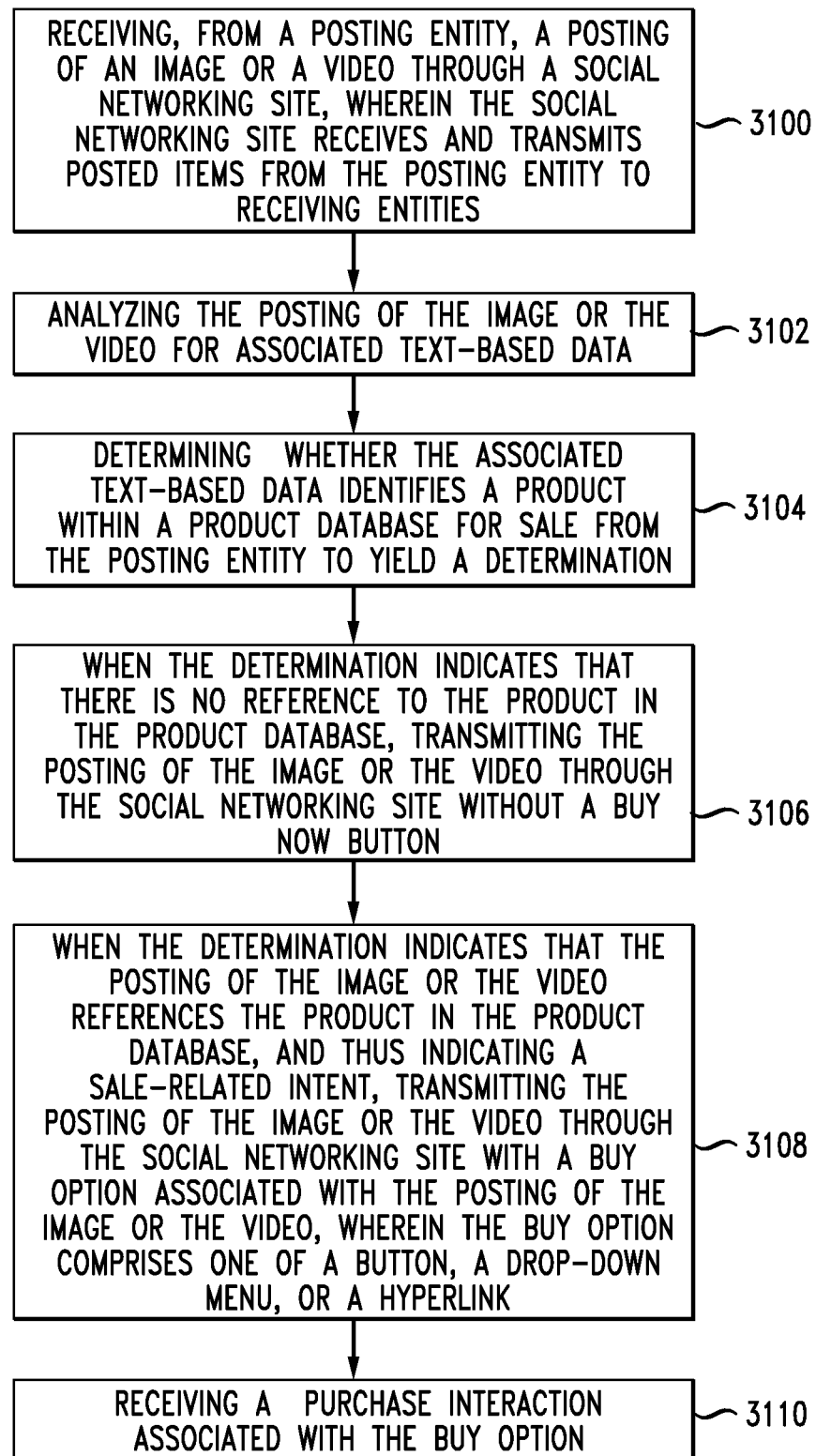
FIG. 31 illustrates a Pinterest type social media method example.

FIG. 31 illustrates another example social media aspect which can be applicable to such media as Pinterest, Instagram, Youtube, etc. The social networking site can be one of a video or image sharing site, or a pinboard site. The method includes receiving, from a posting entity, a posting of an image or a video through a social networking site, wherein the social networking site receives and transmits posted items from the posting entity to receiving entities (3100), analyzing, via a processor, the posting of the image or the video for associated text-based data (3102), and determining whether the associated text-based data identifies a product within a product database for sale from the posting entity to yield a determination (3104). When the determination indicates that there is no reference to the product in the product database, the method include transmitting the posting of the image or the video through the social networking site without a buy now button (3106). When the determination indicates that the posting of the image or the video references the product in the product database, and thus indicating a sale-related intent, the method includes transmitting the posting of the image or the video through the social networking site with a buy option associated with the posting of the image or the video, wherein the buy option comprises one of a button, a drop-down menu, or a hyperlink (3108) and receiving a purchase interaction associated with the buy option (3110). Optionally, the method can include processing a purchase of an item based on the purchase interaction. This occurs when the recipient actually clicks on the posting and completes the purchase. Notably, the concept here generally involves the novel structure of the posting and not necessarily the payment processing when a user makes a purchase.

Determining whether the posting of the image or the video is associated with the product in the product database from the posting entity can include communicating between the social networking site and the product database via an application programming interface. Processing delivery of the item can include managing a payment for the item via a payment account associated with the social networking site (i.e., stored at the site or integrated with a separate payment service) in which the payment account is not stored with the posting entity and informing the posting entity selling the item through an application programming interface to ship the item. The user can have a pre-existing account storing preferences governing how the posting of the image or the video and the buy option are presented.

As with the Facebook example above, another aspect of the method can be practiced from the standpoint of the merchant. The merchant submits, as a posting entity, at least one of text, an image or a video through a social networking site to yield a posting. The site then processes the posting as outlined above. If a user clicks on the posting or initiates processing towards a purchase of an item in the posting, then the processing can include processing, by the posting entity, a delivery of the product based on the purchase interaction. The posting entity can also receive the deep link transition from the social media site to its own site for continuing to shop, process the payment and delivery of the item, and so forth. This process outlined above provides various aspects for managing buy buttons through social media sites like Pinterest, Instagram, Twitter, YouTube and others.

Product Management Engine

This disclosure now turns to a product management engine, purchase manager or an engine that manages product purchase across multiple platforms.

Figure 32:
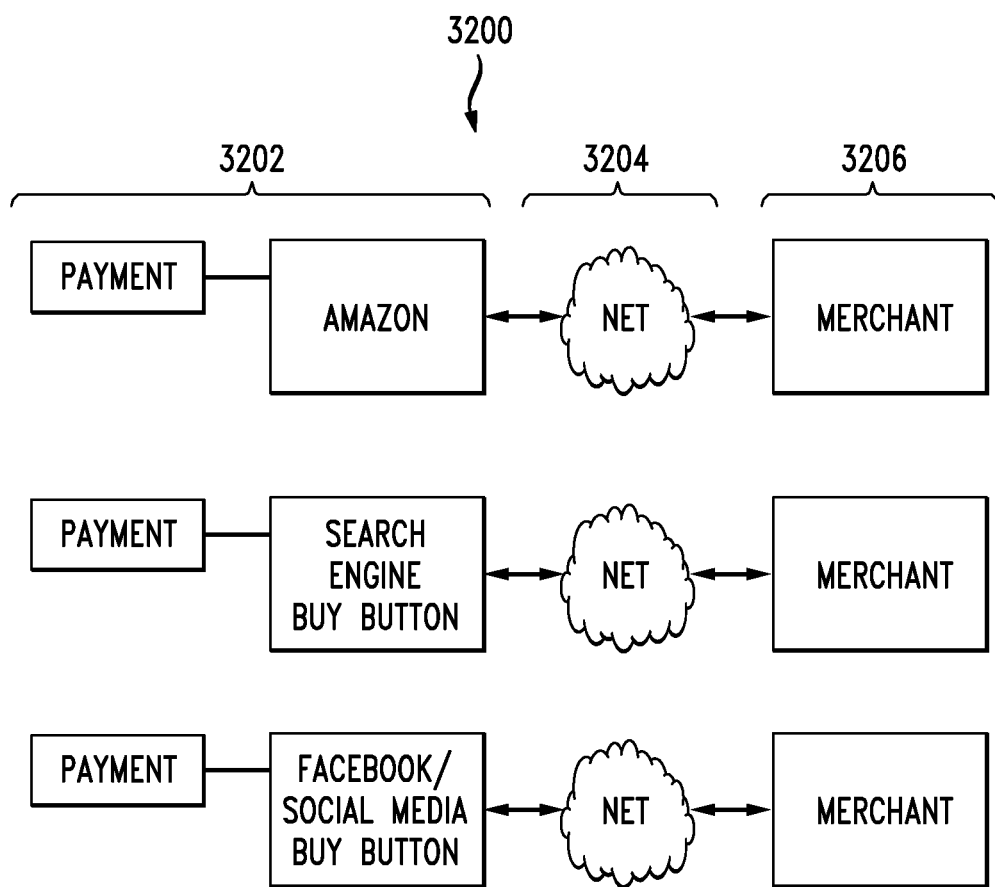
FIG. 32 illustrates an example environment for a purchase manager.

FIG. 32 illustrates a general environment 3200 which the present disclosure addresses. Feature 3202 illustrates various systems for making purchases. For example, Amazon.com can provide purchases through the Internet 3204 from merchants 3206 using a payment method as is shown. Similarly, as disclosed above, other entities such as search engines or social media applications can provide buy buttons in which payment can be processed 3202 and communications via the Internet 3204 with merchant 3202 can enable the delivery of such purchased products. Similarly, social media sites such as Facebook can also provide buy buttons in which payments are processed 3202 and communication through the Internet 3204 with merchant 3206. As is illustrated, however, in FIG. 2, there is no coordination between these various types of methodologies in which purchases can be made by users over the Internet. Because of the disparate offerings of the ability to buy products across multiple platforms on the Internet and mobile applications, people can easily forget what they bought and where they bought it from. For example, a person may have bought an umbrella off of a one-click offering a week ago, it may not have arrived, and they may not remember whether they bought it off Twitter, Google.com, or Facebook. With one system like Amazon.com, it is easy to go to the user's account and mange the history. With the new buy button environment, accessing the purchase history becomes much more difficult.

Accordingly, the present disclosure addresses this issue and seeks to provide an enhanced user account via a product purchase managing system or engine.

Figure 33:
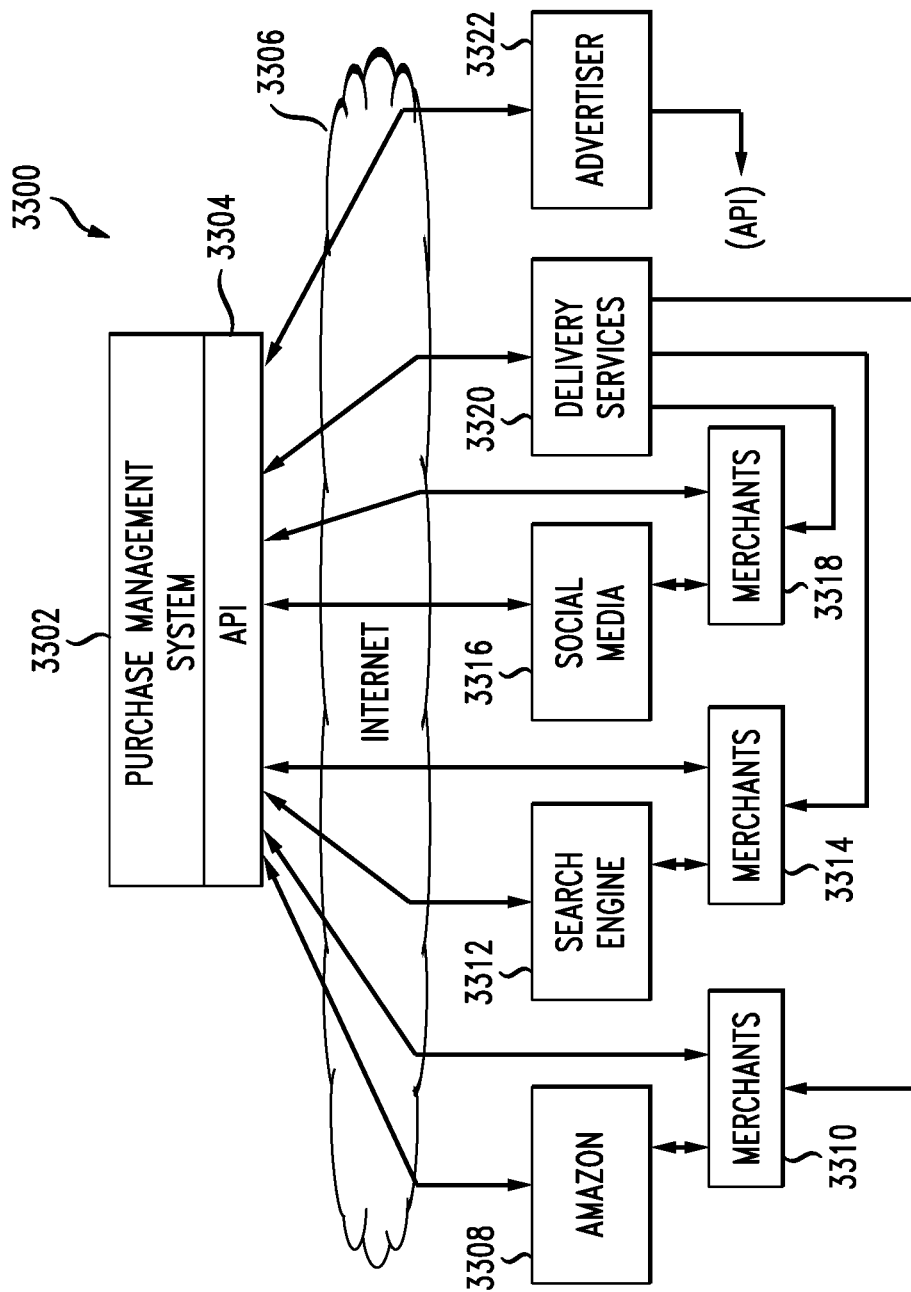
FIG. 33 illustrates a further interaction between the purchase manager and various entities.

FIG. 33 illustrates this approach. The overall ecosystem 3300 involves a purchase management system 3302 or a product purchase history management engine. An API 3204 is provided which enables communication from a number of disparate entities with a goal of harmonizing and receiving various purchasing data, correlating that data and harmonizing that data, and presenting a unified purchase history and management user account such that is accessible through a number of disparate purchasing platforms.

For example, the API 3304 can communicate information to and from a merchant aggregator site 3308 such as Amazon.com and the like. Thus, consider that all of the information found in a user's account and purchase history can be communicated through the API 3304. Amazon sells products for merchants 3310. Such merchants in a similar manner to which they communicate with Amazon.com 3308 their purchases, prices products and so forth, can also communicate through API 3304 with the purchase management system 3302.

In a similar manner, with the advent of the buy button and various different environments, when purchases are made through a search engine 3302, the search engine can communicate via the API 3304 with the purchase managing system 3302. Similarly, the merchants 3314 that sell products through a search engine 3312, can communicate information through the API. In a similar way, purchases made on social media 3316 through their respective merchants 3318 can also communicate via the Internet 3306 and the API 3304 with the purchase management system 3302. Delivery services 3320 also are integrated with various merchants 3310, 3314, 3318 and can also communicate via the API 3304 with the purchase managing system 3302. Furthermore, advertisers 3322 can communicate through the API 3304 or through other means with the purchase managing system 3302 to receive valuable purchasing behavior information which can enable improvements to providing advertisements through any of the outlet or for any of the merchants. Thus, any of the merchants 3310, 3314, 3318 can have not only access to sell their products through the various means shown in FIG. 33 but may also have their own separate websites and the business intelligent data 3322 can be utilized and provided to any of these avenues for making purchases and improving the advertisements for users. The API can be structured such that a standardized calls and communication protocols can be used to identify and exchange between the engine or other agent handling the aggregation and management and merchants or users all of the various types of data needed to perform this process. This can include such data as product purchased, delivery address, whether the product is a gift, messages associated with delivery, delivery scheduled time, current delivery status, predicated delivery time, warranty information, payment status, backorder status, return status and/or information, and so forth. These and any other data useful for managing purchases can be requested, transmitted, received or otherwise communicated between the API and any of the components communicating through the API.

The API can also include such features as when and how to present an interactive button or graphic for accessing the engine. For example, the use of this management engine is in the context of users making one-click or other purchases across disparate applications or websites. A payment request API is also disclosed herein. A merchant may, for example, request when submitting a call to a payment request API, or other API or through its own processing, that a produce purchase management access button be also presented in the interaction. In this manner, the ability to access the user's account is presented where the user is—on a social media site, making a purchase at any location, and so forth. The call to request the access button could include a request for an analysis or the results of an analysis about the user's account which could indicate that there is a probability that the user might desire to make some kind of change or check their account. For example, a merchant may request that if the user's had regular account access and/or changes and the timing is such that the user might be accessing their account again soon, that an account access button be presented while or after they make a buy button purchase. Then the user could see the current purchase and review their other purchases while they are "in the zone" of making purchases. The analysis could determine that the user has in their account a similar product to what they are about to purchase or have just purchased and they might want to review their overall account to insure that they are not double buying. Thus, the system can provide an intelligent consideration of whether to include an access button to the purchase history and management engine for the user purchases. This access button can be offered up by request from the merchant, by user profile considerations, or via a separate entity. For example, the user may place in their profile indicators that they don't want to see the access button every time unless the purchase they are about to make conflicts with or is a duplicate of a previous purchase. The user may desire to see the purchase history after every purchase or have an option presented to them to access their account history. The access button can be visually and/or audibly configured (i.e., brighter, flashing, making a certain sound) to give notice if there might be someone abnormal (a double purchase just happened, or a late delivery is expected of an item) in the purchase history and that the user should check. In this scenario, given the limited display space for example in mobile purchasing, the system can more intelligently determine when to present an access button (or other access mechanism such as audibly) to the user such that its display is connected to a likely need for the user to review or make changes in the purchase history.

Machine learning engines can also be applied to the user's actual usage and accessing of their account. Thus, the system could start by offering up the button every time or every other time or under some other strategy and learn how and when the user accesses their account. For example, the system may learn that the user only accesses their account through Amazon.com and thus the system stops presenting access buttons on social media or search engine sites. Or the system may learn that usually within 2 weeks of any purchase the user accesses their account to check the status. Thus, the machine learning algorithm learns and applies new rules for presenting the access button within two weeks after a purchase and for 3 days and if the user does not access their account, the access button disappears. Of course, access can always be achieved through a tab or account button which is always available but the "one-click" access to their purchase history and management system can be managed as disclosed herein. Alternately, the access to the purchase history management system can be offered through other means as well, such as through a link in a text or an email, or a voice activated system, and so forth. The user profile, machine learning algorithm, or through other triggering events can cause, for example, the system to notify the user that they should access their account to check something. If, for example, a package that is scheduled for delivery the next day is going to be late, the system can provide a notification through any outlets such as email, text, social media message or posting, or a notification to where the user "is" such as when they are making a Google.com search or on Facebook.

Furthermore, FIG. 33 shows communication in both directions between the API 3304 and the respective purchasing avenues. Thus, an example shall illustrate the point. Assume that a user has an Amazon account and has made three purchases from different merchants through Amazon. com 3308. That user could go into their account and handle various matters associated with their purchases such as tracking, delivery, cancelling the purchase and so forth. However, that account is limited to only purchases made on Amazon. Using the principles disclosed herein, if a user were to purchase a widget via a search engine 3312 from a merchant 3314, that information would be provided through API 3304 to the purchase management system 3302 and then combined with the existing purchases on the Amazon. com user account. In this account, a user could go into their user account on Amazon.com 3308 and be able to also view the widget purchase via the search engine 3312 and manage that purchase as well. Additionally, that correlated data could also be presented to all of the outlets 3312 and 3316. Thus, via the search engine or a social media site or some other site that perhaps does not even sell products, a correlated user account can be accessed in which the three Amazon purchases and the one search engine purchase could all be viewed and managed completely or near completely, thus simplifying the overall process for the end users.

Figure 34A:
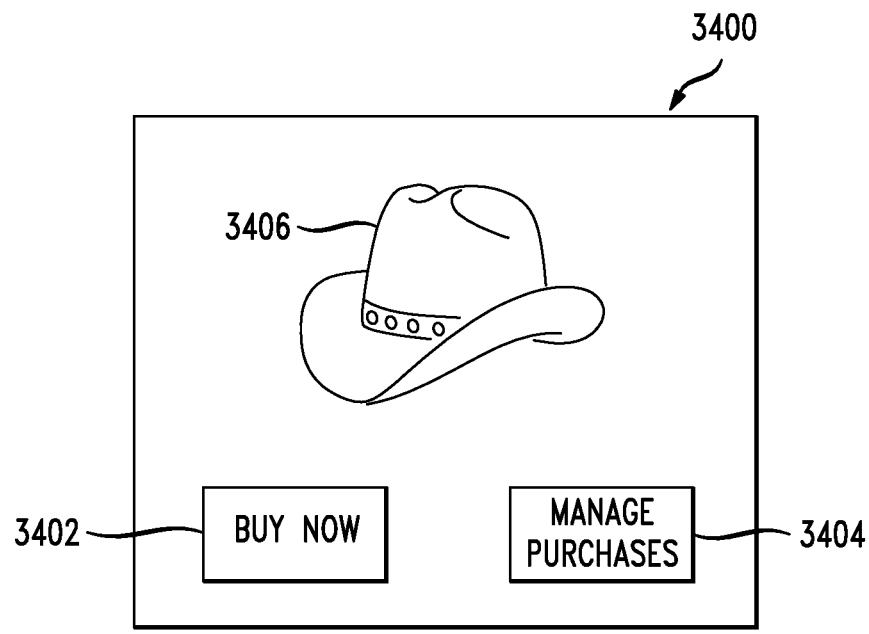
FIG. 34A illustrates a buy now advertisement with a manage purchase access button.

FIG. 34A illustrates an interface 3400 which includes a presentation of a product 3406 (a hat) and a buy now button 3402 and a "manage purchases" button 3404. This interface 3400 can represent any interface on any of the approaches for buying products. Thus, the interface 3400 could represent a buy now advertisement as a part of search results on Google.com, or a Pinterest post which enables a user to buy the present product, and so forth. In any of these outlets, a manage purchases button 3404 can be interacted with by the user to access their user account.

Figure 34B:
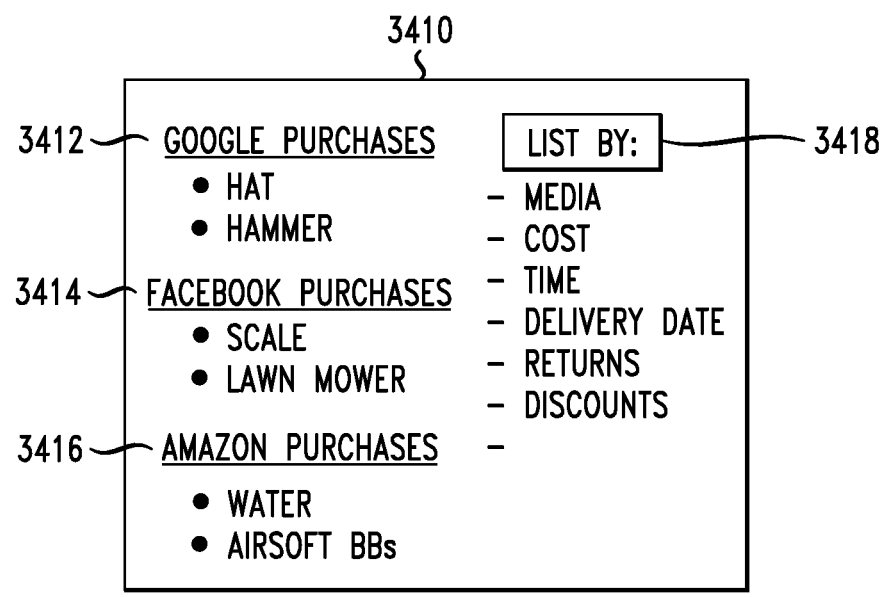
FIG. 34B illustrates an account interface for a purchase manager.

FIG. 34B illustrates an example user account 3410. Here, an illustration of Google purchases 3412, Facebook purchases 3414 and Amazon purchases 3416 are presented in a simplified manner. The user is given the option to list these purchases 3418 in various ways. The user could, for example, organize these purchases by virtue of media, cost, time, delivery date, returns, discounts, and so forth.

FIG. 35 illustrates a more detailed user account 3500. Here, various tabs 3502 are presented for the user to be able to review orders, open orders, digital orders, or cancel orders. Various options 3504 enable the user to manage their orders placed in the last six months (or any period of time), by media, by cost, by merchant, by delivery date, and so on. Information 3506 can include such information as the purchases made by Google and the merchant is Joe's Sporting Goods. The user has the option to buy the product again 3510 or includes other options 3508 such as tracking the package, returning or replacing the items, leaving package feedback, writing a product review, archiving the order, and so forth. As can be appreciated, the addition of purchase details from other traditionally non-merchant sites provides an improvement over the previous operating and management of user accounts to enable users to more easily manage their purchases.

Figure 36:
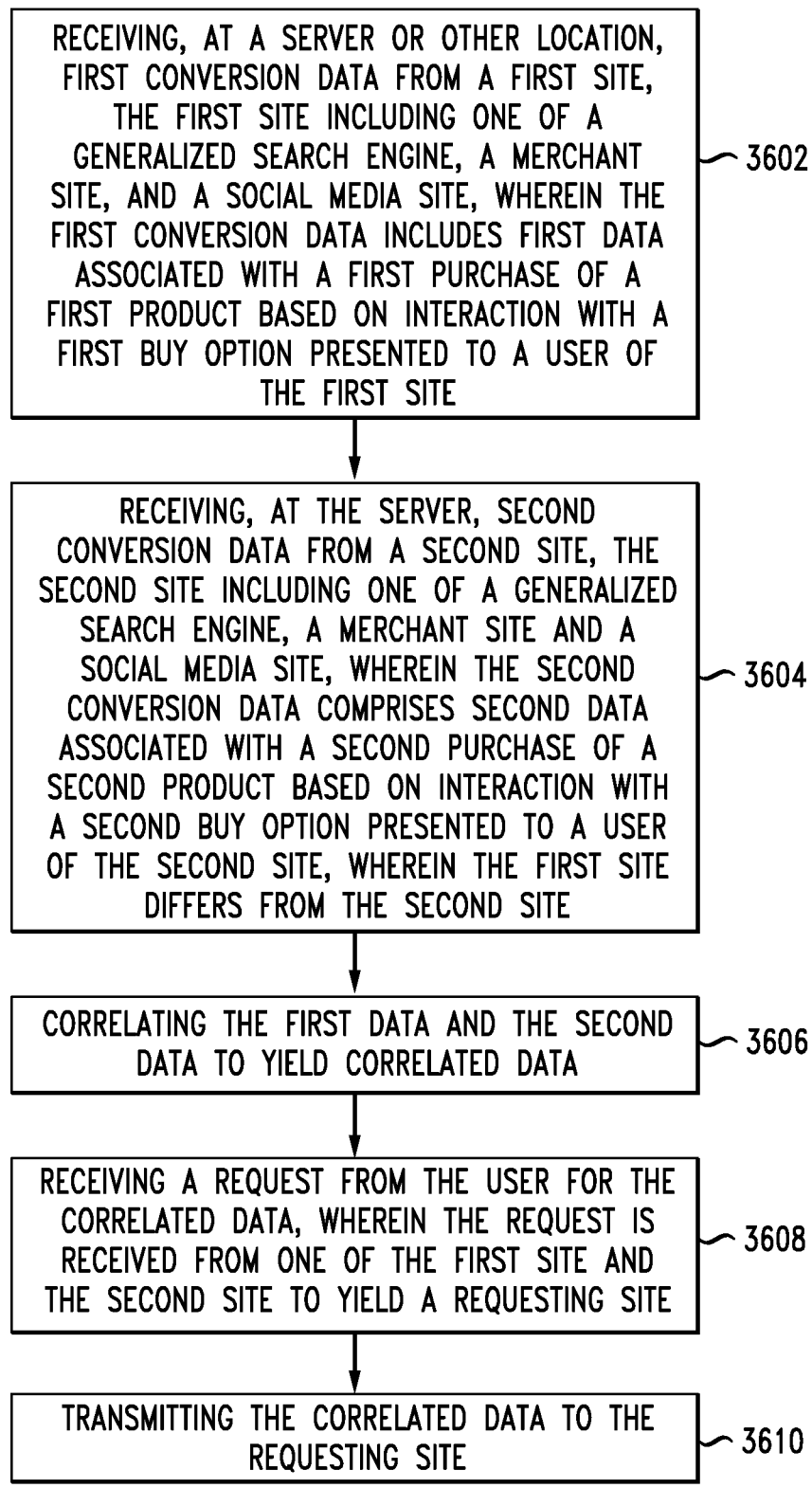
FIG. 36 illustrates another method example.

FIG. 36 illustrates a method aspect of the product management engine. The method includes receiving, at a server or other location, first conversion data from a first site, the first site including one of a generalized search engine, a merchant site, and a social media site, wherein the first conversion data comprises first data associated with a first purchase of a first product based on interaction with a first buy option presented to a user of the first site (3602), receiving, at the server, second conversion data from a second site, the second site including one of a generalized search engine, a merchant site and a social media site, wherein the second conversion data comprises second data associated with a second purchase of a second product based on interaction with a second buy option presented to a user of the second site, wherein the first site differs from the second site (3604). The method includes correlating the first data and the second data to yield correlated data (3606) and receiving a request from the user for the correlated data, wherein the request is received from one of the first site and the second site to yield a requesting site (3608). The method can include transmitting the correlated data to the requesting site (3610). As can be appreciated, this approach enables the "micro-moments" to not only encompass purchasing decisions but purchase history management decisions. This disclosure places access to a broad user purchasing account at the fingertips of users wherever they happen to be— whether on Facebook, Instagram, Pinterest, Twitter, etc. The transmission of the user account data does not have to only be to a purchasing site but could be to any location, any application. Thus, the user might be using their outlook for emails and have an option to access their purchasing account via an API and accessible to an option selectable via the Outlook application, even if no "buy now" buttons or options are available to Outlook. Even if outlets like Twitter were to pull away from the buy button feature, users still spend time on such social networking sites and the access to the purchase history management engine could be granted there.

The social media site can include one of a site for exchanging images, a site for posting images and comments, a site for exchanging short text messages, and a site for posting videos. The first site mentioned above can include a generalized search engine that determines an intent of a user by analyzing textual user input as being one of a purchase intent and a search intent. When the intent of the user is the purchase intent, the generalized search engine can respond to the textual user input with a response including a buy option associated with the first product. Transmitting the correlated data to the requesting site further can further include transmitting an interface to the requesting site that enables the user to perform one or more of the following operations: (1) cancel the first purchase of the first product or the second purchase of the second product; (2) replace the first purchase of the first product or the second purchase of the second product; (3) track a shipment of the first product or the second product; (4) read reviews of the first product or the second product; (5) purchase more of the first product or the second product; (6) modify a purchasing account used to purchase the first product or the second product; (7) modify an address to which the first product or the second product will be delivered; (8) modify a date upon which the first product or the second product should be delivered to a recipient address; (9) write a product review for the first product or the second product; (10) organize a respective presentation of the first product and the second product by one of (1) which respective site was used to purchase the first product and the second product; (2) a respective cost of the first product and the second product; (3) a respective merchant that sold or delivered the first product and the second product; (4) a respective date of purchase of the first product and the second product; (5) a respective delivery data associated with the first product and the second product; (6) a discount rate or percentage of the first product and the second product; (7) cancelled orders; (8) digital orders; (9) open orders; and (10) a user customizable category. The user could also purchase a warranty for one of the first product and the second product.

The correlated data can be made available to the first site and the second site via receiving an interaction from the user with an option to access a user account that maintains the correlated data and manages purchase across multiple different types of sites including at least the first site and the second site. The option to access the user account can include a button or drop down menu presented on the first site and the second site. The server can communicate with the first site and the second site via an application programming interface. The user account in one aspect can be correlated with a merchant aggregation site having a merchant aggregation site user account that manages purchases from the merchant aggregation site.

The method can also include receiving, at the server, third conversion data from a merchant site, wherein the correlated data further includes the third conversion data. The merchant site can be not a merchant aggregator site but an individual merchant site. In other words, Amazon.com aggregates many merchants for managing the sale of products, but individual merchants can also provide and receive data from the product management engine.

Cryptocurrency

It is noted that any of the APIs or financial transactions disclosed herein could be implemented through blockchain technology. Thus, any communication between a buyer and a seller or products could be implemented through a contract on a blockchain and payment could be submitted through user addresses according to blockchain technology. For example, a smart contract programmed and implemented on a blockchain could receive and implement items in the transactions.

Another aspect of this disclosure is how does one implement a "one-click" or buy button purchasing opportunity on a search engine result, an interface to a merchant site where a purchase can be made, or a buy button posting on a social network. The concept could also work simply from any application or website where a purchase of an item or service is possible. In these contexts, to make the purchasing process more efficient, the payment/delivery information is stored at the search entity, social networking entity, a separate agent, a browser, or in any other location so that the data can be applied to a purchasing transaction in such a way that the user does not need to manually fill out fields (such as address, credit card number, etc.) to complete a purchase. Filling out these fields prevent more purchasing conversions. The approach disclosed herein can be done through APIs or other protocols to request data, retrieve the data, and fill in the payment forms and give the user a more "one-click" type of experience. This is implemented for example through the W3C Payment Request API or Android Pay API, the details of which are described in the priority applications to the present application.

However, with a blockchain approach used for altcoin payments, there is no entity that "holds" the payment account like a credit card. There are three elements to the blockchain and using cryptocurrency to make purchases. There is an address, a private key and wallet software. The address is where others can send bit coin to the person or entity. The private key is the cryptographic secret by which a person can send Bitcoin (or any altcoin) to others. Whenever a particular altcoin like "Bitcoin" is referenced, it could apply to any type of cryptocurrency. The wallet can also store a record of the amount of altcoin you control on the blockchain ledger.

Wallet software is the software that a person runs on their own computer to manage their Bitcoin. Wallet projects are provided by companies such as ChromaWallet, CoinSpark and CounterWallet. Other companies include Coinprism, Melotic and OneWallet. Typically, to send someone or an entity an altcoin, the sender scans the wallet address QR code or otherwise obtains the address characters for the recipient via email or other means. The sender uses the wallet application to enter additional information about the transaction such as the amount, fee, delivery costs, etc. When the sender confirms the transaction using their private key, a message is broadcast from the owner of the sending address to the network that x number of coins from that address now belong to the new address. It is authorized by the sender's private key. After a few minutes, the transaction will be inscribed in the blockchain per blockchain miners and a confirmation notice can be sent. An altcoin address as well as a public and private key is generated automatically when a user set up their wallet. The altcoin address is typically an identifier of 26-34 alphanumeric characters, beginning with 1 or 3, the represents a possible destination for a altcoin payment. Sometimes the address is represented as a QR code. It can operate like an email address. People with a user's public-key wallet address can send the person altcoins.

The present disclosure incorporates this functionality and simplifies it in the context of making purchases on the web or a mobile application. What will occur when using Bitcoin, Litecoin (or any cryptocurrency) is, in one example, a new API that coordinates the altcoin payment through an individual's wallet stored on their device and the purchasing interface (i.e., a buy button search result, a purchase option on a merchant site or a buy now item posted on a social media site). Components such as storage, messaging, wallet interactions, mobile payments, identity confirmation, security, and reputation can be managed using tokens and proper communication protocols of the necessary information to integrate altcoin payments into the Payment Request API widely adopted.

It is assumed that a merchant will accept cryptocurrency in this scenario. Thus, when the circumstances disclosed herein are applicable, and a buy button is presented to a user, the user will be enabled to make the purchase using their private key to access their altcoin, and the address of the merchant to be able to receive the payment of the altcoin. The wallet software can keep a copy of the blockchain—the record of all the transactions that have occurred in the particular currency—as part of the decentralized scheme by which coin transactions are verified. The wallet can be browser-based, application based, or can be a separate application or smartphone wallet from Blockchain.info, Mycelium, Coinbased, Electrum or other provider. In other words, one aspect of this disclosure is to incorporate the wallet into a browser such that the user's credit/debit/other payment account is stored, their address, as well as their altcoin wallet. Alternately, a protocol can communicate data between a browser (which uses the API between the browser and the merchant) and the altcoin wallet. For example, the wallet may share the address and the private key to perform a payment but then receive the details to add the payment to the blockchain.

As noted above, for a user to send altcoins to a merchant to make a purchase of an item, the user needs the address of the merchant and the private-key part of the buyer's wallet where the software will check that they have control over the altcoins to be paid to the merchant. In some cases people scan a QR code for the wallet address. Usually, the sender (buyer) scans the QR code of the recipient's address and uses the wallet application to enter additional information about the transaction, such as amount, transaction fee (affirming an amount prespecified by the wallet software), or any other parameters. When the sender submits the transaction, a message is broadcast from the owner of the sending address to the network that x number of coins from that address now belong to the new address. The operating is authorized by the sender's private key. The sender may enter in their private key or a password or fingerprint, voiceprint, or other authorization may be used to retrieve the sender's private key. The transaction is received almost immediately at the receiver's wallet application, with an "unconfirmed" status and after about 10 minutes, the transaction is confirmed and can be inscribed in the blockchain per blockchain miners.

Applying the basic altcoin operation to the current scenario, several modifications and novel features must be implemented. The goal is to enable in a simple and easy fashion the ability of a user to choose an altcoin payment as though it was a Visa payment or a Mastercard payment managed through the payment request API, although the altcoin is processed in a completely separate way. Currently, for example, in a user's Amazon.com account, several credit cards can be listed and one can be chosen for a payment. This approach will enable an altcoin payment for a purchase as well.

Enabling a simple "one-click" ability to choose an altcoin payment process and then handle the payment has some issues. If a user is on a mobile device and wants to make a purchase, they will not be able to scan a QR code of the merchant address. Plus, not all buyers will have bitcoin type wallets. Thus, through an API a merchant advertising or posting an interface that a user can ultimately interact with to make a purchase can receive data that the person viewing the advertisement or interface has a cybercurrency wallet set up and has a profile that indicates that they might make the purchase through bitcoin or other currency. An API can exchange the necessary requirements and data such that in the context of an advertisement or other interface in which the user is in a state in which a purchase intent is indicated or can take place, the same kind of authentication used by the buyer's altcoin wallet can be integrated into the interface such that the user will just need to perform the same kind of function to access their private key. This might be through biometrics, a password, and so forth. The integration can include retrieving an amount of money, address of delivery, date, merchant, and all of such data with the application and retrieval or receipt of the buyer's private key and use of their cryptocurrency wallet so that the payment can be made in cryptocurrency but the delivery, management of the life cycle of the product purchase and delivery and potential return, etc. is handled in the normal fashion by the merchant.

In this regard, assuming that the data indicates that a wallet exists or a user preference notifies a merchant that altcoins will/can be used to buy products, the advertisement or the graphical presentation will include as part of its data the merchant address to which altcoins can be addressed. In one scenario, the "buy button" could include options to use a stored credit/debit card or any other traditional payment account or the user could choose a cryptocurrency account. If a traditional payment account is chosen, then the processes disclosed herein to utilize the payment account stored at the search entity, social media site, browser, other payment agent or other location to either process the purchase or transmit payment data to the merchant site through the API for providing the necessary data for the merchant to process the payment (i.e., so the user does not have to fill in the forms). The various requests and responses exchanged through the API enables the payment information/delivery information and/or other information to be communicated to the merchant site such that the purchasing process is simply and does not require the user to fill out fields in a payment form.

The process disclosed herein adds the cryptocurrency payment opportunity. If an altcoin payment is chosen, then the interface interacts through an API or other protocol with the user's wallet to retrieve the user's private key or enable the user to enter the private key so that the cryptocurrency transaction can occur and the merchant can be paid. For example, a one-time use token could be generated which provides the address and/or private key to the merchant site such that it can perform the payment function. Or, the API can receive from the merchant site the amount, merchant address, any other data such as tax, fees, etc., and the API can receive that data and communicate with the wallet or browser to process the payment from the user's altcoin wallet. The altcoin wallet could be integrated into the browser such that the processing is performed by Chrome, Mozilla, Internet Explorer, etc. If the API is between the merchant and the browser, a separate API or protocol could communicate the data between the browser and a user's altcoin wallet on their device. Again, the actual transfer of altcoin to the merchant can occur in any component that is workable. It could be through the user's altcoin wallet, an instance of the altcoin wallet incorporated into a browser, or through the merchant making the transfer.

Typically, the amount of the purchase in altcoin will have to be calculated because it originally be likely set in dollars but will need to be converted into the corresponding value of the respective cryptocurrency that the buyer will use. The process in this regard could include accessing a data feed which provides a current value of the cryptocurrency in terms of dollars (or any other currency that the merchant is using). This access could be done in real time or near real time such that when the buyer makes the purchase, the proper value of the cryptocurrency is applied to the purchase. That value and data feed could be presented to the user at the time of purchase and could be part of the buying interface.

The buy button and follow on screens that are part of the purchasing process can include a blending of the interface with access to the cyptocurrency wallet for the buyer. Thus, the interface could include a portion that is connected to or triggers payment through a traditional payment account, and another portion that is associated with the buyer's wallet for cryptocurrency. The user could be presented with a buy option to pay with Visa, Mastercard or Bitcoin. If the user chooses the cryptocurrency, then the system enables the interaction with the wallet such that through accessing automatically or manually, the user's private key is provided or accessed. Passwords, fingerprint authorization, or manual entry of the private key can occur through the purchasing interface for the item, whether is it part of a merchant site, an advertisement, a Google Shopping graphic, a Purchases on Google interface (or any search entity interface), any browser image or application interface, or the use of a Payment Request API developed by W3C.org. The merchant can provide their address and once the buyer provides their private key, the transmission of the cryptocurrency from the buyer to the seller for the appropriate amount for the product can be achieved. All of the processes then can follow for the product as normal, such as tracking, product delivery, communication of delivery information, cancellation, modification, etc. can occur.

In one example, to maintain the user's private key on their device in their wallet, the process could include receiving a confirmation that the user wants to provide the payment through bitcoin. Through an API, the merchant application can provide cost information, a transaction ID, merchant ID, merchant address, delivery charges, taxes, and/or discount data, etc. The API can communicate the data to the user's wallet directly or through a browser or a combination of both. The wallet can confirm and populate its fields necessary for a transaction such as the merchant address, the amount, notes, etc. The typical wallet can be modified to include transaction ID, merchant ID, user preferences (2 day shipping) etc. Much of this information, however, can also be provided through the API from an agent, the browser, a search engine, etc. Once the user's wallet is populated with the data for performing a transaction, the interface at the merchant site or app that the user is interacting with can then request a password or biometric confirmation to complete the transaction. Alternately, although less secure, the user could opt for just an automatic processing when the user clicks "pay" or a similarly styled button. With this interaction with the buying interface, through the API, a confirmation command instructs the wallet to carry out the transaction and transfer the altcoin(s) to the merchant or recipient.

Currently, the payment processing systems for credit cards, debit cards and so forth are set up for use by merchants. Thus, in the standard payment approach through the API, the payment account information is passed from the browser or other agent to the merchant site through the API for payment processing. The payment account data can be transmitted to the merchant in a secure, one-time use fashion and configured such that the payment can be processed but the merchant cannot store the user's payment account data. However, if the user chooses an altcoin payment approach, it is unlikely they will want to send their private key to the merchant. Processing the altcoin payment differs from a standard Visa/Mastercard type of transaction. Accordingly, in one aspect, the API will receive from the merchant their address, amount, and/or any other data needed to complete an altcoin payment. The API can then provide that data to the user's altcoin wallet, whether the wallet is separate from a browser or other agent or integrated into the browser or other agent. The altcoin wallet then can make a payment to the merchant address of the amount of altcoin to pay for the product/service. A transaction ID can be associated with the product purchased. Notifications can then proceed to be communicated through the API back to the merchant. The user through the interface can be notified of the progress and of what is happening at the back end ("Amazon is sending data to your Bitcoin wallet for processing a payment" . . . "Payment confirmed of 1.2 Bitcoin for the Television"). If the user has multiple different altcoin wallets, they could be processed in a similar fashion in parallel. I.e., the user may be able to choose whether to pay with Bitcoin or Litecoin (or any other altcoins that they own). Depending on which is chosen, the particular processing to access that respective altcoin wallet is carried out for payment.

The above approach enables an integration of the use of cryptocurrency, even with its completely separate blockchain based payment process, with other standard forms of payment and payment processing through an API such as the Payment Request API which simplifies the purchasing process by removing the need of a user to fill in payment form fields with name, address, payment account data, etc.

An example method of this approach can include receiving an indication that a purchaser has an altcoin account, presenting an option to make a payment using an altcoin account, and receiving a confirmation to use altcoin. The method includes communicating from a merchant site through an API with a browser or agent to provide information about a purchase of an item. The altcoin wallet can be configured as a separate application or integrated into a browser or other agent process or component. The altcoin wallet receives the data about the purchase and processes the payment to the merchant. The wallet can populate its data fields with the information received through the API from the merchant. The altcoin wallet can include the ability to communicate the payment details through a protocol to the browser or through an API back to the merchant. The merchant site interface can communicate updates to the purchaser of the success/failure of using their altcoin account to make the purchase. A data feed can be accessed to provide current pricing in terms of dollars. If the item is $20 to buy, then at the time of the purchase, the user can see that it would cost say 0.02 Bitcoin to make the purchase and they have 5 Bitcoin currently. The embodiments can include the processing as disclosed herein from the viewpoint of the altcoin wallet, the browser, an agent, a smart contract, either side of the API or APIs, and/or the merchant site. Therefore, claims can be directed to any component in this process and in any configuration (i.e, the altcoin wallet separate, or integrated into the browser, etc.). The ultimate goal is to make payment through altcoin as easy as a "one-click" purchase is for a Visa type payment.

The processing for such payments could also be achieved through the use of a smart contract. The smart contract is a program that can be implemented on the blockchain and that performs certain actions in a trustless manner. In other words, it performs its operations in a known and transparent way using the distributed approach of the blockchain technology. Smart contracts are autonomous, self-sufficient and decentralized. They automatically run and perform the programmed functions. There is no need to "trust" a human to perform one part of the contract. In one example, a smart contract can be used for all or part of the processing disclosed herein. For example, assume that the user interface of a merchant site provides an option for a user to buy an item using their altcoin. The user confirms the purchase with a "pay" button. The amount say is 1 Bitcoin. The instruction or confirmation of that commitment by the purchaser can be transmitted with 1 Bitcoin to a smart contract, operating on a blockchain technology. The seller of the item can perhaps confirm that they have the product and can deliver tomorrow. The smart contract can transfer the 1 Bitcoin to the merchant and send a notice to the buyer that the item is on the way. Or, the smart contract could be programmed to deliver the 1 bitcoin to the merchant when a delivery confirmation occurs. At some stage, the communication and tracking of the packet can transition to a normal tracking and notification process such as is operated by Amazon.com for managing purchases made, return policies, etc. If a return is to be made, the merchant can transfer 1 Bitcoin to the smart contract which can then make a payment according to its protocol to the purchaser. Thus, in this respect, the disclosure covers all communications, requests, responses, and data communicated between a merchant site, through an API, to a browser, altcoin wallet, smart contract and/or other agent to achieve a one-click purchasing option of using altcoins for payment in the same fashion as a regular payment account. Because of the different way that altcoins are used, current API's like the Payment Request API must be modified to accommodate the alternate payment structure of altcoins. By extending the API and including the components of the altcoin wallet and/or smart contract to carry out functions in the process, an improvement to the way purchases are made can be implemented to add the ability to pay through altcoins.

Yet another aspect of this approach could be payments to the user's altcoins wallet. For example, with the altcoins structure in place which can include the buyer's address and the merchant address, altcoins payments could flow both ways. Thus, small incentives could flow to users. Currently, if an advertisement is clicked on as part of a search engine result, the search engine gets paid. Integrating the user's wallet into the process could enable the advertiser to pay the buyer that clicks on their advertisement some altcoin. Graphics could show for example how much altcoins a user generates by clicking on the advertisement and browsing content on the merchant's site. When the user arrived at the state in the navigation where a purchase is made, the user could apply the altcoins they made via browsing to the purchase or keep them. All balances and adjustments at the conclusion of the purchase could be implemented in any fashion, including through submission to a smart contract. Special rates, discounts, incentives, etc. could be provided through credits to the user's altcoins wallet which are completed or finalized at the conclusion of a sale. Such credits could also automatically be made throughout the process. Thus, when a user clicks on an advertisement, altcoins could be transferred to their altcoin wallet automatically through the integration of their address with the browser/agent, or a promise to transfer altcoins of a certain amount could exist or be presented such that the final actual transfer occurs if the user clicks through and buys a product on the site. The transfer could even occur if the user does not buy with altcoins but with dollars or some other currency. This aspect covers all the variations on how a merchant would provide altcoins back to buyers as they interact with their site or through other means such as texting, emailing, social media interactions, and so forth. If a user likes a merchant or non merchant site, that site can send altcoins to the user's wallet. This will enhance the user's experience and encourage them to engage more with the merchant or other site.

Examples within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various examples described above are provided by way of illustration only and should not be construed to limit the scope of the disclosure. Various modifications and changes may be made to the principles described herein without following the example examples and applications illustrated and described herein, and without departing from the spirit and scope of the disclosure. Claim language reciting "at least one of" a set indicates that one member of the set or multiple members of the set satisfy the claim. Notably, any feature described in any example or embodiment can be combined with any other feature of any example of embodiment. For example, any feature discussed with respect to a search engine example can be applicable and interchangeable with a social media example, or a product purchase management engine example.

We claim:

1. A method comprising:
    storing payment data on a device;
    receiving, via a browser, an interaction, by a user, with a site presented within the browser, the interaction indicating a user intent to make a purchase;
    receiving, at the browser, based on the interaction and according to an application programming interface programmed into the browser that defines a protocol for communicating the payment data between the site and the browser, a request from the site for authorized payment data in connection with the purchase, wherein the authorized payment data comprises at least the payment data on the device;

receiving, via the browser and according to the application programming interface, the authorized payment data; and transmitting, to the site, from the browser and according to the application programming interface, the authorized payment data.

2. The method of claim 1, wherein the payment data comprises one of payment account data and a user address.

3. The method of claim 1, wherein the site processes a payment for the purchase based on the authorized payment data.

4. The method of claim 1, further comprising:
providing a confirmation interface for the purchase;
receiving a confirmation from the user via the confirmation interface; and
based on the confirmation, transmitting, according to the application programming interface, one of payment account data for the site to process a payment for the purchase or a payment confirmation that a payment processing service has processed the payment for the purchase.

5. The method of claim 4, wherein the payment confirmation confirms that an entity associated with the browser processed the payment.

6. The method of claim 1, wherein the application programming interface communicates data between the site and a social networking site.

7. The method of claim 1, wherein the authorized payment data further comprises one or more of address data for the user, a payment account number, an expiration date, a security code, a cardholder name, cryptocurrency data, and shipping instructions.

8. A method comprising:
transmitting, for presenting via a browser, an object with which a user can interact, wherein the object comprises one of a button, a drop-down screen or a hyperlink;
receiving an interaction by the user with the object associated with a site, the interaction indicating a user intent to make a purchase;
transmitting, based on the interaction and according to an application programming interface that defines a protocol for communicating authorized payment data between the site and the browser, a request from the site for the authorized payment data; and
receiving, at the site, from the browser and according to the application programming interface, the authorized payment data.

9. The method of claim 8, wherein:
when the site processes a payment for a product, the authorized payment data comprises at least user payment account data and the method further comprises:
processing the payment for the product based on the user payment account data received from the browser according to the application programming interface; and when a payment service processes the payment for the product, the authorized payment data comprising a confirmation that the payment for the product has occurred by the payment service.

10. A device comprising:
a processor;
a browser operating on the device; and
a computer readable storage medium storing instructions which, when executed by the processor, cause the processor to perform operations comprising:
receiving, from a site, at the browser and according to an application programming interface that defines a protocol for communicating data between the site and the browser, a request associated with a potential purchase from the site, wherein the request comprises information about the potential purchase;
receiving, based on the request and according to the application programming interface, authorized payment information for the potential purchase; and
transmitting, to the site, from the browser and according to the application programming interface, the authorized payment information.

11. The device of claim 10, wherein the request is further associated with a user-initiated action indicating an intent by a user to make a purchase.

12. The device of claim 10, wherein transmitting the authorized payment information to the site enables the site to process a purchase or confirms to the site that a payment service processed the purchase.

13. The device of claim 10, wherein the request identifies supported payment methods used by the site.

14. The device of claim 13, wherein the authorized payment information comprises a chosen payment method available for a user.

15. The device of claim 10, wherein the request seeks a shipping address of a user.

16. The device of claim 15, further comprising transmitting, to the site, from the browser and according to the application programming interface, the shipping address of the user.

17. The device of claim 16, wherein the site can use the shipping address of the user to ship an item associated with a purchase.

18. The device of claim 10, wherein the information about the potential purchase in the request comprises at least one of supported payment methods for the site, a total amount, a discount, a tax, a shipping amount, a currency type, a request for a shipping address, a request for an email of a user, and a request for a phone number of the user.

19. The device of claim 10, wherein the authorized payment information comprises payment account data associated with a payment account of a user.

20. The device of claim 10, wherein the authorized payment information comprises at least in part user payment data stored on the device.

* * * * *